March 15, 1960 V. FINSTON 2,928,401

ELECTROPROCESSING APPARATUS

Filed June 15, 1955 29 Sheets-Sheet 1

Inventor
Victor Finston by Hill, Sherman, Meroni, Gross + Simpson Attys.

March 15, 1960 V. FINSTON 2,928,401

ELECTROPROCESSING APPARATUS

Filed June 15, 1955 29 Sheets-Sheet 2

Inventor
Victor Finston by Hill, Sherman, Meroni, Gross + Simpson Attys.

March 15, 1960 V. FINSTON 2,928,401

ELECTROPROCESSING APPARATUS

Filed June 15, 1955 29 Sheets-Sheet 3

Inventor
VICTOR FINSTON by Hill, Sherman, Meroni, Gross & Simpson Attys.

March 15, 1960 V. FINSTON 2,928,401

ELECTROPROCESSING APPARATUS

Filed June 15, 1955 29 Sheets-Sheet 4

Inventor
Victor Finston by Hill, Sherman, Meroni, Gross & Simpson Attys.

March 15, 1960 V. FINSTON 2,928,401

ELECTROPROCESSING APPARATUS

Filed June 15, 1955 29 Sheets-Sheet 5

Inventor
Victor Finston by Hill, Sherman, Meroni, Gross + Simpson Attys.

March 15, 1960 V. FINSTON 2,928,401

ELECTROPROCESSING APPARATUS

Filed June 15, 1955 29 Sheets-Sheet 6

Inventor
Victor Finston by Hill, Sherman, Meroni, Gross & Simpson Attys.

Inventor
VICTOR FINSTON by Hill, Sherman, Meroni, Gross + Simpson Attys.

March 15, 1960 V. FINSTON 2,928,401

ELECTROPROCESSING APPARATUS

Filed June 15, 1955 29 Sheets-Sheet 8

Inventor
VICTOR FINSTON by Hill, Sherman, Meroni, Gross & Simpson Attys.

Inventor
VICTOR FINSTON by Hill, Sherman, Meroni, Gross + Simpson Attys.

Inventor
VICTOR FINSTON
by Hill, Sherman, Meroni, Gross & Simpson Attys.

March 15, 1960 V. FINSTON 2,928,401

ELECTROPROCESSING APPARATUS

Filed June 15, 1955 29 Sheets-Sheet 11

Inventor
Victor Finston by Hill, Sherman, Meroni, Gross & Simpson Attys.

Inventor
VICTOR FINSTON
by Hill, Sherman, Meroni, Gross & Simpson Attys.

March 15, 1960 V. FINSTON 2,928,401

ELECTROPROCESSING APPARATUS

Filed June 15, 1955 29 Sheets-Sheet 13

Inventor
Victor Finston by Hill, Sherman, Meroni, Gross & Simpson Attys.

Inventor
Victor Finston
by Hill, Sherman, Meroni, Gross & Simpson Attys.

UNIT #2 Fig. 25a
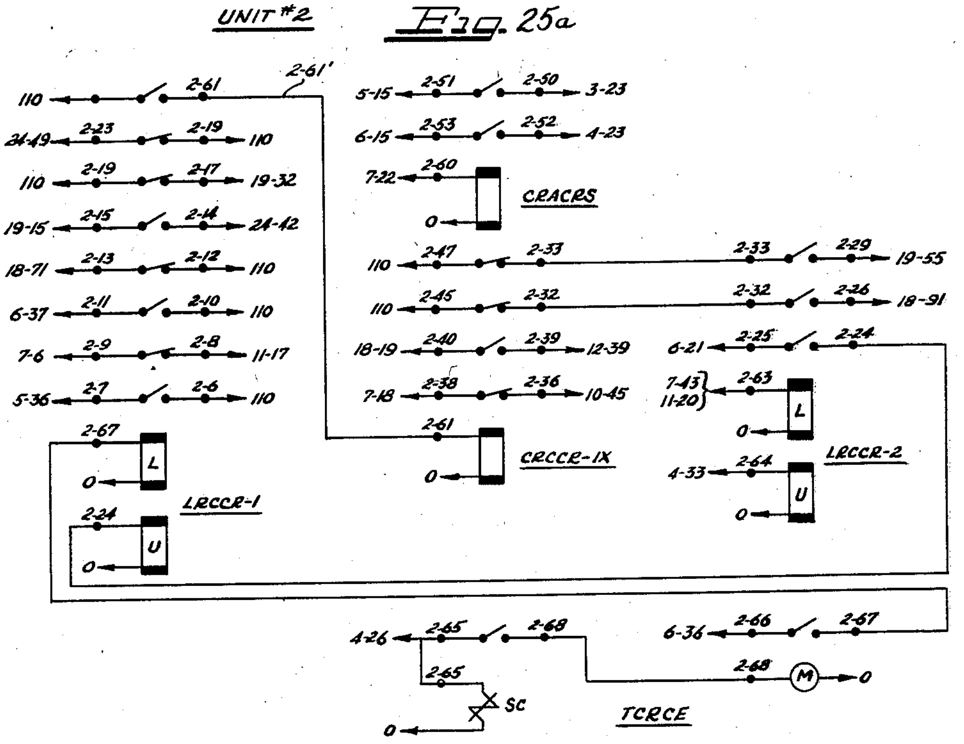
UNIT #3 Fig. 25b
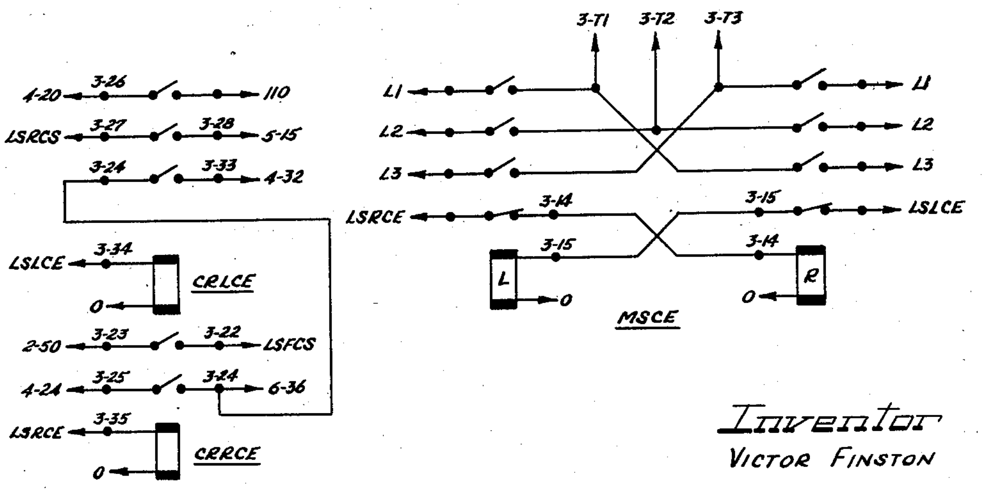
Inventor
VICTOR FINSTON
by Hill, Sherman, Meroni, Gross & Simpson Attys.

UNIT #4 Fig. 25c
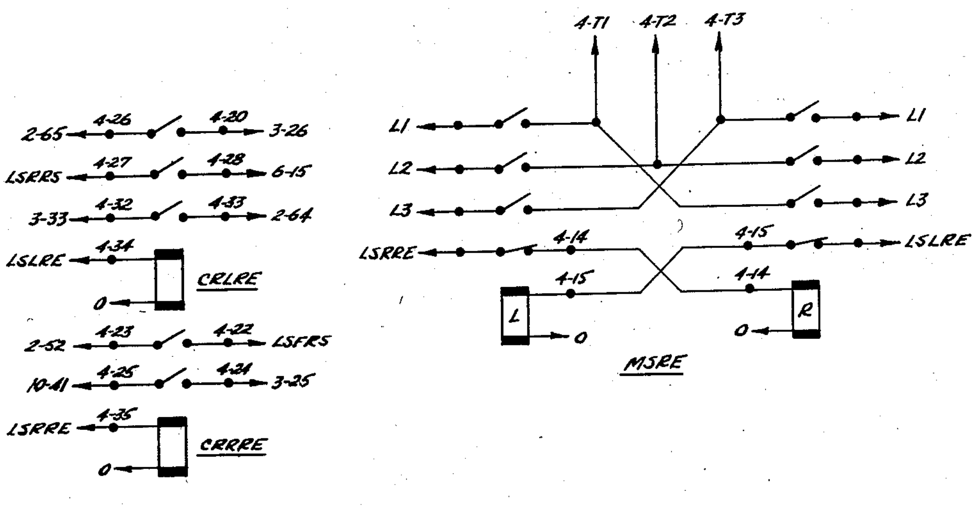
UNIT #5 Fig. 25d
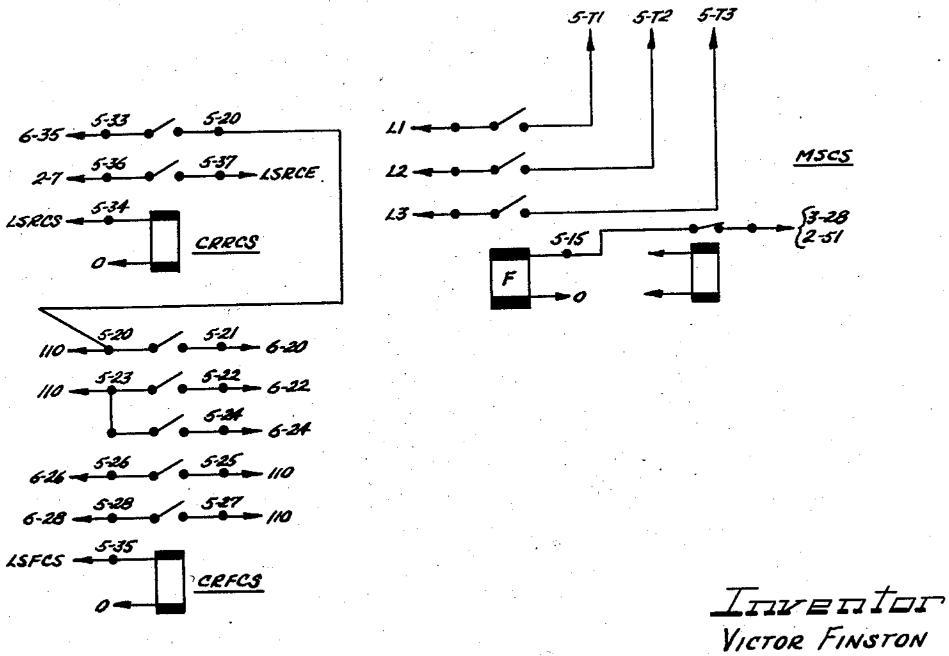
Inventor
VICTOR FINSTON
by Hill, Sherman, Meroni, Gross & Simpson Attys.

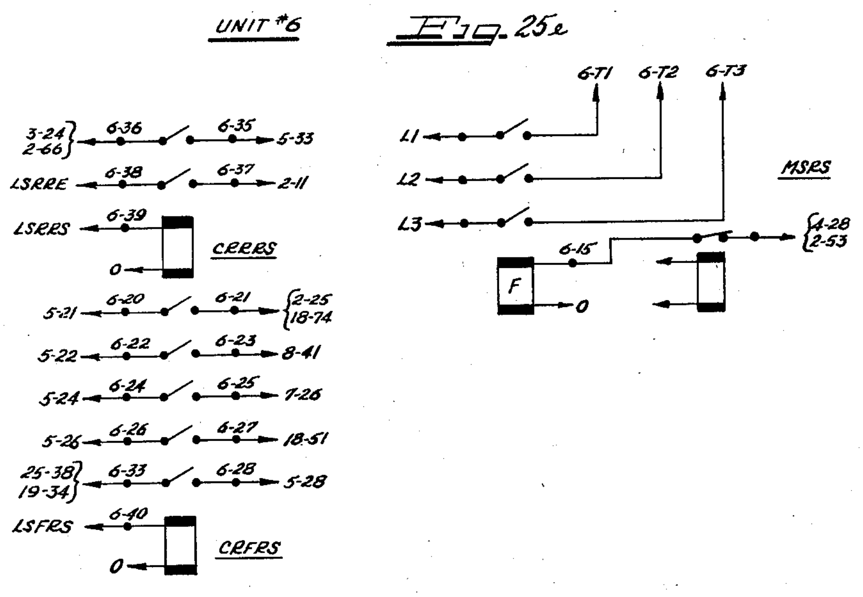
UNIT #6 Fig. 25e
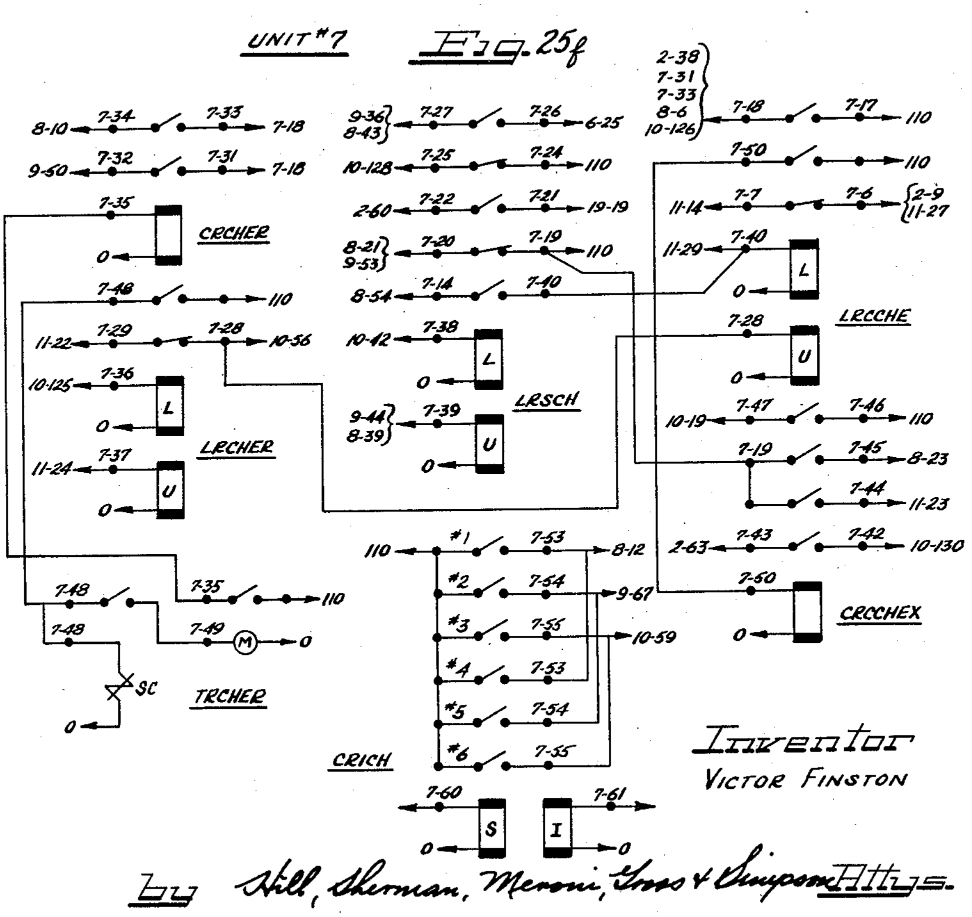
UNIT #7 Fig. 25f
Inventor
VICTOR FINSTON
by Hill, Sherman, Meroni, Gross & Simpson Attys.

March 15, 1960 V. FINSTON 2,928,401
ELECTROPROCESSING APPARATUS
Filed June 15, 1955 29 Sheets-Sheet 18
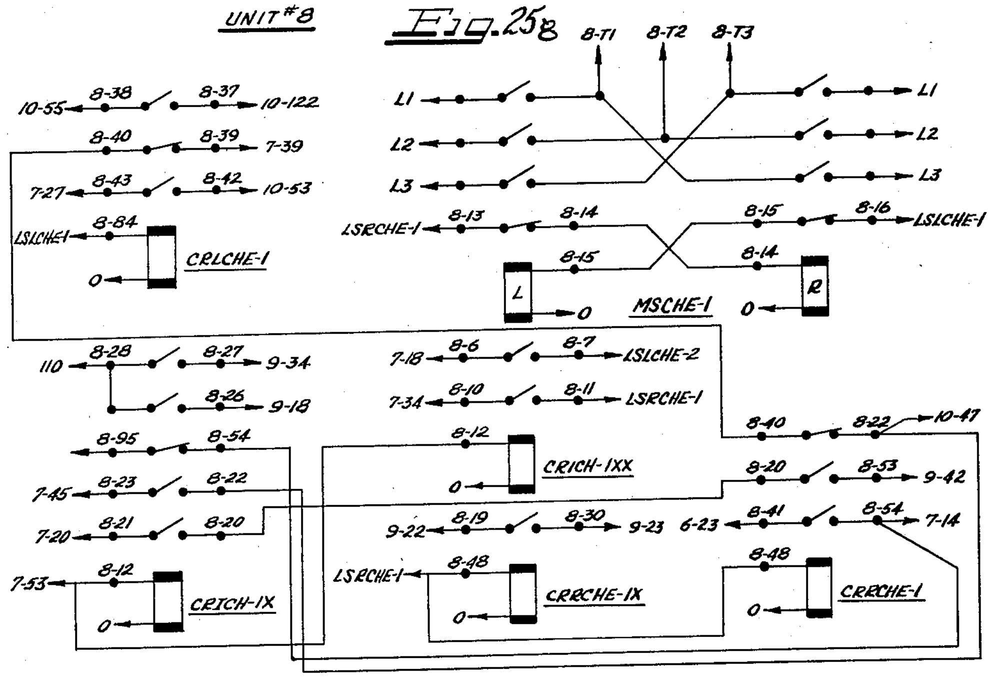
UNIT #8 FIG. 25k
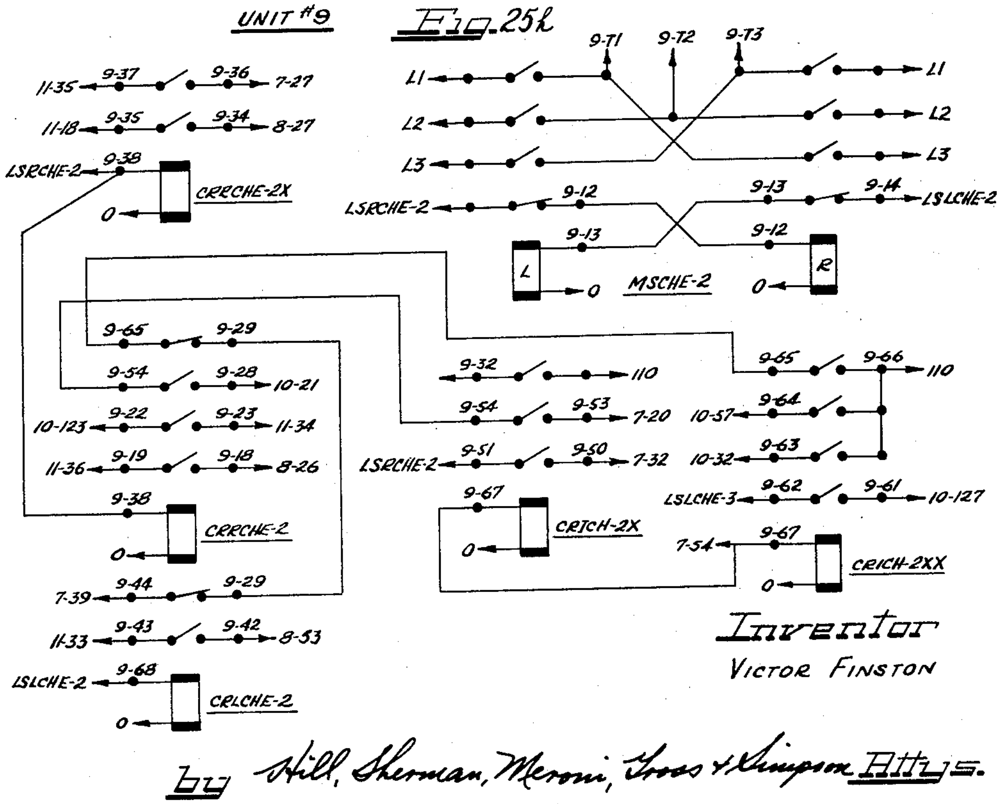
UNIT #9 FIG. 25l
Inventor
VICTOR FINSTON
by Hill, Sherman, Meroni, Gross & Simpson Attys.

UNIT #10 Fig. 25i
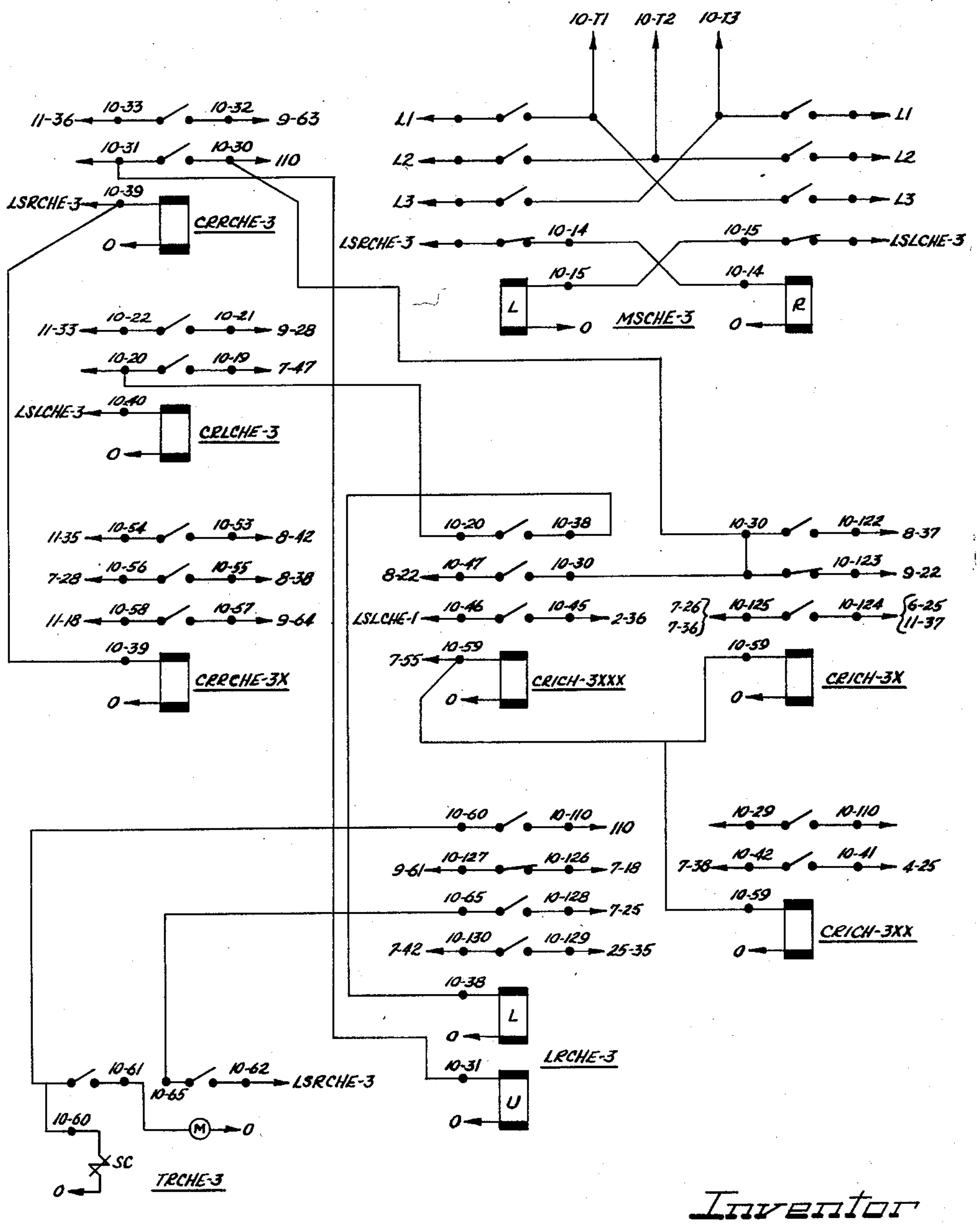
Inventor
Victor Finston
by Hill, Sherman, Meroni, Gross & Simpson Attys.

UNIT #11 Fig. 25j
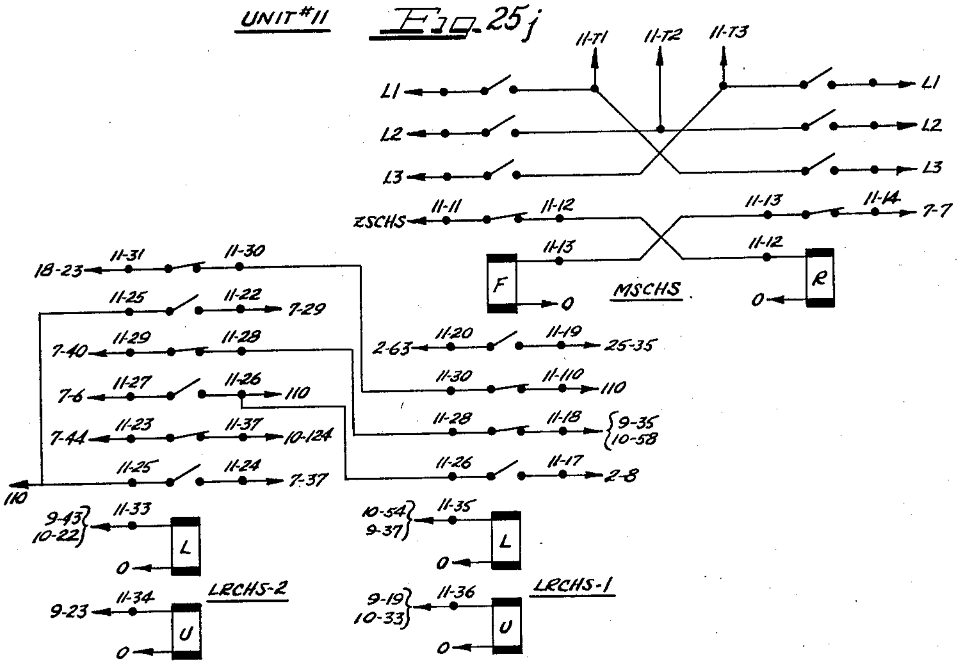
UNIT #12 Fig. 25k
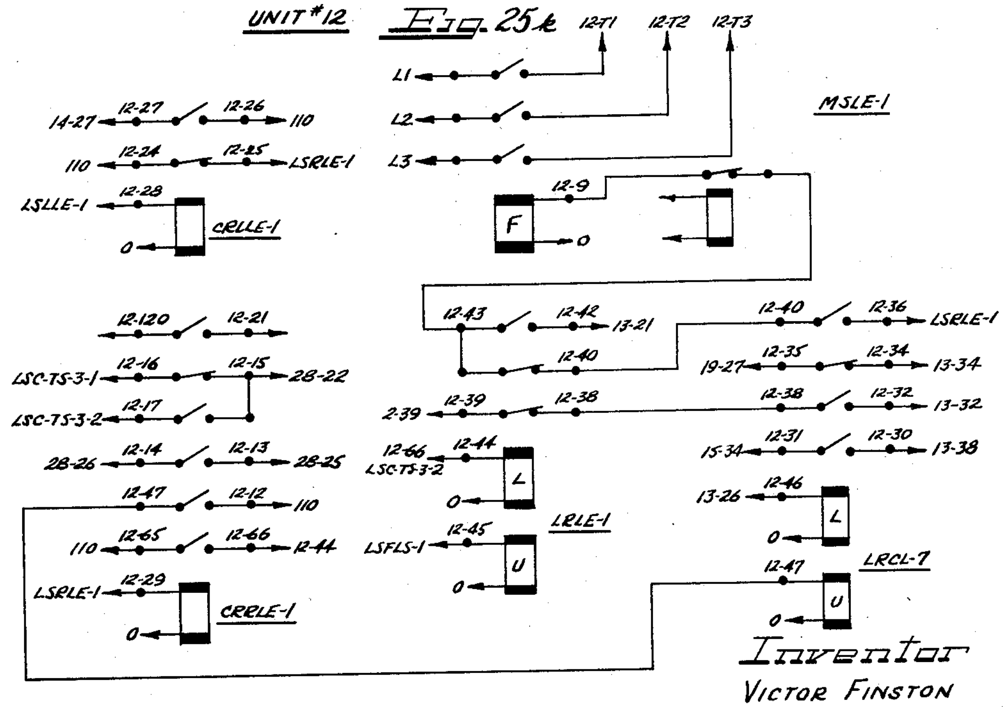
Inventor
VICTOR FINSTON
by Hill, Sherman, Meroni, Gross & Simpson Attys.

Inventor
VICTOR FINSTON
by Hill, Sherman, Meroni, Gross & Simpson Attys.

UNIT #15 FIG. 25N
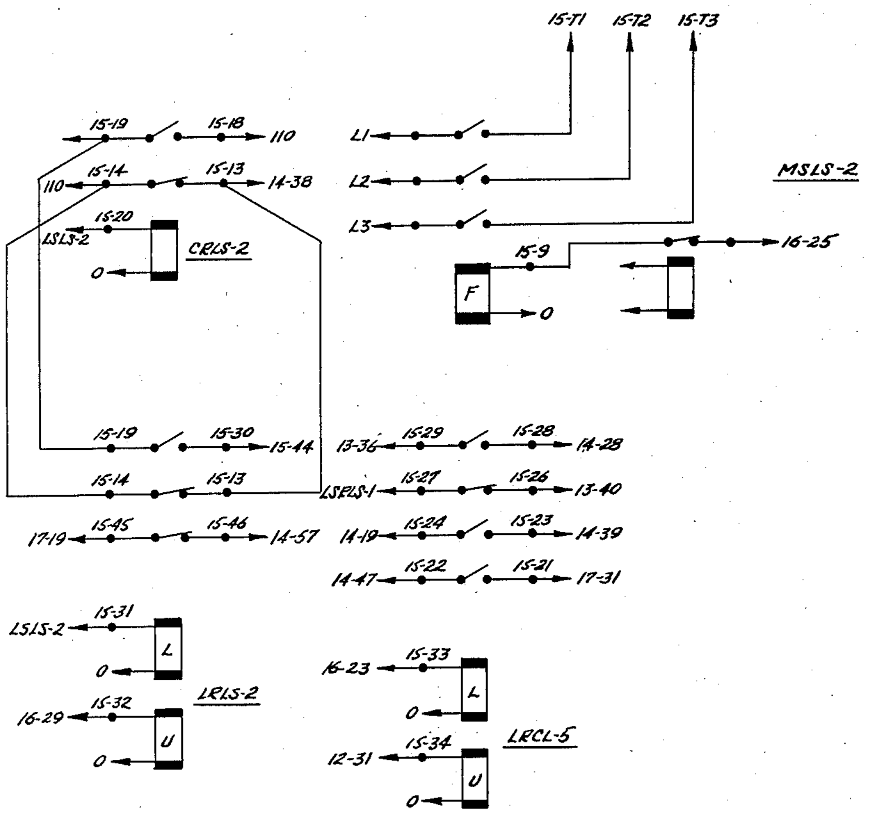
Inventor
VICTOR FINSTON
by Hill, Sherman, Meroni, Gross + Simpson Attys.

March 15, 1960 V. FINSTON 2,928,401
ELECTROPROCESSING APPARATUS
Filed June 15, 1955 29 Sheets-Sheet 23
UNIT #16 Fig. 25o
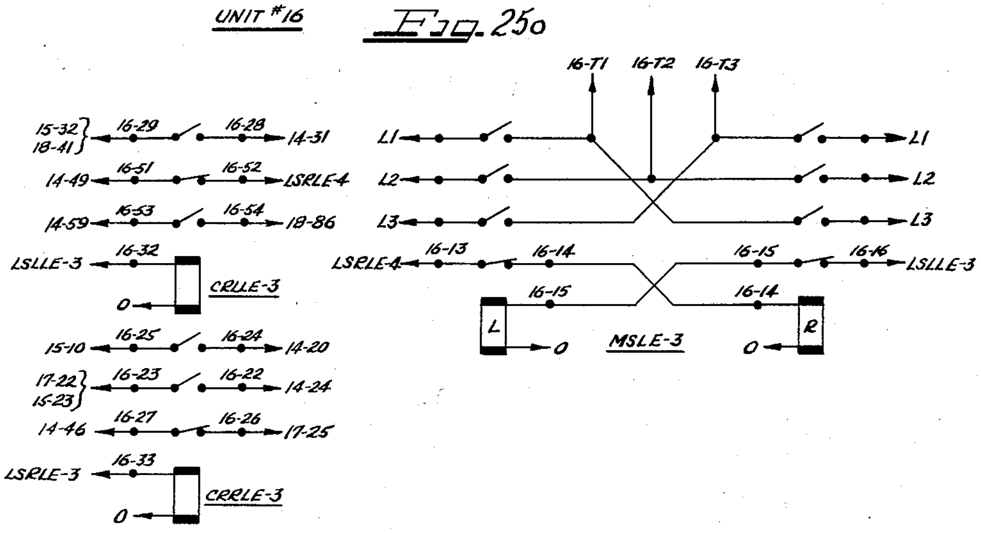
UNIT #17 Fig. 25p
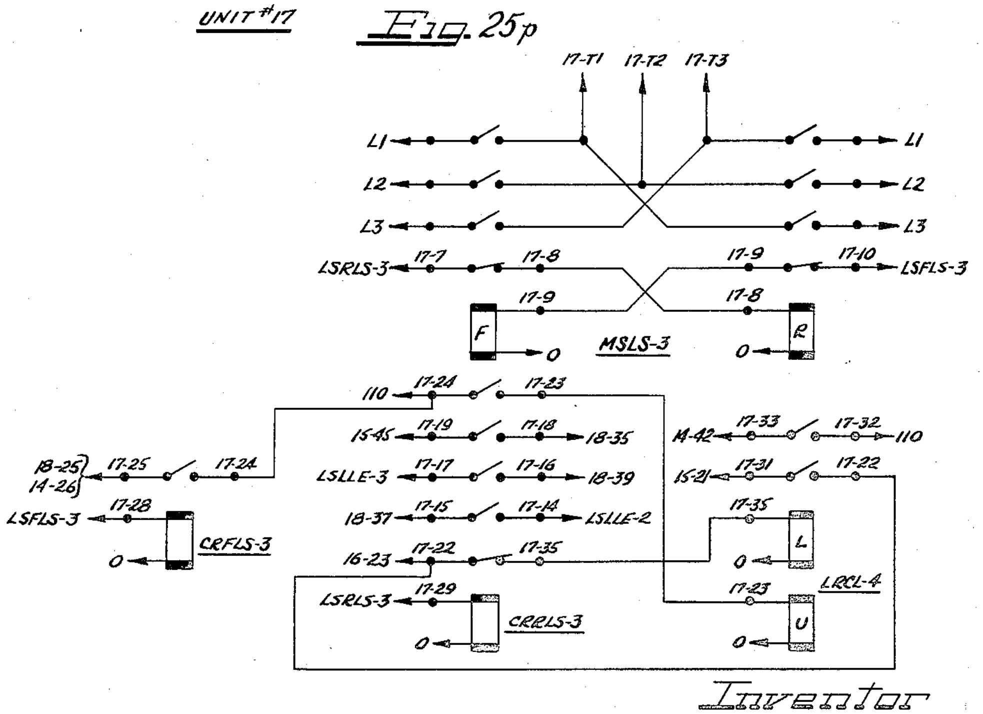
Inventor
Victor Finston
by Hill, Sherman, Meroni, Gross + Simpson Attys.

March 15, 1960 V. FINSTON 2,928,401
ELECTROPROCESSING APPARATUS
Filed June 15, 1955 29 Sheets-Sheet 24
UNIT #18 Fig. 25q
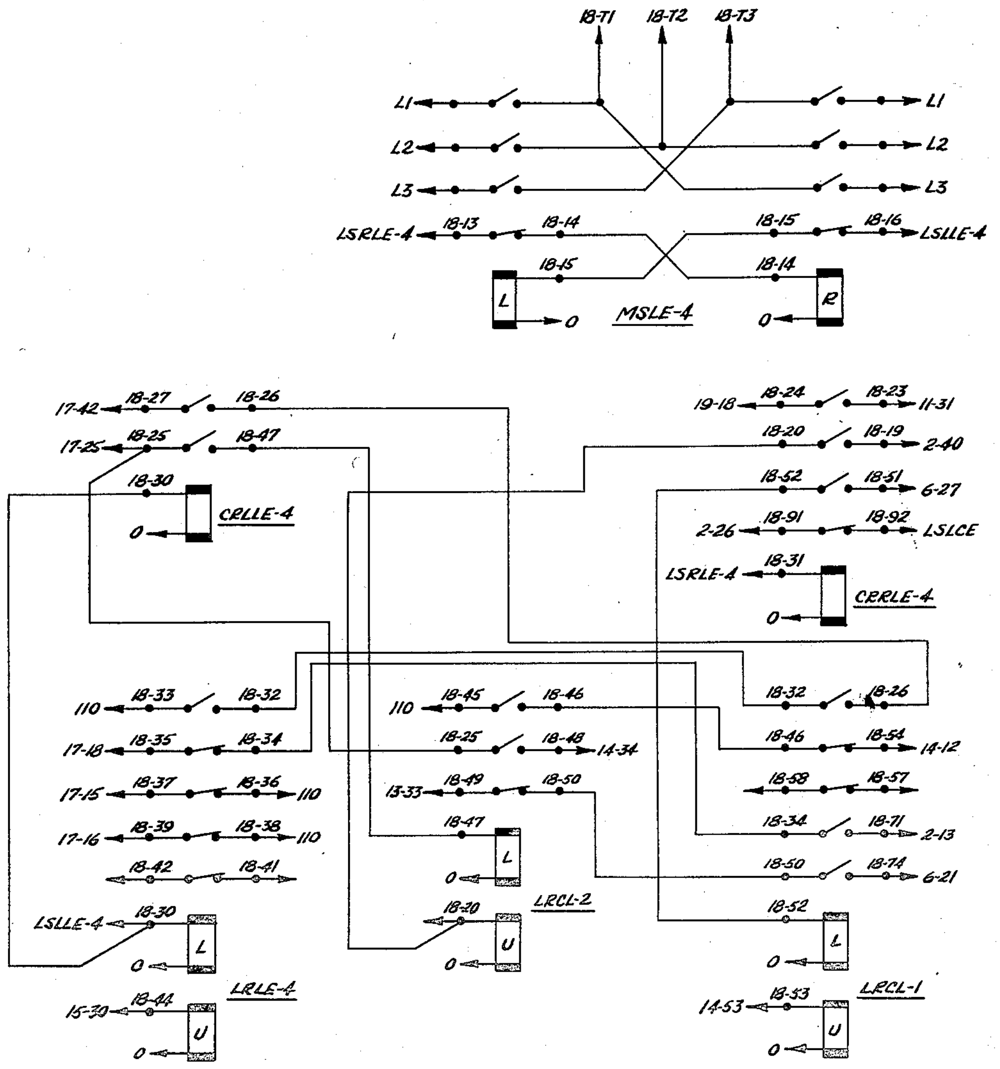
Inventor
Victor Finston
by Hill, Sherman, Meroni, Gross & Simpson Attys.

UNIT #19 Fig. 25r
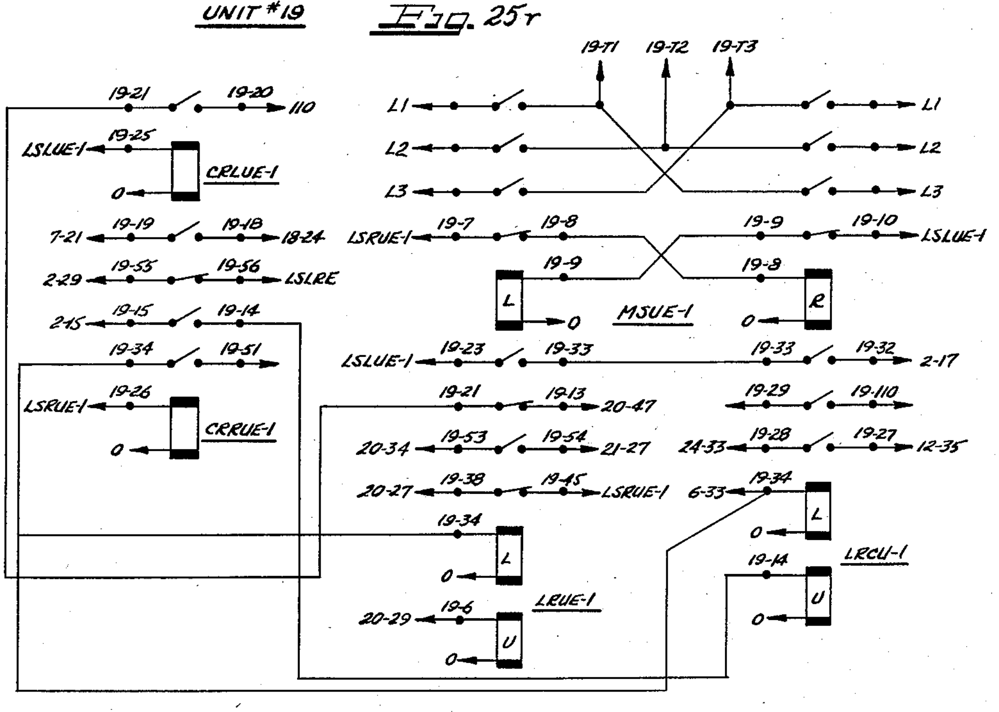
UNIT #20 Fig. 25s
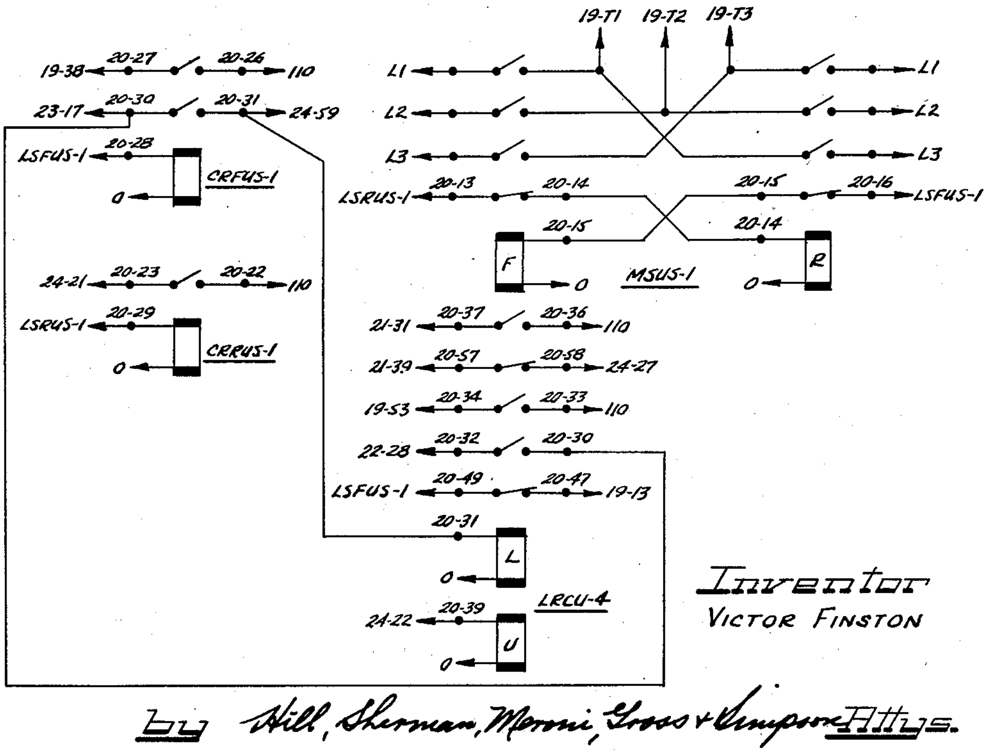
Inventor
VICTOR FINSTON
by Hill, Sherman, Meroni, Gross & Simpson Attys.

March 15, 1960 V. FINSTON 2,928,401
ELECTROPROCESSING APPARATUS
Filed June 15, 1955 29 Sheets-Sheet 26
UNIT #21 Fig. 25t
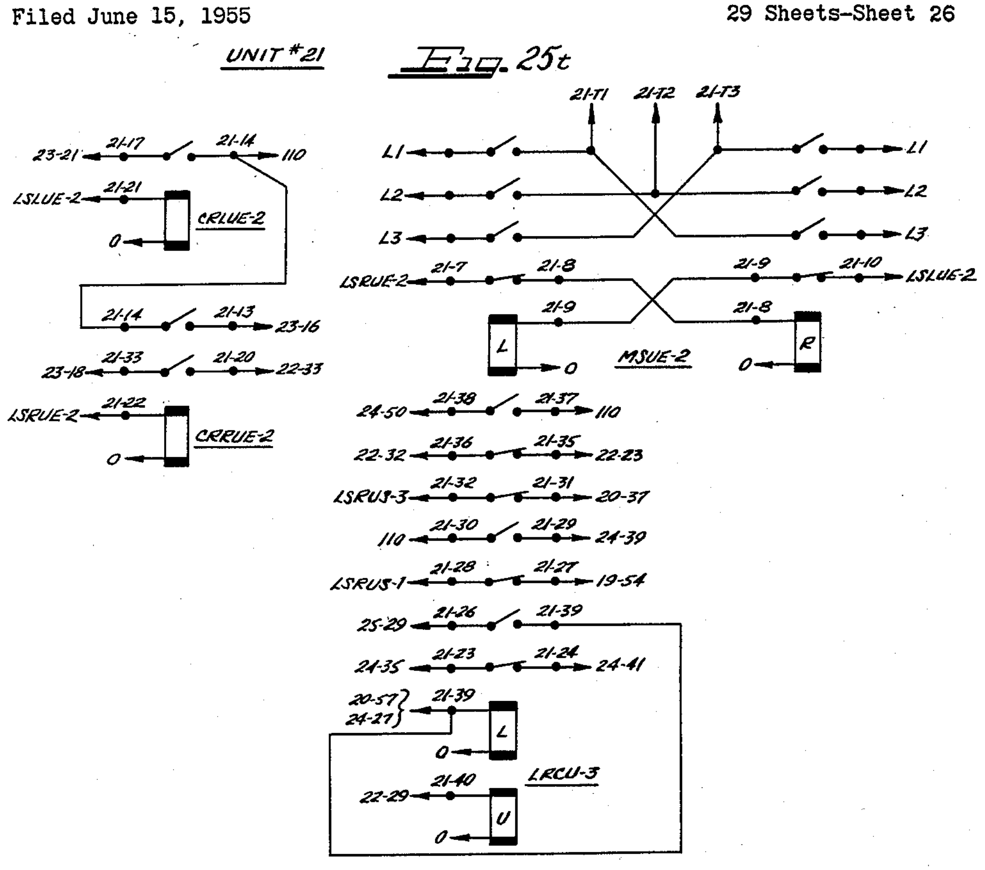
UNIT #22 Fig. 25u
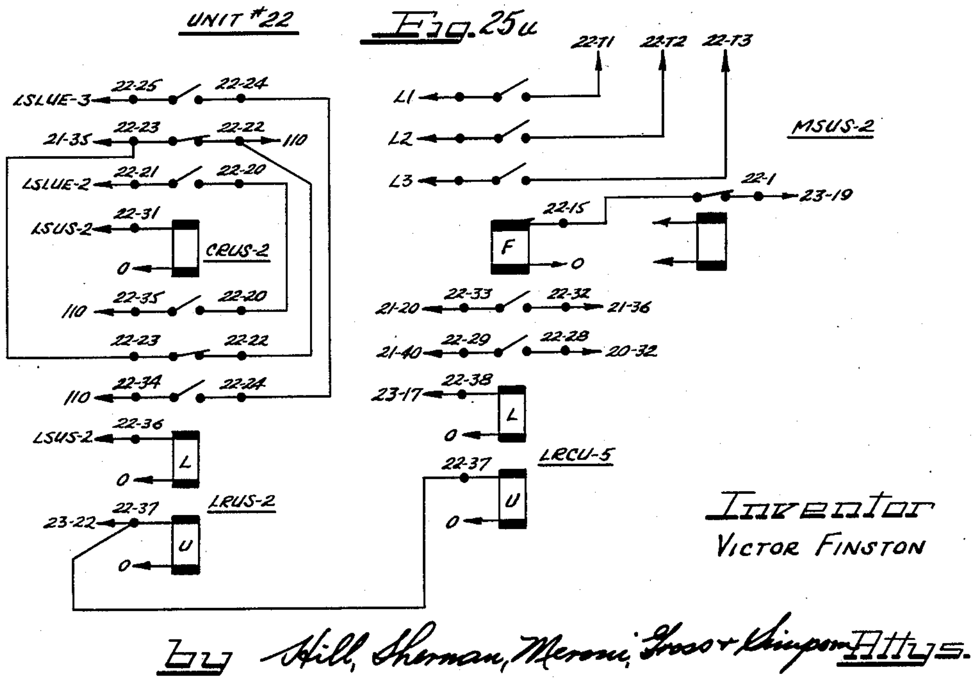
Inventor
VICTOR FINSTON
by Hill, Sherman, Meroni, Gross & Simpson Attys.

UNIT #23 Fig. 25v
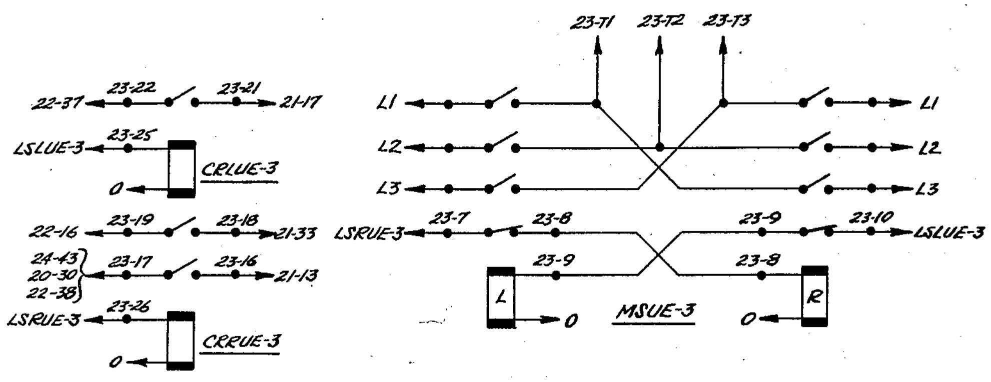
UNIT #24 Fig. 25w
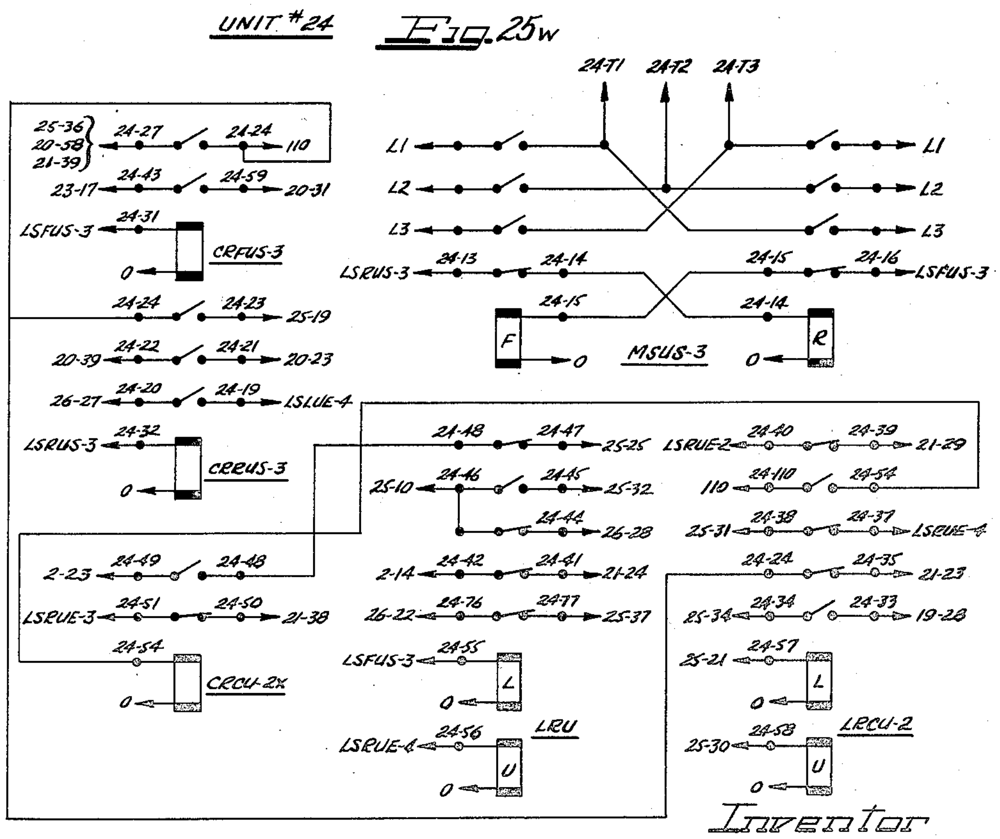
Inventor
Victor Finston
by Hill, Sherman, Meroni, Gross & Simpson Attys.

March 15, 1960 V. FINSTON 2,928,401
ELECTROPROCESSING APPARATUS
Filed June 15, 1955 29 Sheets-Sheet 28
UNIT #25 Fig. 25x
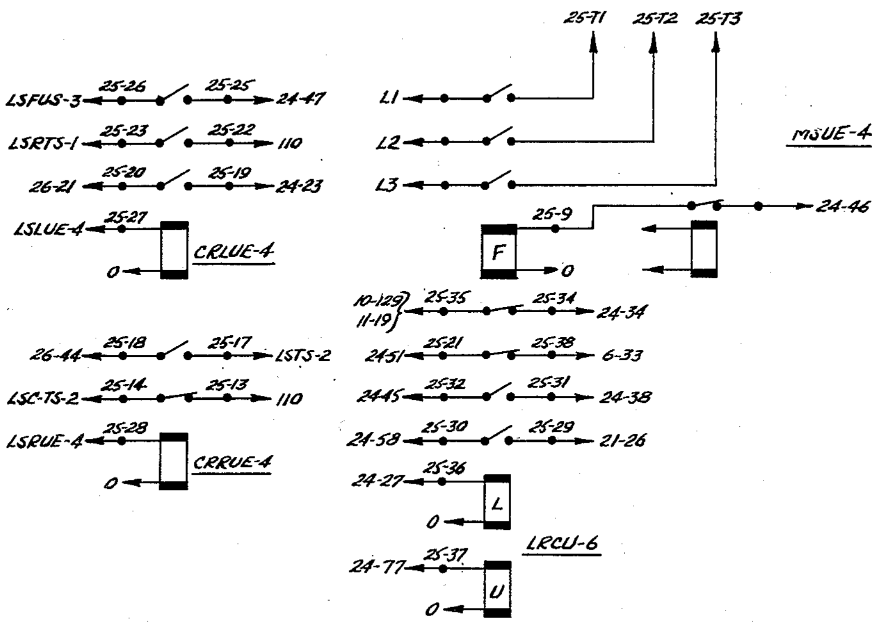
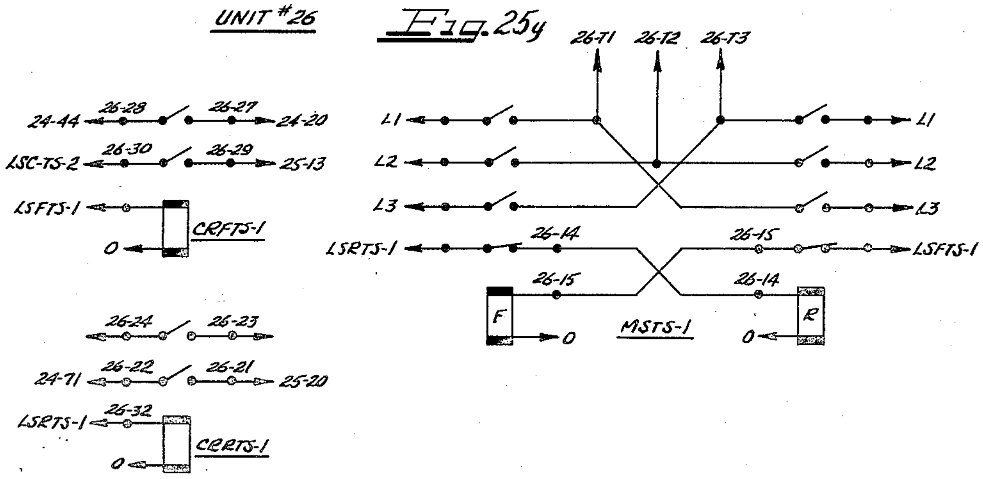
UNIT #26 Fig. 25y
Inventor
Victor Finston
by Hill, Sherman, Meroni, Gross & Simpson Attys.

UNIT #27 Fig. 25z
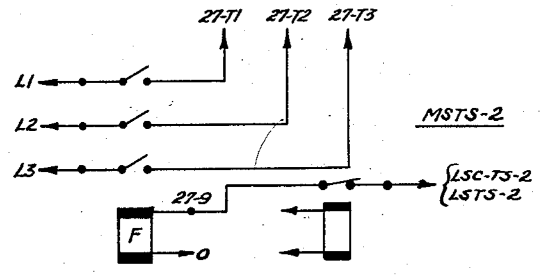
UNIT #28 Fig. 25zz
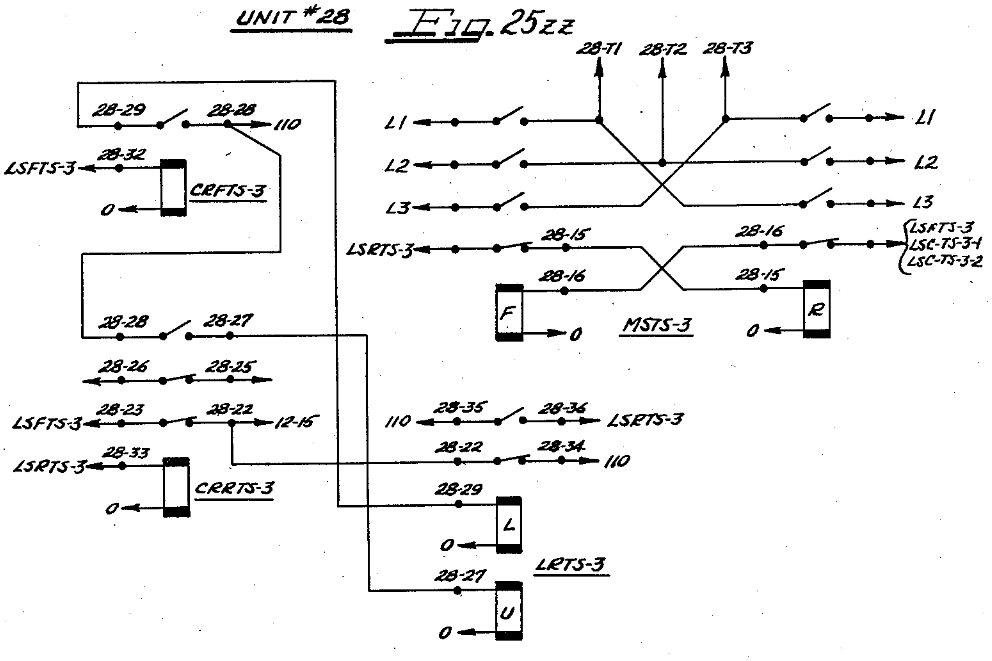
Inventor
VICTOR FINSTON
by Hill, Sherman, Meroni, Gross & Simpson Attys.

United States Patent Office 2,928,401

Patented Mar. 15, 1960

2,928,401

ELECTROPROCESSING APPARATUS

Victor Finston, Chicago, Ill., assignor to The Meaker Company, Chicago, Ill., a corporation of Illinois Application June 15, 1955, Serial No. 515,733

9 Claims. (Cl. 134—58)

This invention relates to conveying apparatus and particularly to such apparatus for an electroprocessing machine or the like.

In accordance with the present invention there is provided an electroprocessing machine which is fully automatic in operation and which provides for movement of work carriers to facilitate loading and unloading thereof as well as return of the work carriers to the load end of the machine from the unload end thereof.

It is therefore an important object of the present invention to provide a novel conveying apparatus adapted for use in conjunction with automatic processing machinery.

It is a further object of the present invention to provide novel loading and unloading apparatus for use in conjunction with processing machinery.

It is another object of the present invention to provide a novel work carrier return apparatus for electroprocessing machiney and the like.

It is still another object of the present invention to provide a novel electroprocessing machine having provision for loading and unloading and return of carriers as an integrated feature of the overall machine.

It is another and further object of the present invention to provide a novel electric control circuit for electroprocessing apparatus.

It is still another important object of the present invention to provide a novel electroprocessing machine and an electric control circuit therefor for automatically moving carriers through a loading station, various treatment baths, an unloading station and for returning the carriers from the unloading station to the load station for further cycling through the machine.

It is another object of the present invention to provide an automatic electroprocessing apparatus having provision for racking carriers preliminary to the closing down of the machine.

Other objects, features and advantages of the present invention will be readily apparent from the following detailed description of one specific embodiment thereof, disclosed by way of example, in conjunction with the accompanying drawings.

Figure 24A:
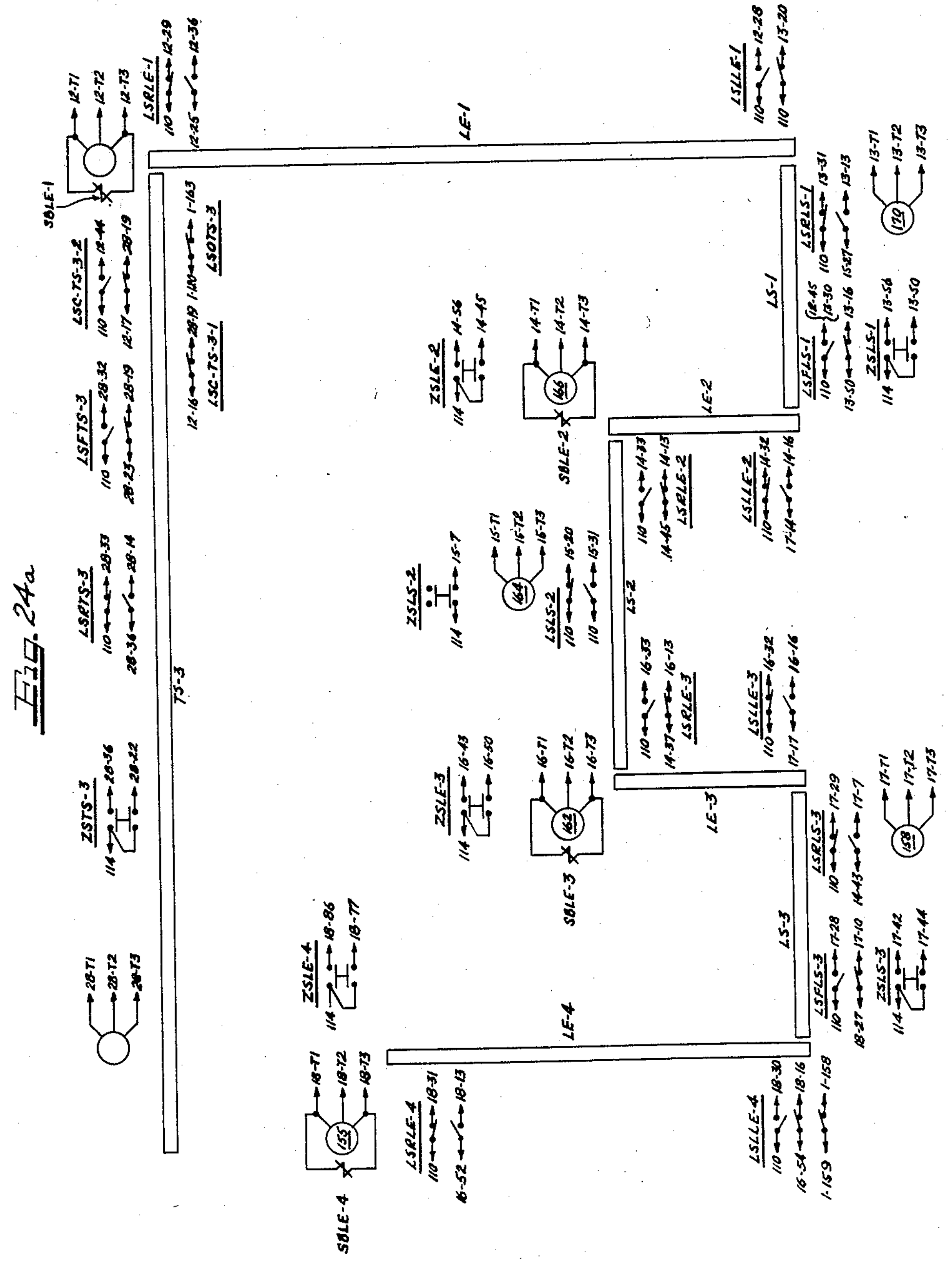
Figure 24B:
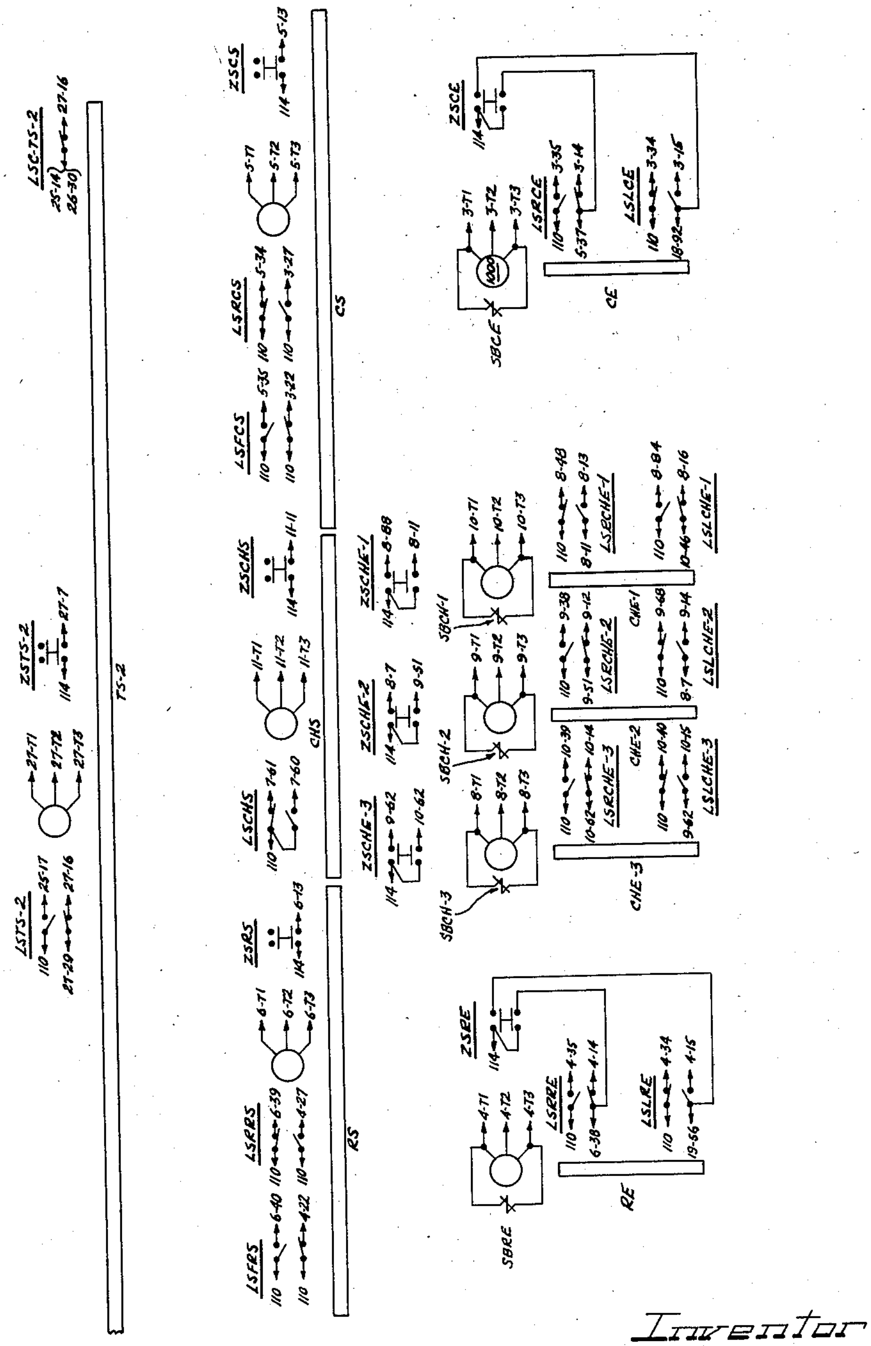
Figure 24C:
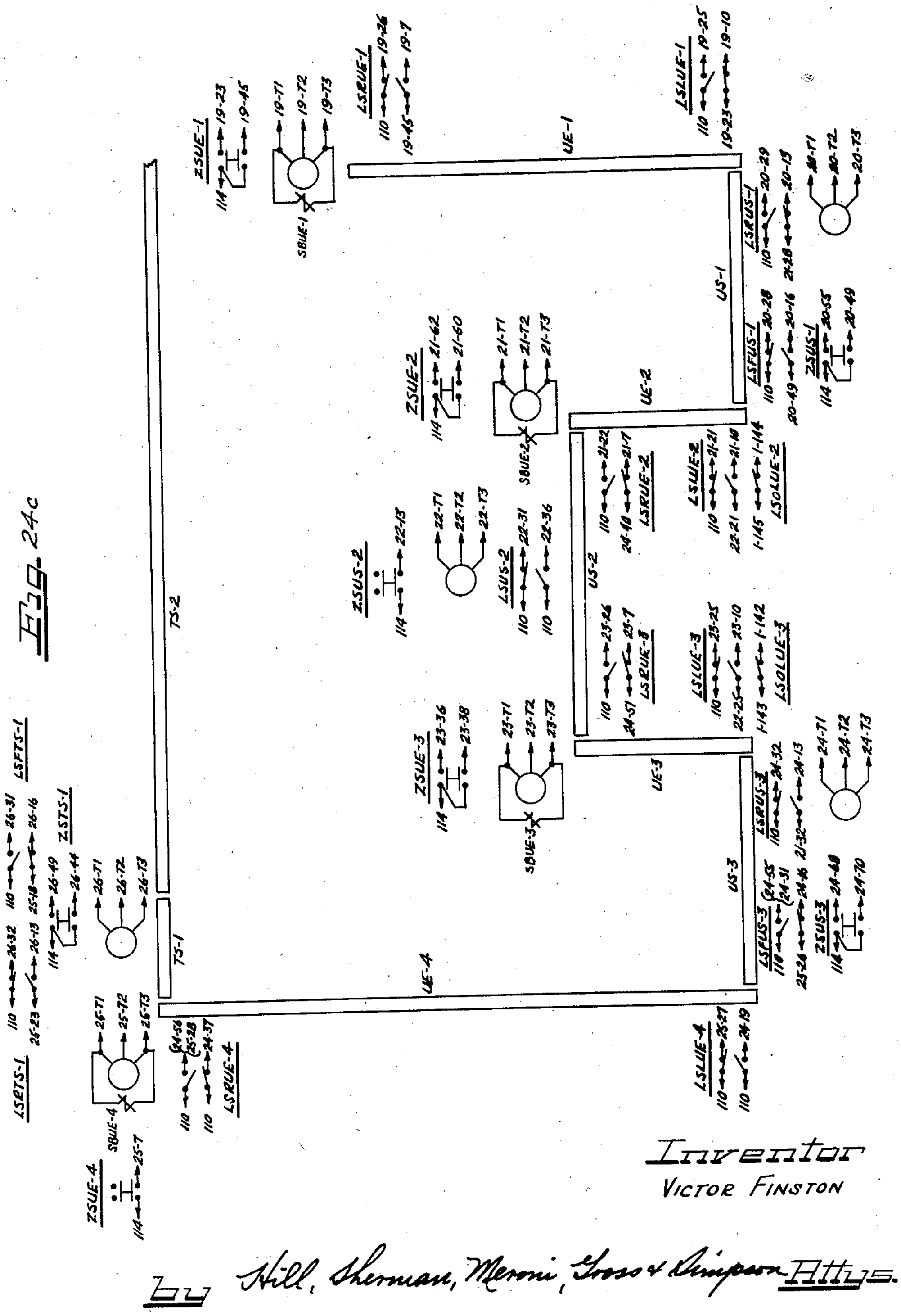
Figure 25L:
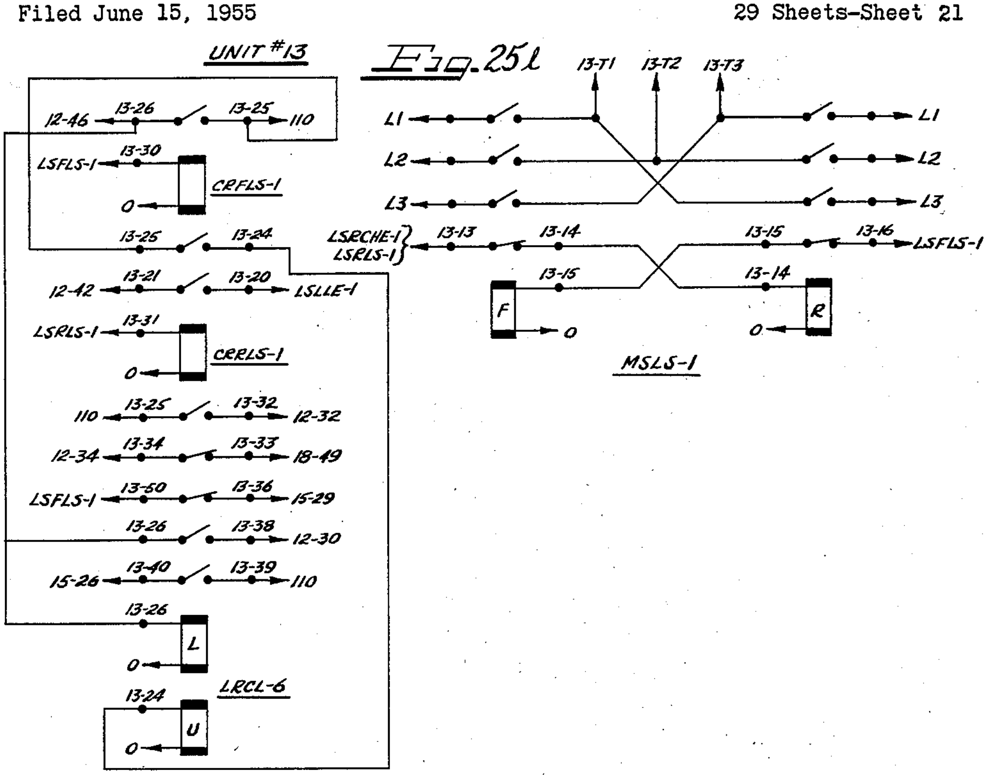
Figure 25M:
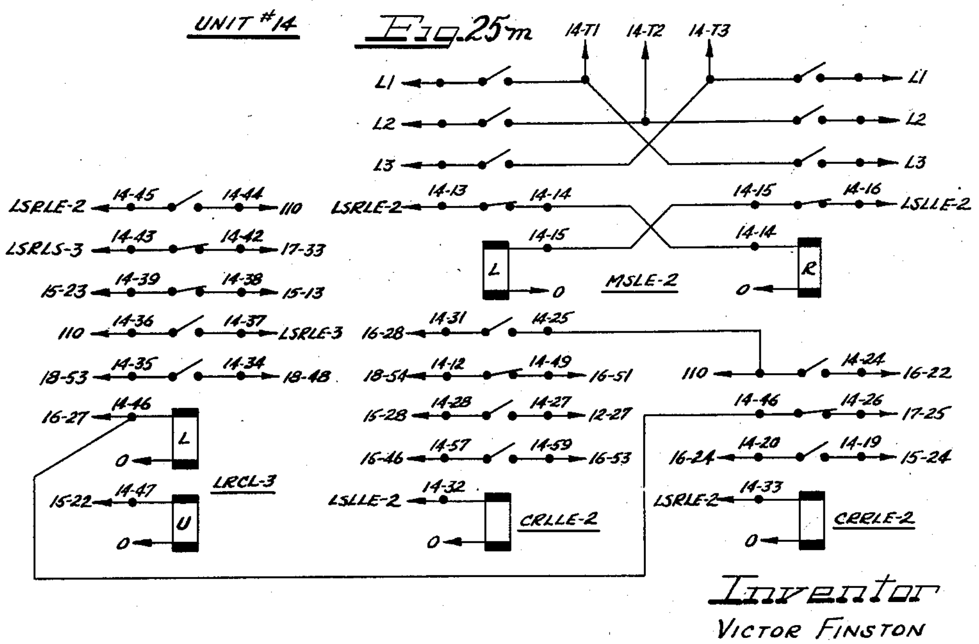

Figures 24*a*, 24*b* and 24*c* illustrate the arrangement of the limit switches schematically for the machine; and Figures 25*a* through 25*z* and Figure 25*zz* comprise the electric control circuit for automatic operation of the machine illustrated.

STRUCTURE OF MACHINE

*Overall arrangement and operation*

Figure 1:
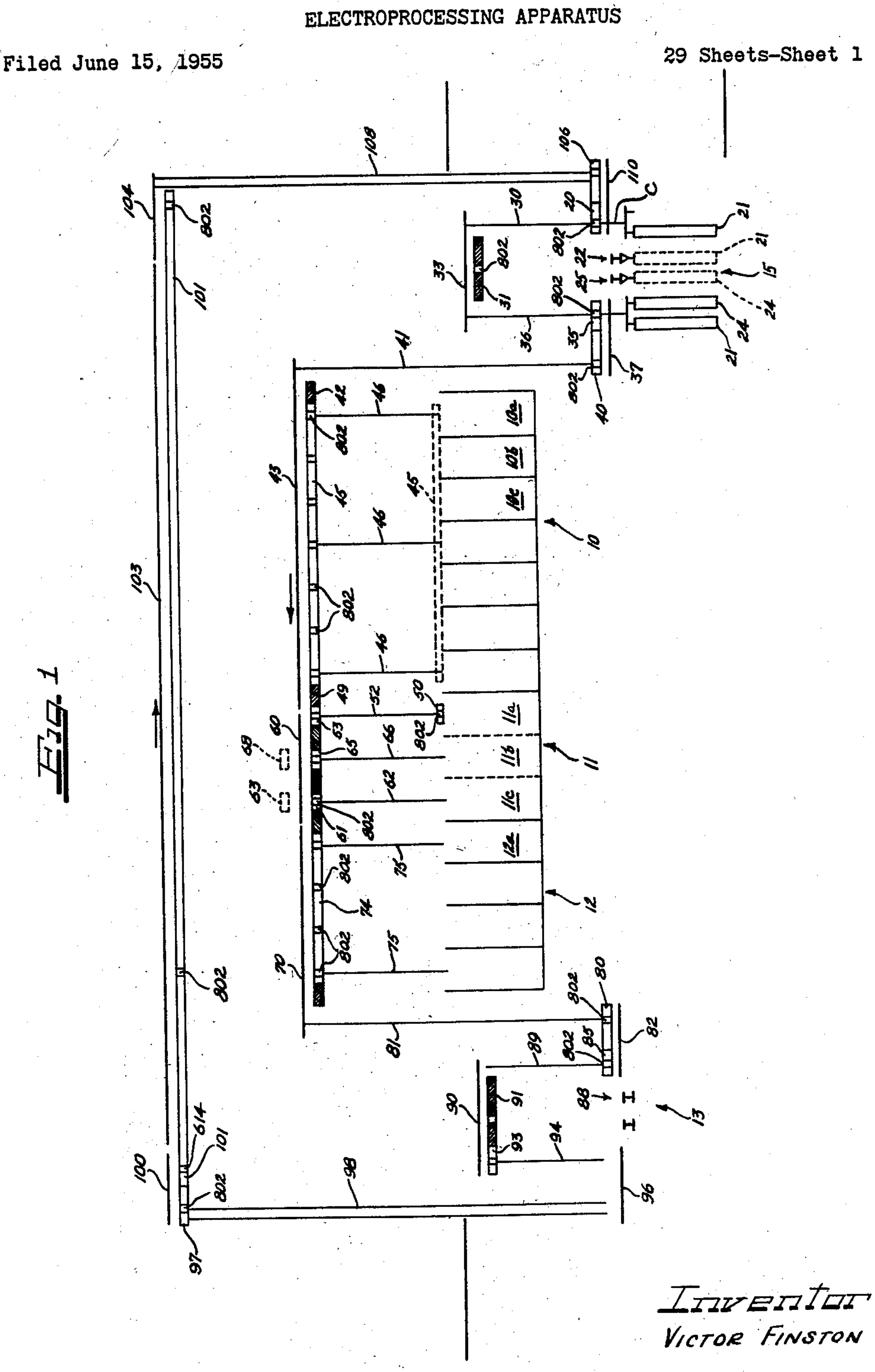
Figure 1 is a diagrammatic view illustrating the overall arrangement and operation of the illustrated electroprocessing machine.

As illustrated in Figure 1, the machine which is illustrated in the drawings as an embodiment of the present invention includes a series of cleaning baths indicated at 10, three plating baths indicated at 11 and rinse baths indicated at 12. The machine is constructed to move a series of work pieces to be treated into each of the cleaning baths in succession, then into one of the plating baths for a longer period of time, and then into each of the rinse baths. After a work carrier has had its work immersed in the last of the rinse baths, it is moved to an unload station indicated generally at 13 where the treated work is discharged. The carrier is then returned to the loading station indicated at 15 to receive further work to be treated.

At the loading station 15, a carrier C is positioned on #2 load elevator rail 20. Incoming work pieces such as indicated at 21 may be transported into the loading zone 15 by any suitable means such as overhead conveyor 22 and be loaded on the carrier. In accordance with the present invention, when the carrier C is at the position mentioned, half of the work load is applied thereto, and the carrier is then transported to the other side of the loading station 15 to receive the other half of its work load indicated at 24 which is transported into the loading station 15 by means of a further suitable conveyor 25. Thus, after half the work is loaded on the carrier, #2 load elevator rail 20 is raised by the #2 vertical screw shaft indicated diagrammatically at 30. Thereafter, the carrier is transported along #2 load shuttle rail 31 by means of the #2 load shuttle indicated diagrammatically at 33. The carrier is now lowered into its second loading position by means of #3 load elevator rail 35 which is movable by means of a vertical screw shaft 36. When the second half of the load is assembled with the carrier, the carrier is shifted horizontally by means of #3 load shuttle 37. The #4 load elevator rail 40 receives the carrier from #3 elevator rail 35 and is then raised by #4 vertical screw shaft 41 to the upper position of elevator rail 40.

From this point, the fully loaded carrier is advanced across fixed rail section 42 to a position over the #1 cleaning tank 10*a* by means of clean shuttle 43. Clean shuttle rail 45 is then lowered by means of screw shafts 46 to the dotted position to immerse all the carriers thereon in the corresponding clean tanks. When clean elevator rail 45 is again raised, the clean shuttle 43 is again advanced to transport the loaded carrier to a position over the next succeeding clean tank 10*b* and simultaneously to advance a carrier from the #4 load elevator rail 40 to a position over the tank 10*a*. The two carriers are then simultaneously lowered into the respective tanks 10*a* and 10*b*, raised again and shifted horizontally to overlie the clean tanks 10*b* and 10*c* respectively, while a further carrier is moved to a position over the tank 10*a*. This sequence of operation continues until a carrier has been transported through each of the clean tanks in succession and is ready for transfer to the plating section of the machine.

Upon the next advance of the clean shuttle 43, the first carrier is transferred across fixed rail section 49 and onto #1 chrome elevator rail 50 (shown in lowered position in Figure 1). The #1 chrome elevator rail 50 is then individually lowered by means of a #1 vertical screw shaft 52 to immerse the work in the plating tank 11*a*. As the rail 50 is lowered a replacement rail 53 moves by gravity into a position to fill the gap left by the rail 50.

Upon the next cycle of the clean section, a carrier is advanced by the clean shuttle into a position on the replacement track section 53. The chrome shuttle 60 now indexes twice to move the second carrier onto the #3 elevator rail 61 after which the rail 61 is lowered to immerse a work unit in tank 11*c* by means of the vertical screw shaft 62 and replaced by a replacement track section indicated diagrammatically at 63 in inoperative position clear of the incoming carrier.

Upon a further advance of the clean shuttle, the third carrier is moved onto replacement track 53 and then advanced by the chrome shuttle 60 to #2 elevator track 65 which is then lowered by means of #2 vertical screw shaft 66 and replaced by track section 68.

On the next cycle, the first carrier is raised by #1 elevator track 50, and chrome shuttle 60 indexes twice. When the clean shuttle is advanced to move the fourth carrier onto the #1 elevator rail 50, rinse shuttle 70 also advances to move the outgoing first carrier into the rinse section 12. The #1 elevator shaft 52 now operates to lower rail 50 to immerse the work of the fourth carrier, and the rinse elevator rail 74 is also lowered by means of rinse elevator screw shafts 75 to immerse the work of the first carrier in the rinse tank 12*a*.

Previous to the next advance of the clean and rinse shuttles, #3 chrome elevator rail 61 is raised to raise the second carrier. The clean shuttle 43 now advances a fifth carrier onto replacement section 53 and the rinse shuttle 70 moves the outgoing second carrier to a position over tank 12*a*. Chrome shuttle 60 next indexes twice to move the incoming fifth carrier across replacement section 68 and onto #3 elevator rail 61. The #3 elevator track 61 is now lowered to immerse the work of the fifth carrier in tank 11*c*.

On the next cycle, the #2 elevator track 65 is raised previous to the advance of the clean and rinse shuttles. The chrome shuttle then advances to move the outgoing third carrier to replacement track section 63. The clean and rinse shuttles then advance to move the outgoing third carrier to the rinse section and to move an incoming sixth carrier to replacement section 53. The chrome shuttle then advances to move the incoming sixth carrier to #2 elevator track 65, and the #2 elevator is lowered. Thereafter the #1 elevator is raised and cycling continues as a repetition of the previously described sequence of operations.

When the first carrier is advanced onto the #1 unload elevator rail 80, the unload elevator screw shaft 81 lowers the rail 80 to the position shown in Figure 1, after which #1 unload shuttle 82 moves the carrier onto the #2 unload elevator rail 85. At this point the portion of the work designated by reference numeral 21 at the load station is removed from the carrier and transported from the unload station 13 by means of a conveyor 88. Unload elevator rail #2 is then raised by screw shaft 89, and #2 unload shuttle 90 is advanced to move the carrier along fixed rail 91 and onto #3 unload elevator rail 93. Vertical screw shaft 94 is rotated to lower rail 93 to a lower unload position for unloading the other half of the work load designated 24. Unload shuttle #3, designated by reference numeral 96, is then advanced to move the work carrier onto #4 unload elevator rail 97 which is then raised by means of double chain 98.

Transfer shuttle #1 indicated at 100 is now advanced to move the carrier onto return track 101. Transfer shuttle #2 designated by reference numeral 103 then engages the carrier and moves it to transfer shuttle #3, designated 104, which in turn delivers it to #1 load elevator rail 106. Rail 106 is lowered by means of double chain 108, and the empty carrier is moved by load shuttle 110 from rail 106 to rail 20 to be recycled through the machine.

*Load and unload structure*

Figure 2:
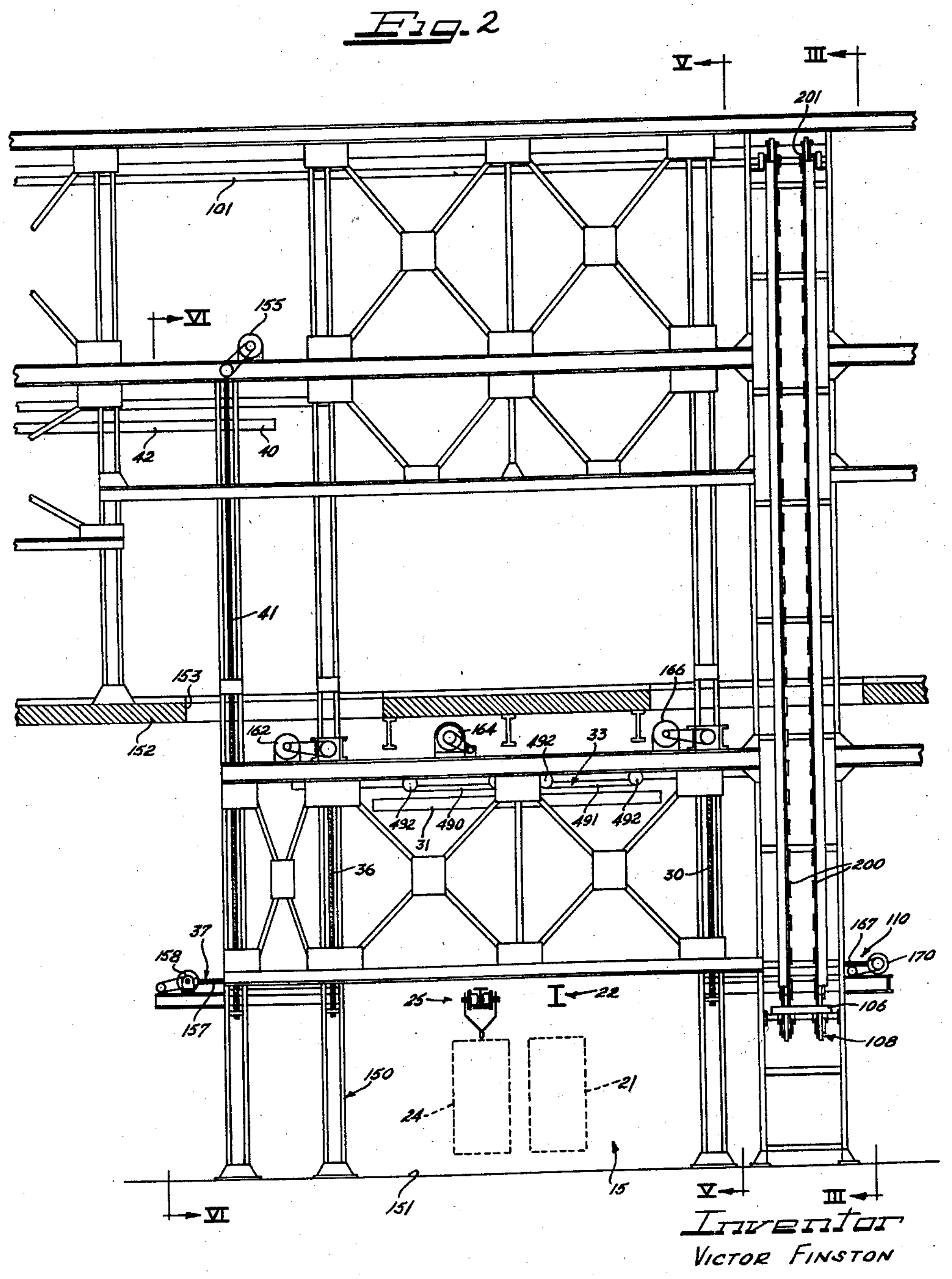
Figure 2 is a fragmentary side elevational view illustrating the structure at the load end of the machine.

As seen in Figure 2, the load section of the machine which may be designated generally by the reference numeral 15 includes a frame work 150 extending from a floor level 151 through a floor 152 at suitable openings 153 therethrough. As seen in Figure 2, vertical screw shaft 41 of load elevator #4 is driven by a motor 155; horizontal screw shaft 157 of load shuttle #3 is driven by a motor 158; #3 load elevator vertical shaft 36 is driven by a motor 162, #2 load shuttle 33 is driven by a motor 164; #2 load elevator vertical shaft 30 is driven by a motor 166; and horizontal threaded shaft 167 of #1 load shuttle 110 is driven by a motor 170.

Figures 3, 4:
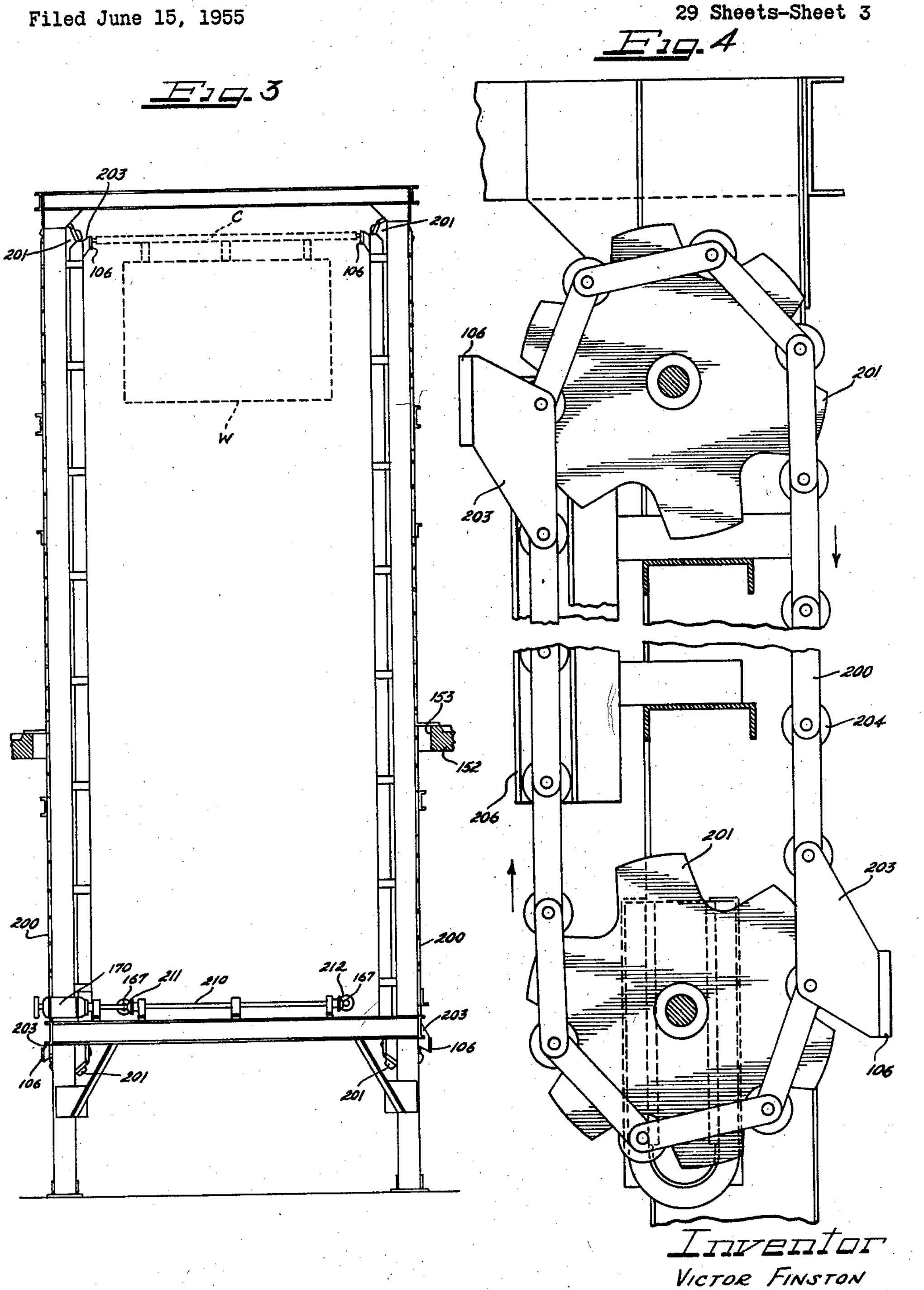
Figure 3 is an end elevational view looking in the direction of the arrows III—III in Figure 2.
Figure 4 is an enlarged fragmentary elevational view of the #1 load elevator structure.

As seen in Figures 2, 3 and 4, the chain elevator 108 for the #1 load elevator comprises a set of double chains 200 at the front and rear of the machine on sprockets 201. The rails 106 are mounted by means of arms 203 secured to the chains. The chains carry rollers 204, two of which are secured at points on the arm 203 so as to support the carriers. The rollers are guided by means of channels 206 during upward movement thereof. As seen in Figure 2, the rails 106 each extends horizontally between an adjacent pair of chains 200. Figure 3 illustrates in dotted outline the manner in which the carriers C with their suspended work W span between a cooperating pair of rails 106.

Figure 5:
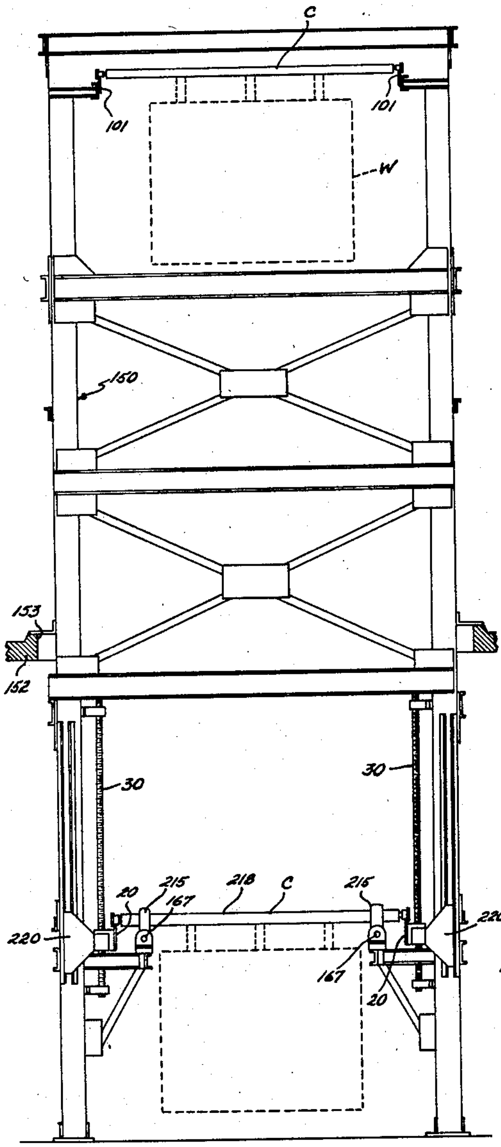
Figure 5 is a vertical cross sectional view taken generally along the line V—V of Figure 2.

Figure 3 illustrates the manner in which the motor 170 drives screw shafts 167 of load shuttle #1 by means of a shaft 210 and beveled gearing such as indicated at 211 and 212. As seen in Figure 5, load shuttle #1, as well as load shuttle #3 and unload shuttles #1 and #3 which are similar, have their horizontal screw shafts such as 167 engaging nut members 215 which in turn engage a wear bar 218 of the carrier C for moving the carrier in the desired manner. The screw shafts must be rotated in the opposite direction to return the nut members after each operation thereof.

As shown in Figure 5, load elevator #2 comprises mounting members 220 guided for vertical reciprocation by any suitable means and which carry the tracks 20 and are engaged by the vertical screw shafts 30 to raise and lower the tracks.

Figure 6:
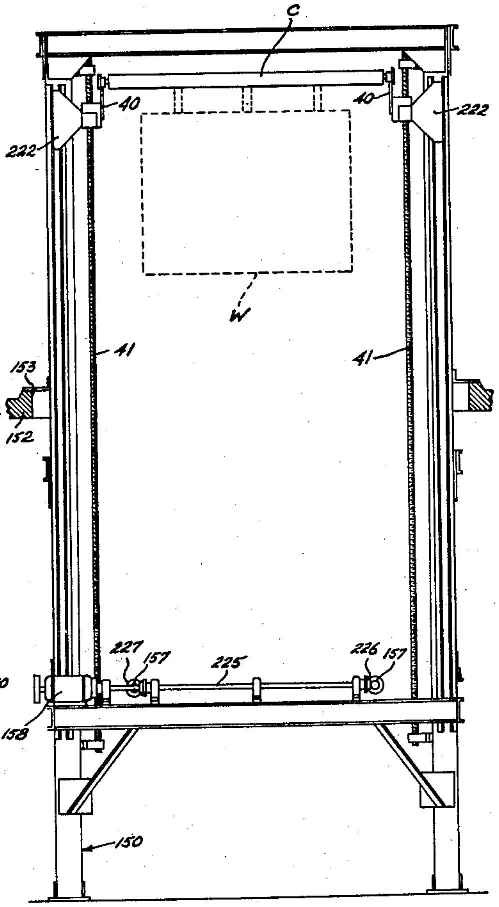
Figure 6 is a vertical sectional view taken generally along the line VI—VI of Figure 2.

Similarly, as seen in Figure 6, load elevator #4 includes mounting members 222 guided for vertical reciprocation and carrying the tracks 40, the mountings 222 being engaged by the vertical threaded shafts 41 to raise and lower the carriers. Figure 6 also indicates that the #3 load shuttle horizontal threaded shafts 157 are driven from the motor 158 by means of a common shaft 225 and beveled gearing 226 and 227.

It will be apparent that the load and unload ends are entirely complementary so that the description of the load end will make the structure of the unload end equally apparent. Further, it will be appreciated that load elevator #3 and unload elevators #2 and #3 are entirely similar to load elevator #2, best seen in Figure 5. Also unload elevator #4 is similar in structure to load elevator #1, and unload elevator #1 is identical in structure to load elevator #4 seen in Figure 6. Unload shuttles #1, #2 and #3 correspond to load shuttles #3, #2 and #1. Unload shuttle #2 and load shuttle #2 are of the walking beam type wherein a set of outer beams advances during one indexting movement while a set of inner beams are retracted, and on the next indexing movement, the outer beams are retracted and the inner ones advanced, the respective sets of beams being connected to loop chain drives 490 and 491 shown in Figure 2. The structure of these conveyors is similar to the structure of the chrome plating shuttle 60 and their construction will be apparent from the description of the chrome shuttle.

*Clean plating and rise sections*

Figure 7:
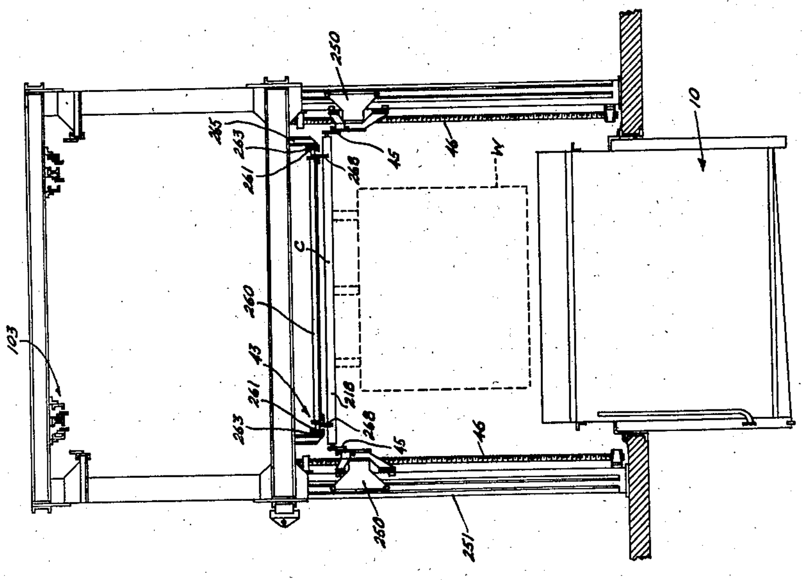
Figure 7 is a cross sectional view in the cleaning section of the machine.
Figure 10:
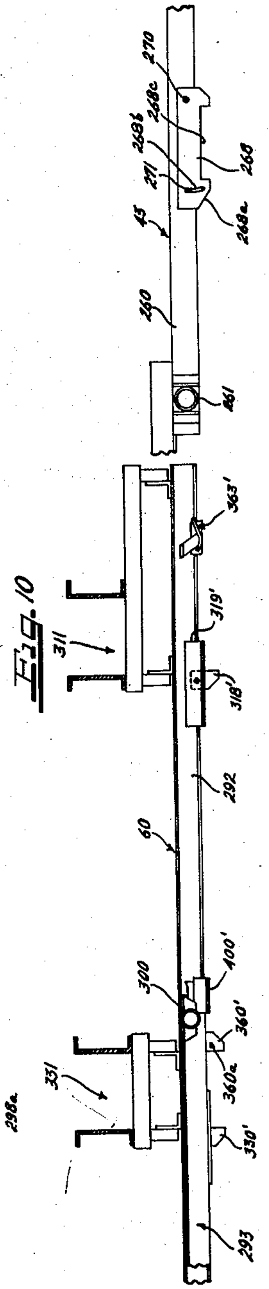
Figure 10 is a fragmentary longitudinal sectional view taken generally along the line X—X of Figure 9.

Referring to Figure 7, it will be observed that the clean elevator comprises mounting arms 250 mounted for vertical reciprocation on frame uprights 251 and carrying the clean elevator rail 45 and threadedly engaged with the vertical screw shaft 46. The conveyor for the clean shuttle 43 is of the reciprocating pusher type. The clean shuttle 43 comprises a movable frame 260 carrying rollers 261 riding in fixed channels 263 at the opposite lateral sides of the series of cleaning tanks 10. The tracks 263 are suspended by means of hangers 265 from the framework 251. The frame 260 carries latching lugs 268 at each side thereof for engaging the carrier wear bar 218 to move the carrier along the tracks 45. It will be understood that the clean shuttle 43 may be retracted while the tracks 45 are in lowered position so that the latching lugs 268 will be disengaged from the carrier wear bar 218 during retraction of the shuttle 43. The latching lugs 268 are preferably arranged so that in the returned position of the shuttle 43 the carrier wear bar 218 will be disposed immediately in front of respective sets of lugs 268. As seen in Figure 10, the latching lugs 268 preferably have a forward cam face **268*a* for causing the lug 268 to be pivoted on its pin 270 as the shuttle is advanced, a pin 271 in a slot 268*b* of the lug limiting the upward pivoting movement of the latching lug 268. When the front part of the lug has traveled over the carrier wear bar 218, the lug pivots downwardly to retain the wear bar within the recess 268*c* thereof. The shuttle 43 preferably returns to a position such that the leading cam face 268*a* is behind a carrier wear bar 218** when the carrier is raised, so that as the clean shuttle is advanced, the above action takes place before the carrier starts to move with the shuttle.

Figure 8:
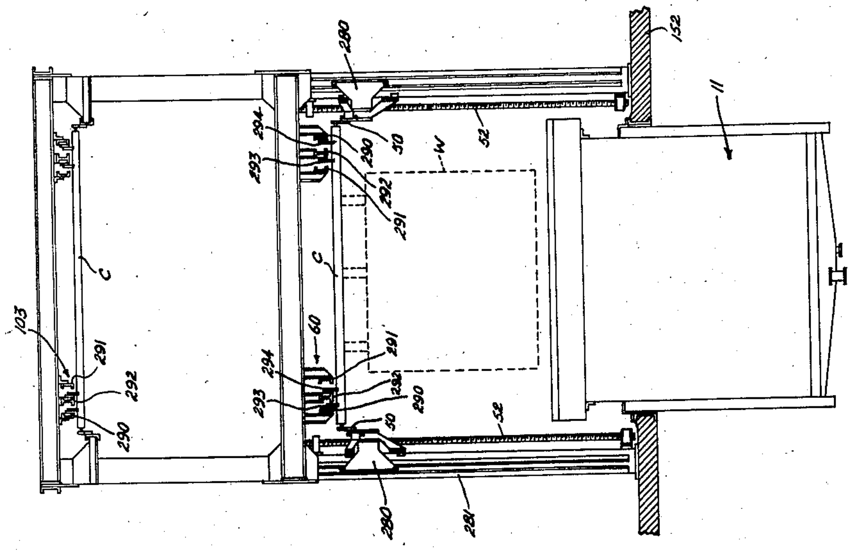
Figure 8 is a cross-sectional view in the chrome plating section of the machine.

Referring now to Figure 8, it will be observed that each plating elevator such as that associated with the #1 vertical screw shaft 52 in Figure 1 includes a mounting arm 280 constrained for vertical reciprocation on an associated vertical column 281. The vertical screw shafts 52 are threadedly engaged with the mounting arms 280 for raising and lowering the individually movable track sections such as 50.

Figure 11:
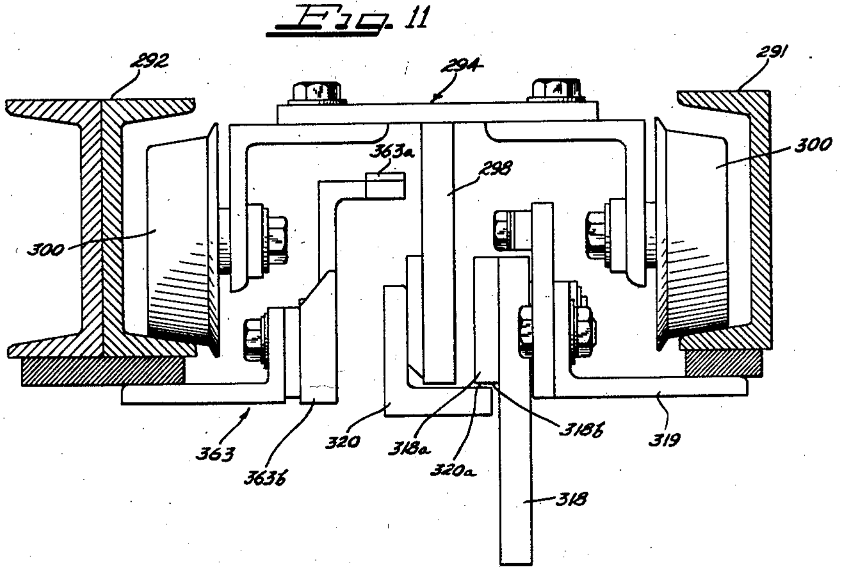
Figure 11 is a cross-sectional view on an enlarged scale taken along the line XI—XI of Figure 9.
Figure 12:
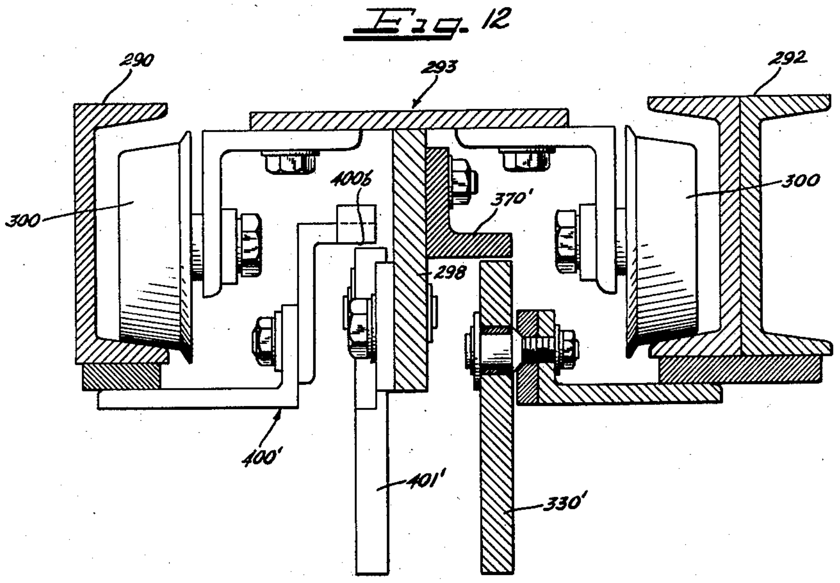
Figure 12 is an enlarged fragmentary cross-sectional view taken generally along the line XII—XII of Figure 9.

As seen in Figure 8 and in enlarged detail in Figures 11 and 12, the chrome shuttle section on each side of the plating tanks 11 is mounted by means of an outer channel 290, an inner channel 291 and an intermediate double channel 292. These members define inner and outer tracks for a walking beam type conveyor including moving beam sections 293 and 294 at each side of the series of tanks. Each of the beam members comprises an elongated T-sectioned member 298 having rollers 300 carried thereby and riding in the respective channels.

Figure 9:
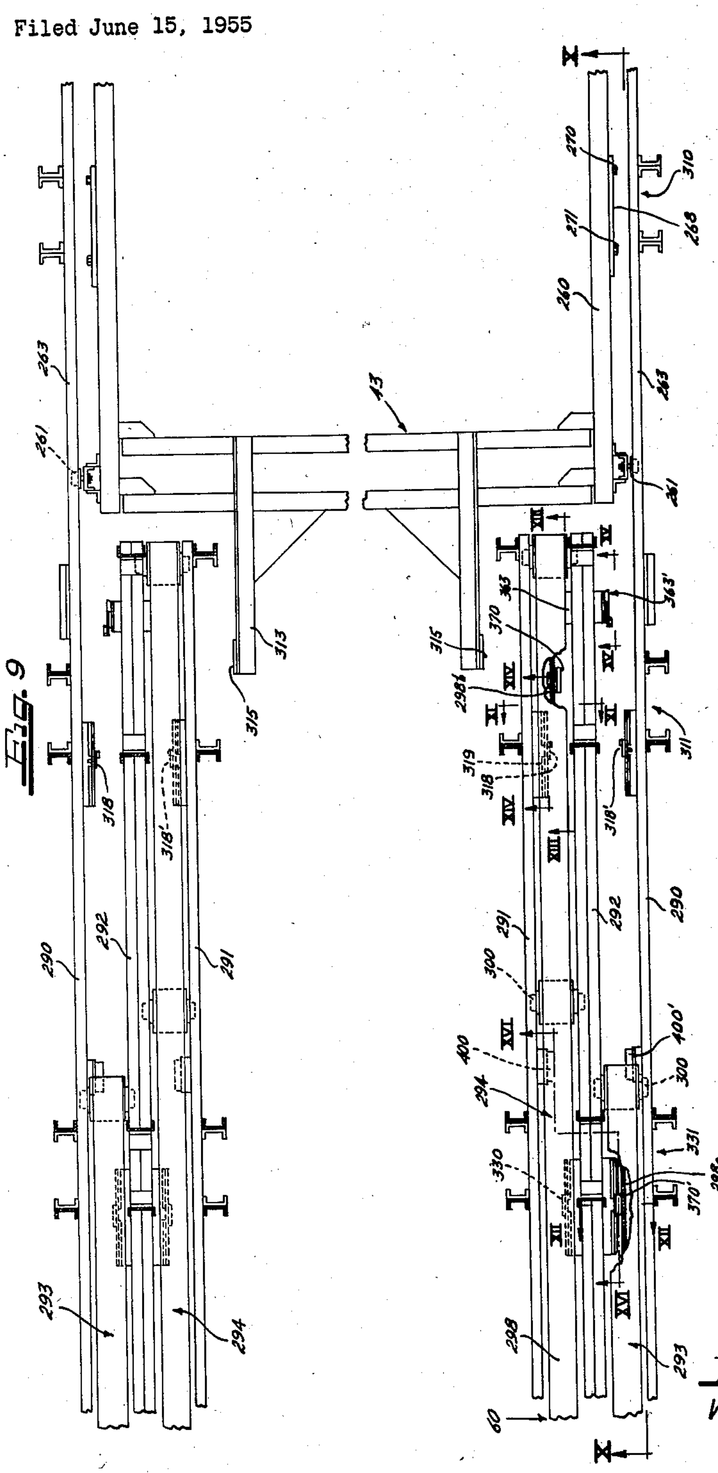
Figure 9 is a fragmentary plan view illustrating the transition from the cleaning conveyor to the plating conveyor of the machine.

Figures 9 and 10 illustrate the manner in which carriers are transferred from the cleaning shuttle 43 to the plating shuttle 60 and the detailed structure of the plating shuttle will be apparent from the description of these figures. In moving carriers from the last cleaning station indicated at 310 in Figure 9 to the first plating station indicated at 311, an inner extension frame portion 313 of the clean shuttle 43 is utilized which fits within the plating shuttle structure. This inner extension 313 carries a pair of fixed pusher lugs 315 for engaging behind the wear bar 218 of a carrier and advancing it from station 310 to station 311. As seen in Figures 9, 11, 13 and 14, stop lugs 318 are mounted by means of brackets 319 on the fixed tracks 291 at the outer sides thereof. Complementary stop members 318' are located on the inner sides of outer tracks 290. As seen in Figure 11, the walking beam member 294 carries an angle bracket 320 which underlies a projection **318*a* on the stop 318 in the position of the walking beam shown in Figure 9 to prevent pivoting of the stop lug 318 and thus to positively position the carrier at station 311. When the walking beam has indexed so that the outer beam members 293 are in retracted position and the inner beam members 294 are advanced, then the corresponding bracket of beam member 293 underlies a projection on the stop lug 318' to prevent pivoting thereof and positively position an incoming carrier. Stop lugs such as 330 at station 331 operate to positively position an advancing carrier over the second plating cell 116. To provide needed clearances, the stop lugs 318 and 330 are on opposite sides of the shuttle beam 294. Thus, the stop lug 330 is secured on the inner side of the central I-beam 292 as seen in Figure 9. Similarly, the stop lug 330' for the outer shuttle beam 293 is on the outer side of the central I-beam 292**, as seen in Figure 12.

Figure 13:
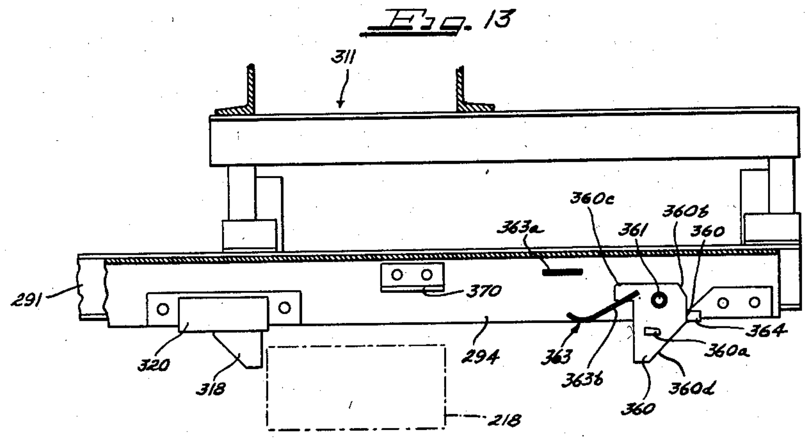
Figure 13 is a fragmentary enlarged longitudinal sectional view taken generally along the line XIII—XIII of Figure 9.
Figure 14:
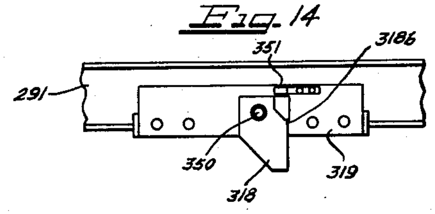
Figure 14 is a fragmentary longitudinal sectional view taken generally along the line XIV—XIV of Figure 9.

Referring now to Figures 11 and 14, it will be observed that the projections **318*a* of stops 318 have surfaces 318*b* which are extended horizontally in the direction of movement of the shuttle. Upper surfaces 320*a* of actuating bracket 320 closely underlies this extended surface 318*b* to prevent pivoting of the stop lug 318 on its pivot shaft 350 (Figure 14) when the stop actuator 320 is in stop actuating position. Limit plate 351, Figure 14, limits clockwise pivoting of stop 318 as a carrier travels thereunder during advance of a carrier from station 311 to station 331. Referring to Figure 13, it will be understood that actuator 320 on shuttle beam 294 has moved out of actuating position relative to stop 318 by the time pusher lug 360 has moved into engagement with the carrier wear bar 218 at station 311**.

Figure 16:
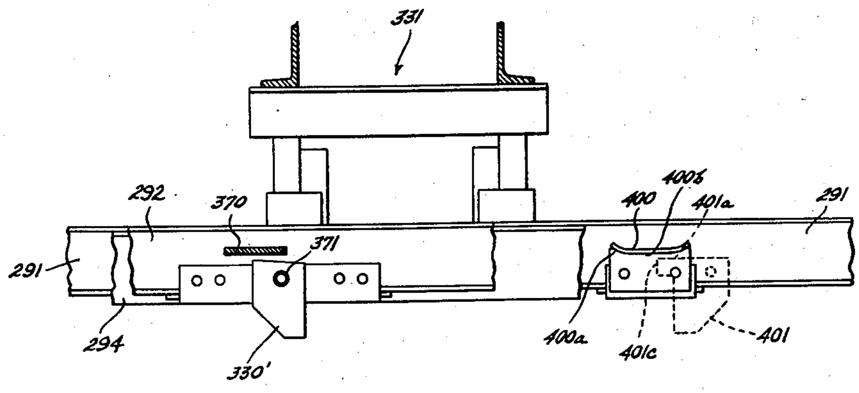
Figure 16 is a fragmentary longitudinal sectional view taken generally along the line XVI—XVI of Figure 9.

Figures 12 and 16 illustrate the manner in which a stop actuator 370' on shuttle beam 293 limits the pivotal movement of the stop lug 330' on its pivot shaft 371.

As seen in Figure 13, the first pusher lugs such as 360 on the walking beam 294 are pivotally mounted on pins 361 and have projecting lugs **360*a*** for engagement by cam brackets such as 363 which is carried on the central double channel 292 at the inner side thereof. It will be observed that if the pusher lug 360 is in its extreme clockwise pivoted position such that a rear surface 360*b* rests against its stop 364, as the shuttle beam 294 travels rearwardly, a top nose portion 360*c* of lug 360 will engage a leading cam face 363*a* (Figs. 13 and 15) to pivot the pusher lug into its operative position. Similarly, upon forward travel of the pusher lug, the rear cam surface 363*b* assures that the pusher lug will be in operative position to engage the carrier C at station 311. It will be observed that in the pivoted position of the pusher lug, the lower surface 360*d* clears the top of the carrier wear bar 218 so as not to interfere with movement of the carrier into position at station 311 against the stop 318 which is carried by the inner track 291. The cam bracket 363′ seen adjacent station 311 in Figure 10 and shown also in Figures 9 and 15 carried by the center rail 292 on the outer side thereof, functions in an entirely analogous manner with respect to the pusher lug 360′ carried at the inner side of the outer shuttle beam 293.

Figure 16 illustrates a cam bracket 400 for cooperating with the second and third pushers 401 and 402. In this case, the leading edge of the cam bracket 400*a* cooperates with a surface 401*a* of the pusher lug for returning the pusher lug to normal operative position after the pusher lug has been pivoted in the clockwise direction in traveling over a carrier. It will be observed that the under-surface 400*b* of the cam bracket at all times overlies the extension portion 401*c* of the pusher lug so that the pusher lug can not be pivoted out of its operative position once it has been pivoted into its operative position by the leading cam edge 400*a*.

It will be appreciated by those skilled in the art that the #2 load and unload shuttles 33 and 90, and the #2 transfer shuttle 103 may operate on the walking beam principle illustrated in Figures 9 to 16 and have the same structure as for the second and third pusher lugs 401 and 402, so that their structure will be readily understood from the foregoing description. Each of the walking beam shuttles thus includes an outer walking beam such as 293, an inner walking beam such as 294, a number of pivoted pusher lugs such as 401 disposed on alternate sides of each beam and having a spacing equal to the spacing between stations of the conveyor and pivotal in the retracting direction to ride over a carrier, but prevented from pivoting as the walking beam moves forwardly by a limit stop such as 364 in Figure 13 to move the carrier along with the walking beam. The shuttles also include pivotal stop members mounted on the tracks and cooperating with stop actuators such as 370′ in Figure 12 on the walking beams in such a manner that as the pusher lug of the advancing shuttle moves a carrier into a given conveyor position, the stop actuator for that walking beam moves into operative position to a stop lug to prevent pivoting of that stop lug and thereby to require accurate positioning of the carrier and to prevent coasting thereof past the station. The actuator for each pusher lug is on the same side of the walking beam as the pusher lug but spaced ahead of the pusher lug by the width of the carrier wear bar. As a walking beam moves rearwardly, each pusher lug moves rearwardly and pivots to ride over a carrier being moved forwardly by the advancing walking beam, after which the pusher lug is positively moved into operative position by the cam brackets such as 400 in Figure 16. In retracted position each pusher lug is spaced a substantial distance as indicated in Figure 13 from the wear bar 218 at the adjacent station which is about to be advanced thereby.

The drive for each walking beam shuttle is indicated in Figure 2 for conveyor 33 and comprises a pair of endless chain loops 490 and 491 passing over spaced sprocket wheels 492. A sprocket wheel for each loop is driven to move the chain loops in unison to index the conveyor, one chain loop having a linkage arm connected to the outer walking beams such as 293 and the other chain loop being connected to the inner walking beams such as 294. The linkage arms are so connected to the loops as to advance the outer beams while the inner beams are retracting and the reverse.

The #1 transfer shuttle 100 indicated in Figure 1 may comprise a reciprocating shuttle bar mounted in guide tracks on each side of the machine and inwardly of the dual tracks for the walking beam type shuttle 103. The shuttle bar may have a single fixed pusher lug at the rear end thereof for travel from a position behind the carrier on the load elevator rail 97 to a position corresponding to the carrier positioning lock 614 in Figure 1. Since the shuttle bar returns while the load elevator rail 97 is in its lowered position, there is no need for the pusher lug to be pivotal on the shuttle beam. The shuttle beam is reciprocated by means of an endless chain loop such as illustrated at 490 in Figure 2 with an actuating arm pivotally connected to a link of the chain and pivotally connected to the shuttle bar so that as the chain travels around spaced sprocket wheels, the shuttle bar moves forwardly then rearwardly. A stop actuator is carried on the shuttle beam on the same side as the fixed pusher lug and spaced ahead of the pusher lug the width of the carrier wear bar so as to actuate a stop carried by the track for the shuttle in the same manner as illustrated in Figures 12 and 16 for the stop 330′, and actuator 370.

The #3 transfer shuttle 104 may comprise a single walking beam type shuttle member such as 294 mounted for reciprocation in a pair of tracks at each side of the machine and inwardly of the dual tracks for the #2 transfer shuttle 103. The pusher lugs may be similar to the pusher lugs 401 of the plating shuttle and are mounted on alternate sides of the beam as in the previous conveyors with stop actuators spaced ahead of each pusher the width of the carrier wear bar to operate stops such as indicated at 330′ in Figure 16. The pusher lugs are of course pivotal so that on the retracting stroke of the shuttle beam, the lugs pivot and ride over the wear bar of a carrier disposed at a given station. Thereafter, upon advance of the shuttle beam, the pusher lug is prevented from pivoting in the opposite direction and thus advances the carrier to the next station.

Referring to Figures 17 to 21, wherein the transfer from the chrome plating shuttle 60 to the rinse shuttle 70 is illustrated, it will be observed that when the outer walking beam 293 of the plating shuttle 60 is advanced, a carrier is advanced to the last plating section station 500 from which the carrier is moved by means of the rinse shuttle 70.

Figure 17:
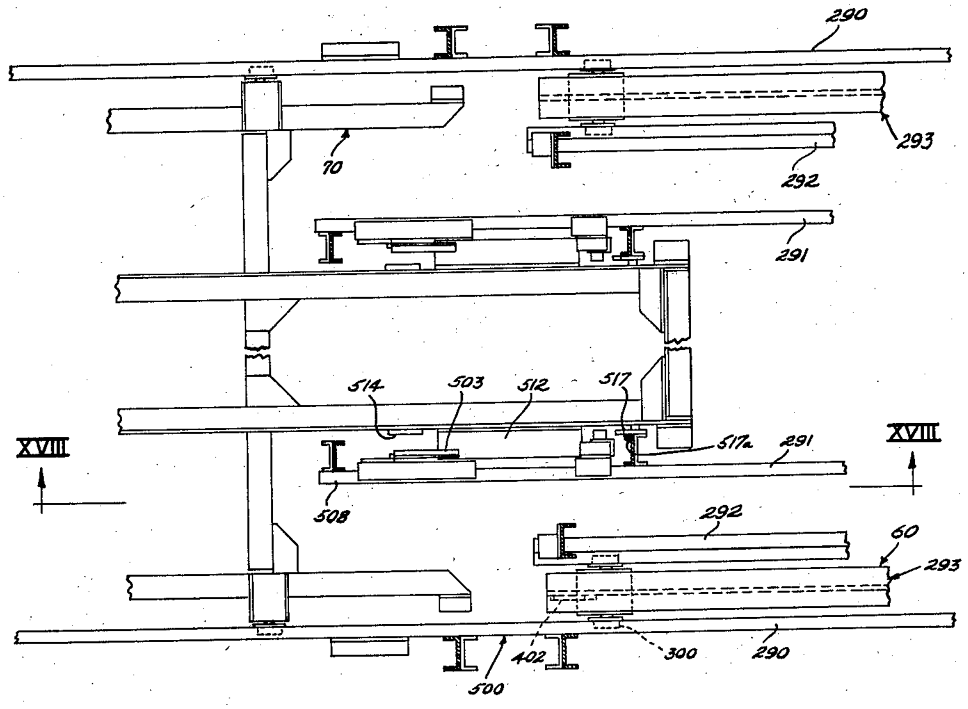
Figure 17 is a fragmentary plan view of the transition from the plating conveyor to the rinse conveyor of the machine.
Figure 18:
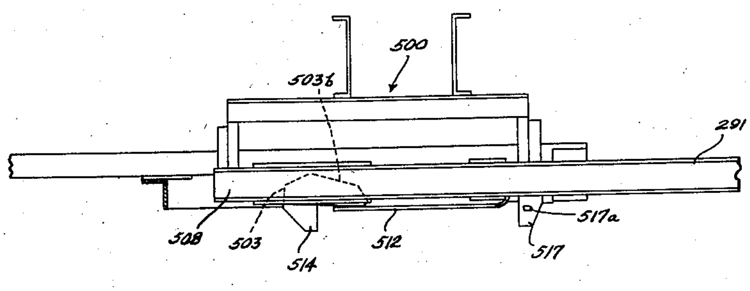
Figure 18 is a fragmentary longitudinal sectional view taken generally along the line XVIII—XVIII of Figure 17.
Figure 19:
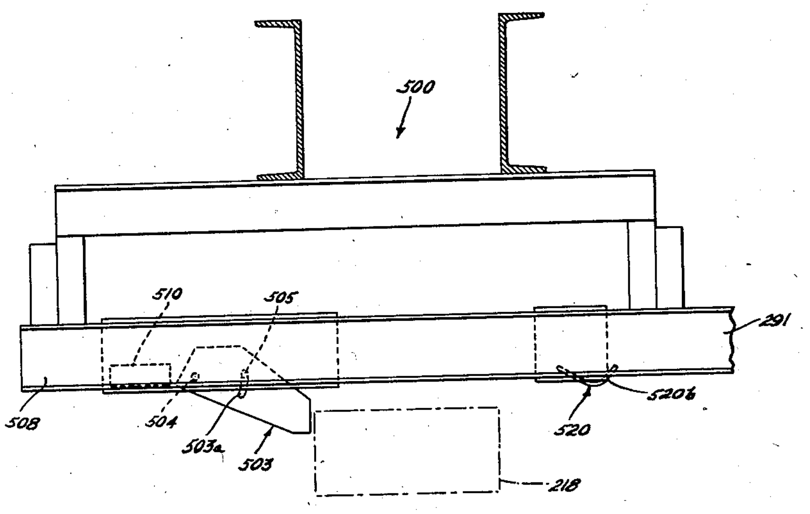
Figure 19 is a fragmentary longitudinal sectional view illustrating the manner in which a carrier is positioned at the last plating section prior to transfer to the rinse section.
Figure 20:
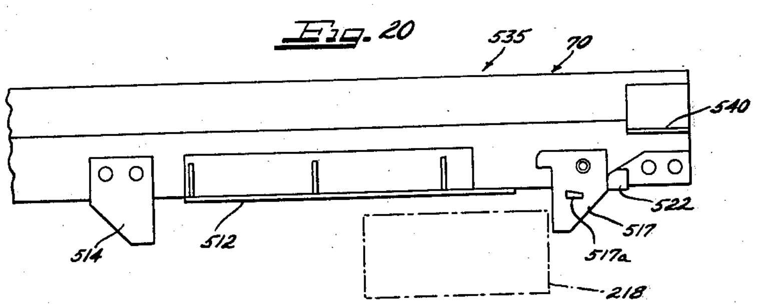
Figure 20 is a fragmentary longitudinal sectional view illustrating the structure of the rinse conveyor at the first rinse station.
Figure 21:
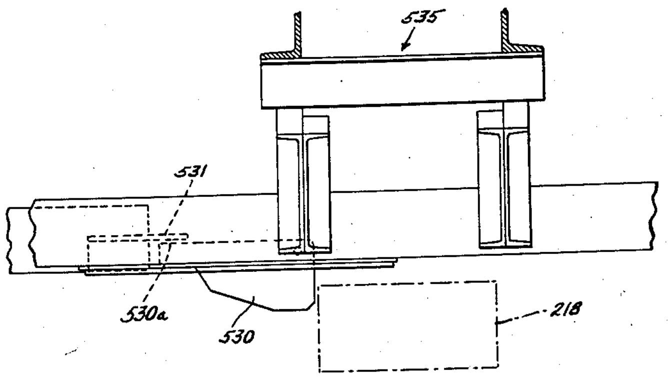
Figure 21 is a fragmentary longitudinal sectional view illustrating further structure of the conveyor at the first rinse station.

As seen in Figure 17, as the #3 pusher 402 of the walking beam 293 advances a carrier to station 500, the carrier is engaged by a pivot stop 503 (Fig. 19) which is mounted on a pivot shaft 504 and is normally held in the position shown by gravity. A pin 505 and slot 503*a* limit the upward pivoting movement of the stop 503. The stop 503 is mounted on a track portion 508 which may be an integral extension of the inner track 291 of the walking beam conveyor 60. A stop plate 510 is also provided for limiting the pivotal movement of the stop 503. The stop 503 is pivoted to its inoperative position by means of a lift plate 512 carried with the rinse shuttle 70. The stop is shown in raised position in dotted outline in Figure 18 with the stop plate 512 holding the same in this position.

In the fully returned position wherein the stop 503 is held in its inoperative position, a fixed stop lug 514 on the rinse conveyor 70 acts as a safety stop to prevent overtravel of the carrier.

Figure 15:
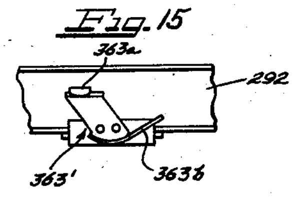
Figure 15 is a fragmentary enlarged longitudinal sectional view taken generally along the line XV—XV of Figure 9.

As the rinse conveyor is moved to its returned position, a pivot lug 517 carried thereby pivots over the carrier which is moved to station 500 by the chrome conveyor and is returned to its operative position by means of a leading cam face of a cam 520 which is similar to cam face **363*a* in Fig. 15. The trailing cam face 520*b* insures that the pivot lug 517 will remain in its operative position to engage the carrier when the rinse shuttle is next advanced. A pivot stop 522 is carried by the rinse conveyor to prevent counter-clockwise pivoting of the pivot lug 517 out of operative position and to limit pivoting of the lug 517 in the clockwise direction. The pivot lug 517 is provided with a projection 517*a* for cooperating with the cam face 520*b* of cam 520** in a manner similar to that described for the first pivot lugs on the chrome shuttle.

As the rinse shuttle moves a carrier from station 500 to station 535, an actuator 531 on the rinse shuttle moves into an overlying position with respect to the rear edge **530*a* of stop 530 to positively position the carriers at station 535 and prevent overtravel of the carrier. An actuator 540 on the rinse shuttle is designed to engage the stop 503 at its surface 503*b* as the rinse shuttle is advanced, should the stop 503 stick in its inoperative position. That is, the actuator 540 will cam the stop 503 downwardly into its operative position after the carrier at station 500** has been moved past the stop so as to prevent overtravel of the incoming carrier.

It will be understood that the rinse shuttle may be provided with latching lugs similar to the one illustrated in Figure 10 for the clean shuttle, the rinse shuttle being retracted while the carriers are in lowered positions, and being advanced to move the latching lugs into engagement with the carriers and to move the carriers forward to the next station.

Both the clean and rinse shuttles may be driven by means of chain loops passing over a pair of horizontally spaced sprockets with a drive arm connected to a point on the chain and a point on the clean and rinse shuttles respectively so that as each chain is advanced in one direction by rotation of one of the sprockets the corresponding shuttle is first moved rearwardly the extreme span between the sprocket outer peripheries and then moved forwardly the same distance. The plating shuttle and other similar walking beam shuttles may be driven by two such loop chain drives operating out of phase so that one beam is advanced while the other is retracted.

Figure 22:
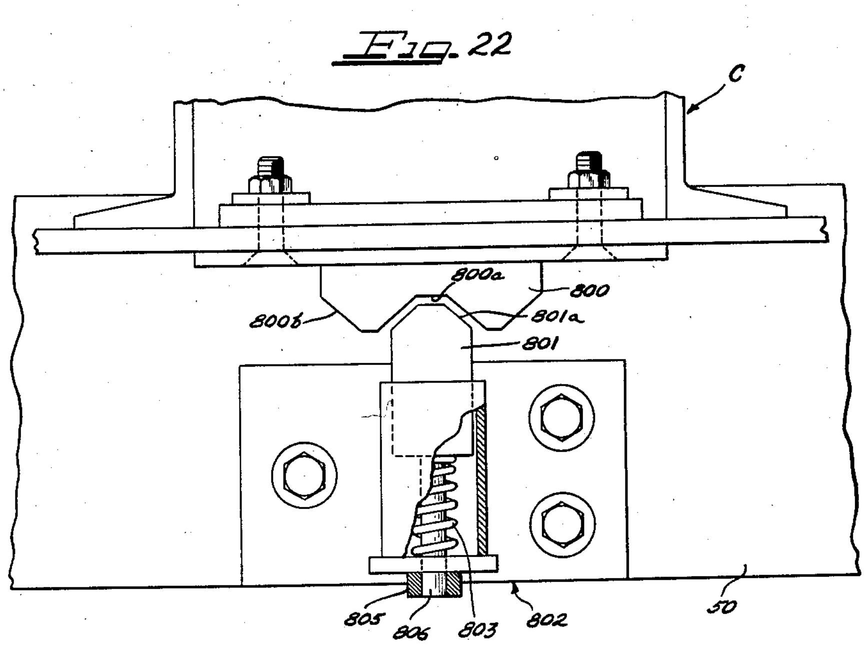
Figure 22 is an enlarged fragmentary elevational view illustrating the manner in which the carriers are positioned along the various conveyor tracks at the respective stations.

Figure 22 illustrates the manner in which the carriers are retained at selected stations along the machine, and particularly retained in position on the movable rail sections such as 50 in the plating section. Each of the carriers carries a depending plate 800 defining a central recess **800*a* for receiving a spring urged detent 801 positioned at various stations along the rails and in this case on the moveable rail section 50. The carrier positioning detents may be indicated generally by the reference numeral 802 and the positions of these detents are indicated schematically in Figure 1. A spring 803 urges the detent 801 upwardly and such upward movement may be limited by a suitable member 805 secured to the lower end of the detent pin 806. Thus as a carrier is advanced to a given station, the leading surface 800*b* of the positioning plate 800 engages a sloping surface 801*a* of the detent 801 to depress the detent, after which the spring 803 is operative to force the detent into the recess 800*a***. Similarly, as the carrier is advanced away from the station cooperating surfaces on the positioning plate and detent depress the detent and allow the carrier to be moved to a succeeding station.

Figure 23:
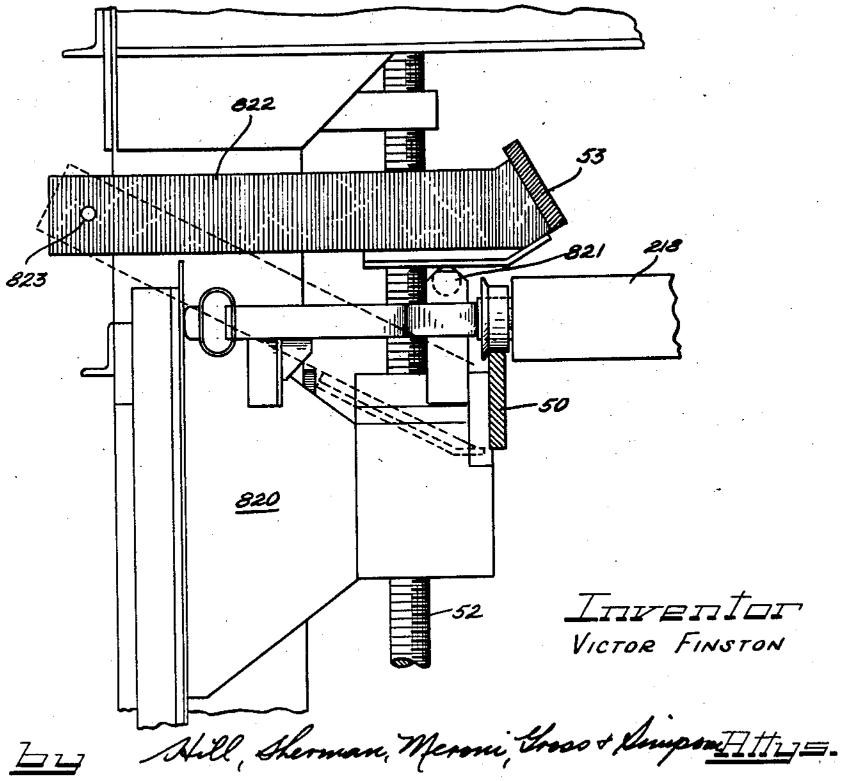
Figure 23 is a fragmentary enlarged elevational view illustrating the structure providing replacement track sections for the plating section of the machine.

Figure 23 illustrates a suitable construction of the replacement track sections such as 53 in Figure 1 which drop by gravity to replace the movable track sections such as 50. The movable track section 50 is illustrated as being mounted on a suitable vertically reciprocal mounting arm 820 which is raised and lowered by means of a suitable screw shaft 52 threadedly engaged therewith. As the mounting 820 is lowered, the projection 821 is lowered therewith to allow the replacement track section 53 on the pivotal arm 822 to descend into operative position indicated in dotted outline in Figure 23, the arm 822 being mounted on a pivot shaft 823.

Figures 24*a*, 24*b* and 24*c* illustrate the layout of the limit switches and motors for the illustrated machine. The thin rectangular blocks represent the various conveyors and elevator mechanisms of the machine in their approximate relative location. The letter "LE" refer to the load elevator structure, the letters "LS" refer to the load shuttle devices, the letters "CS" refer to the clean shuttle, the letters "CHS" refer to the chrome shuttle, the letters "RS" refer to the rinse shuttle, the letters "UE" refer to the unload elevators, and the letters "US" refer to the unload shuttles, and the letters "TS" refer to the transfer or return shuttles. It will thus be understood that the elevator designated "LE–1" refers to the load elevator indicated at 108 in Figure 1, the shuttle "LS–1" refers to the shuttle 110 in Figure 1, the elevator "LE–2" refers to elevator 30 of Figure 1, the shuttle "LS–2" refers to shuttle 33 in Figure 1, the elevator "LE–3" refers to elevator 36 in Figure 1, the shuttle "LS–3" refers to shuttle 37 in Figure 1, the elevator "LE–4" refers to elevator 41 in Figure 1, the clean shuttle "CS" refers to shuttle 43 in Figure 1, the chrome shuttle "CHS" refers to the shuttle 60 in Figure 1, and the rinse shuttle "RS" is the shuttle 70 in Figure 1. The correspondence between the other elements will similarly be apparent.

The conveyor limit switches are operated by movable parts of the respective conveyors at the extreme positions thereof. For example, the limit switch LSRLS–1 is operated when the load shuttle #1 indicated diagrammatically at 110 in Figure 1 has moved its nut member 215 of Figure 5 to receive a carrier from the #1 load elevator LE–1. This may be thought of as the returned position of the load shuttle LS–1. The first two letters designating the limit switch "LS" may be thought of as referring to the words "limit switch." The next letter "R" may be thought of as standing for "returned," while the following two letters and number "LS–1" can be thought of as referring to the #1 load shuttle. All of the other limit switches have been similarly lettered as will be apparent from the following description.

Certain of the drive motors for the various conveyors and elevators were designated in Figure 2, and the corresponding numbers have been applied to the schematic illustrations of the various motors in Figure 24*a*. The other motor symbols represent the motors for the elements most closely associated therewith, so that specific numbers need not be given to each motor diagrammatically represented in Figure 24.

Since the manner in which the desired limit switches may be applied to the specific structure illustrated in the drawing will be readily apparent to those skilled in the art, the specific locations selected and cooperating parts are not illustrated herein. For the most part, the limit switches are actuated at the extreme forward and return positions of the shuttles and the extreme upper and lower positions of the elevators. In addition, however, the limit switch LSC–TS–2 is actuated when a carrier reaches a position generally at the end of the #2 transfer shuttle nearest the #3 transfer shuttle as generally indicated in Fig. 24*b*. The limit switch LSC–TS–3–1 is actuated by a carrier at an intermediate point along the #3 transfer shuttle, and the limit switch LSC–TS–3–2 is operated when a carrier reaches a #2 position along the #3 transfer shuttle closer to the #1 load elevator. In each case, the limit switch is released when the carrier leaves the actuating position. The conveyors having endless chain drives conveniently have the limit switches actuated by members carried on the chain which move past the limit switch position once each revolution of the chain.

Having the foregoing structural relationships in mind, it is believed that the following description of the electric control circuit will be readily understood.

ELECTRICAL CONTROL CIRCUIT

The electrical control circuit for automatically operating the machine of the illustrated embodiment will be described. Preliminary to describing the normal operating cycle of the machine, various auxiliary circuits will be referred to which will be readily understood by those skilled in the art and accordingly have not been shown in detail in the drawings.

*Auxiliary electric control circuits*

To place the machine in operation, a "Start" pushbutton is pressed which causes a master control relay to be energized which maintains itself and the entire control circuit and provides undervoltage protection for all electrical equipment. A "Stop" pushbutton drops out the master control relay and opens the control circuit. When the "Start" pushbutton is pressed and the master control relay energized, a timer relay (not shown) which will be designated for convenience TRR, is energized and starts timing. Also a horn at each end of the machine sounds a warning. When TRR has timed out, the horns are deenergized and a run cycle relay (not shown) CRTRR is energized to place voltage on the line 110 to begin a cycle of operation.

*Motor overload out*

If a motor is overloaded its thermal overload element will kick out and depending on which motor has overloaded overload relay CROL–1 or CROL–2 (not shown) will be dropped out, to light a "Motor Overload Out" lamp and to drop out a master control relay CRM (not shown) to open the entire control circuit.

By proper use of a maintenance checkboard (not disclosed herein), the opened overload contact can be located. The condition which caused the motor to be overloaded should be corrected and then the overload contact may be reset by pressing a "Reset" button located on the motor starter.

*Overtravel*

If any of the elevators overtravel their raised or lowered positions or a carrier overtravels the #3 transfer shuttle forward position when the #1 load elevator not in position to receive it, an overtravel limit switch (not shown) will be operated. An overtravel relay CRO (not shown) is then dropped out and an overtravel relay LRO (not shown) is latched through its "L" coil. An "Overtravel" lamp is then lit and the timer relay TRR is dropped out. The run cycle relay CRTRR is then dropped out opening the control circuit. Again by using the maintenance checkboard the operated overtravel switch is located. The operator must then turn to "Jog On" in order to clear the overtraveled condition (see the explanation of "Jog" below).

Once the overtraveled condition is cleared the operator must turn an "Emergency-Overtravel Run-Reset" selector switch to "Reset." The overtravel relay LRO is then unlatched through its "U" coil. The selector switch is now turned back to "Run," timer relay TRR is picked up and starts timing, a horn at each end of the machine sounds a warning, and when TRR times out, the horns are deenergized and CRTRR closes the control circuit so that the machine continues to cycle from the point where it was stopped by an overtravel.

*Emergency*

If one of the emergency cords of the machine is pulled or the "Emergency" pushbutton is pressed, an emergency cycle relay LRE (not shown) will be latched through its "L" coil. Timer relay TRR is then dropped out and run cycle relay CRTRR is dropped out opening the control circuit. After the emergency condition has been cleared, the operator must turn the "Emergency-Overtravel Run-Reset" selector switch to "Reset." The emergency cycle relay LRE is then unlatched through its "U" coil. The selector switch is then turned back to "Run" and TRR is picked up, times out, energizes CRTRR closing the control circuit, and the machine continues to cycle from the point where it was stopped in "Emergency."

*Plug stop*

Each motor has a plugging switch to stop it. In the event of any machine stoppage other than that due to a power failure an "Off-delay" timer TRZS (not shown) will allow all running motors to plug-stop thereby preventing coasting. When the timer times out the circuit to the plugging switches will open.

*Manual*

To cycle the machine in "Manual" the "Auto-Manual" selector switch is turned to "Manual." An automatic cycle relay LRA (not shown) is then unlatched through its "U" coil and manual cycle relays CRMO, CRMOX and CRMOXX (not shown) are picked up. The machine is now set for manual operation. Pushbuttons are provided for all movements and the machine is so interlocked electrically that it must be cycled in proper sequence. If, during manual operation, the operator wishes to go into automatic he must have the machine so positioned that it will run when turned to automatic. Correct position is indicated by the "Automatic" lamp. Whenever it is lit, the operator may turn the "Auto-Manual" selector switch to "Auto" and the machine will cycle automatically.

*Jog*

"Jog" is provided only for clearing overtravel or emergency conditions and should not be used at any other time. When the "Jog-On-Off" selector switch is turned to "On" all interlocks are removed from the motor starter circuits and the operator has pushbutton control of the entire—less one direction shuttles—irregardless of position of shuttles and elevators. Caution should be observed as to carrier rack clearance and location when using any pushbutton in "Jog On."

When an elevator or shuttle is moved from a position while "Jog" is turned to "On" that shuttle or elevator must be returned to its original position before turning "Jog" to "Off." If this condition is not observed the machine will be out of cycle when "Jog" is turned to "Off."

*"Cycle Stopped" lamp*

During a normal operating cycle cycling clean-rinse relays LRCCR–1 (unit 2) and LRCCR–2 (unit 2) will latch and unlatch as each cycle progresses. When LRCCR–1 or LRCCR–2 is unlatched, a "Cycle Stopped" time relay TRCS (not shown) is picked up and starts timing. If LRCCR–1 or LRCCR–2 fails to unlatch TRCS will time out and light the "Cycle Stopped" lamps located at each end of the machine. These lamps indicate that the machine has stopped cycling. The maintenance checkboard will tell where the machine is in its cycle by lamps located adjacent to a schematic diagram of the machine.

*Pilot lamps*

All pilot lamps for the control circuit are located in the Maintenance Checkboard. All elevators have a raised and lowered position indicating lamp and all two-direction shuttles have a forward and returned position indicating lamp. The one-direction shuttles have an indexed position indicating lamp. Position indicating lamps are green for forward or raised and amber for returned or lowered. A white pilot lamp, when brightened, indicates a certain part of the machine is cycling. A blue pilot lamp, when brightened, indicates a certain part of the machine is to cycle next. All pilot lamps are connected in a "Dim-Bright" circuit. When a lamp is not indicating it will be dimmed and when it is indicating it will be brightened. This prolongs the life of each bulb and provides for simple location of burned out lamps.

AUTOMATIC OPERATING CYCLE

The normal operating cycle for the machine control circuits will now be described, considering first the clean-rinse cycle and the chrome plating cycle, loading cycle, and then the unloading cycle.

*Clean-rinse cycle #1*

When the run cycle relay CRTRR (not shown) is picked up as described previously, and if both the clean and rinse elevators are lowered, an "In Tank Time" relay TRCRE (unit 2 of the drawings) is picked up and times out. The circuit for energization of relay TRCRE will now be set forth in a manner which will be typical for all subsequent circuits which are traced in this description, and a detailed explanation of the nomenclature utilized will be given which will likewise be applicable to all of the subsequent description.

Timer relay TRCRE is energized through the following circuit: line 110, #1 contacts of lowered clean elevator CRLCE (unit 3), 3–26, 4–20, #1 contacts of lowered rinse elevator relay CRLRE, 4–26, 2–65, solenoid clutch winding SC (unit 2) of timer relay TRCRE to line 0.

In the above description lines 110 and 0 are connected to a 60 cycle 110 volt source through contacts of the master control relay CRM previously mentioned and through contacts of the run cycle relay CRTRR previously mentioned. The unit members refer to numbers on the drawings of the electric circuit diagrams, each unit number designating a given small group of relays and other circuit components, and the units being numbered in sequence throughout the sheets of drawings illustrating the electric circuit. The #1 contacts of a relay refer to the contacts at the top of the vertical series of contacts above the actuating coil thereof, the contacts being numbered from top to bottom in this manner. Numbers such as 3–26 in the above description refer to terminals of the relay contact mentioned just previously or to be mentioned immediately subsequently. Thus, referring to unit 3, it will be observed that the terminal 3–26 is associated with contact #1 of relay CRLCE. It will be understood that the 3 preceding the hyphen refers to the unit number where the terminal referred to will be found. Similarly the reference numeral 4–20 refers to a terminal associated with number 1 contacts of relay CRLRE of unit #4.

Energization of solenoid SC (unit 2) closes contacts #1 of timer TRCRE (unit 2) to energize the timer motor M through the following circuit: line 110, contact #1 of CRLCE (unit 3), 3–26, 4–20, contact #1 of CRLRE (unit 4) 4–26, 2–65, contact #1 of TRCRE (unit 2) 2–68, motor M of TRCRE, in line 0.

When timer TRCRE times out, contact #2 of TRCRE closes and is held by solenoid SC of TRCRE (unit 2). Cycling clean-rinse relay LRCCR–1 (unit 2) is then latched through the following circuit: line 110, normally closed contacts of jog cycle relay CRJ (not shown), 5–20, normally open contact #1 of relay CRRCS (unit 5), 5–33, 6–35, contact #1 of returned rinse shuttle relay CRRRS, 6–36, 2–66, contact #2 of TRCRE (unit 2) 2–67, coil "L" of cycling clean-rinse relay LRCCR–1 to line 0.

All relays beginning with the letters LR including relay LRCCR–1 are mechanically held relays wherein the "L" coil operates the relay, and the coil "U" resets the relay. The relay LRCCR–1 is thus mechanically held in set condition.

Relay CRCCR–1X is then energized through the following circuit: line 110, contact #1 of relay LRCCR–1 (unit 2), 2–61, lead 2–61′ (unit 2) to the energizing coil of relay CRCCR–1X to line 0.

The motor starting relay for the clean elevator motor now has its raised winding "R" energized through the following circuit: line 110, 2–6, bottom contact of LRCCR–1, 2–7, 5–36, bottom contact of returned clean shuttle relay CRRCS (unit 5), 5–37, limit switch LSRCE operated when the clean elevator is fully raised, released when it starts lowering, 3–14, winding "R" of clean elevator relay MSCE, and line 0.

The contacts R of MSCE (unit 3) are thus closed connecting lines L1, L2 and L3 to the clean elevator motor 1000.

Similarly, the raising coil "R" of the rinse elevator relay MSRE (unit 4) is energized through the following circuit (omitting reference to the various contacts associated with the auxiliary circuits which have been previously described but which are not specifically illustrated in the drawings): line 110, 2–10, contact of LRCCR–1, 2–11, 6–37, contact of returned rinse shuttle relay CRRRS, 6–38, limit switch LSRRE (operated when the rinse elevator is fully raised; released when it starts lowering), 4–14, "R" of MSRE, and line 0.

Timer relay TRCRE is reset due to the deenergization of solenoid coil SC thereof (unit 2) as a result of the opening of contacts #1 of relays CRLCE and CRLRE to reset TRCRE.

The clean and rinse elevators continue raising and when they are fully raised limit switches LSRCE (operated when the clean elevator is fully raised; released when it starts lowering) and LSRRE (operated when the rinse elevator is fully raised; released when it starts lowering) are operated.

Operation of the limit switch LSRCE opens the normally closed contact thereof in the previously described energizing circuit for the "R" coil of motor start relay MSCE.

Operation of the limit switch LSRRE opens the normally closed contact thereof in the previously described energizing circuit for the coil "R" of motor start relay MSRE.

Motor start relays MSCE–R and MSRE–R are thus dropped out and the clean and rinse elevator motors are plugged to stop the plugging switch for the clean elevator motor ZSCE and the plugging switch for the rinse elevator motor ZSRE. Solenoids SBCE and SBRE are deenergized upon deenergization of relays MSCE–R and MSRE–R setting the clean and rinse elevator motor brakes.

Operation of limit switch LSRCE also closes the normally open contact between line 110 and terminal 3–35 to energize raised clean elevator relay CRRCE which is connected between terminal 3–35 and line 0.

Similarly, operation of limit switch LSRRE closes the normally open contact of the limit switch between line 110 and terminal 435 to energize raised rinse elevator relay CRRRE whose energizing coil is connected between terminal 4–35 and line 0.

A chrome sequence relay LRSCH is now latched through its "L" coil by the following circuit: line 110, 5–20, contact of returned clean shuttle relay CRRCS (unit 5), 5–33, 6–35, contact of returned rinse shuttle relay CRRRS, 6–36, 3–24, contact of raised clean elevator relay CRRCE, 3–25, 4–24, contact of raised rinse elevator relay CRRRE, 4–25, 10–41, contact of step relay control relay CRICH for chrome shuttle, 10–42, 7–38, coil "L" of chrome sequence relay LRSCH, and line 0.

Advance clean-rinse shuttle relay CRACRS is now energized through the following circuit: from line 110, normally closed contact of sequence control relay LRCHS–1 for chrome shuttle, 11–30, normally closed contact of sequence control relay LRCHS–2 for chrome shuttle, 11–31, 18–23, contact of lowered load elevator relay CRLLE–4, 18–24, 19–18, contact of raised unload elevator #1 relay CRRUE–1, 19–19, 7–21, contact of chrome sequence relay LRSCH, 7–22, 2–60, the energizing coil of advance clean-rinse shuttle relay CRACRS, and line 0.

A motor start relay for the clean shuttle motor is now energized through the following circuit to start the clean shuttle advancing: line 110, normally closed contact of limit switch, LSFCS (operated when the clean shuttle is fully forward; released when it starts returning), 3–22, contact of raised clean elevator relay CRRCE, 3–23, 2–50, contact of advance clean rinse-rinse shuttle relay CRACRS, 2–51, 5–15, coil "F" of motor start relay MSCS, and line 0.

Similarly, the relay MSRS–F for the rinse shuttle motor is energized to start the rinse shuttle advancing through the following circuit: line 110, normally closed contact of limit switch LSFRS (operated when the rinse shuttle is fully forward; released when it starts returning), 4–22, contact of raised rinse elevator relay CRRRE, 4–23, 2–52, contact of advance clean-rinse shuttle relay CRACRS, 2–53, 6–15, coil "F" of motor start relay MSRS, and line 0.

When the clean rinse shuttles leave their returned position, limit switches LSRCS and LSRRS are released.

During the previously described operations, returned clean shuttle CRRCS has been energized from line 110 through the normally closed contact of limit switch LSRCS (operated when the clean shuttle is fully returned; released when it starts forward), terminal 5–34, energizing coil of CRRCS and line 0.

Thus, when the clean shuttle starts forward, relay CRRCS will drop out.

Similarly returned rinse shuttle relay CRRRS has during the previous operations been energized through the normally closed contacts of limit switch LSRRS (operated when the rinse shuttle is fully returned; released when its starts forward), terminal 6–39 and the energizing coil of relay CRRRS so that when the rinse shuttle starts forward, relay CRRRS is deenergized.

The clean and rinse shuttles continue to advance and when they are fully forward, limit switch LSFCS (operated when the clean shuttle is fully forward; released when it starts returning) and the limit switch LSFRS (operated when the rinse shuttle is fully forward; released when it starts returning) are operated.

Forward clean shuttle CRFCS is now energized through the following circuit: line 110, the normally open contacts of limit switch LSFCS, 5–35, energizing coil of CRFCS and line 0.

Similarly the forward rinse shuttle relay CRFRS is energized through the following circuit: line 110, the normally open contacts of limit switch LSFRS, 6–40, the energizing coil of CRFRS and line 0.

*Clean-rinse cycle #2*

At this point, the second part of the clean-rinse cycle begins operation providing cycling load-one relay LRCL–1, cycling unload-one relay LRCU–1, cycling unload-2 relay LRCU–2, sequence control relay for chrome elevator-3 LRCHE–3 and cycling chrome elevator relay LRCCHE or sequence control relay LRCHS–1 for the chrome shuttle have latched. Under these conditions, cycling clean-rinse (part 2) relay LRCCR–2 is latched through the following circuit: line 110, 5–20, contact of forward clean shuttle relay CRFCS, 5–21, 6–20, contact of forward rinse shuttle relay CRFRS, 6–21, 18–74, normally open contact of relay LRCL–1, 18–50, normally closed contact of cycling load-2 relay LRCL–2, 18–49, 13–33, normally closed contact of cycling load-6 relay LRCL–6, 13–34 12–34, normally closed contact of cycling load-7 relay LRCL–7, 12–35, 19–27, contact of LRCU–1, 19–28, 24–33, contact of LRCU-2, 24–34, 25–34, normally closed contact of cycling unload-6 relay LRCU–6, 25–35, and 10–129, sequence control relay LRCHE–3 for chrome elevator-3, 10–130, 7–42, contact of auxiliary relay CRCCHEX of relay LRCCHE, 7–43; or from 25–35 to 11–19, contact of LRCHS–1, 11–20; and then to 2–63, coil "L" of LRCCR–2, and line 0.

Energization of cycling clean-rinse 2 relay LRCCR–2 causes resetting of cycling clean-rinse 1 relay CRCCR–1 through the following circuit: line 110, 5–20, normally open contact of CRFCS, 5–21, 6–20, normally open contact of CRFRS, 6–21, 2–25, normally open contact of LRCCR–2, 2–24, coil "U" of LRCCR–1 and line 0.

When the #4 load elevator starts lowering motor start relay MSCE–1 for the clean elevator is picked up, and when the number 1 unload elevator starts lowering motor start relay MSRE–L for the rinse elevator is picked up thus starting the clean and rinse elevators lowering.

The energizing circuit for relay MSCE–L is as follows: line 110, 2–45, normally closed contact of auxiliary cycling clean-rinse 1 relay CRCCR–1X, 2–32, normally open contact of cycling clean-rinse 2 relay LRCCR–2, 2–26, 18–91, normally closed contact of raised load elevator No. 4 relay CRRLE–4, 18–92, normally open contact of limit switch LSLCE (operated when the clean elevator is fully lowered; released when it starts raising), 3–15, coil "L" of motor start relay MSCE, and line L.

Similarly, the energizing circuit for the motor start relay MSRE–L is as follows: line 110, 2–47, normally closed contact of CRCCR–1X, 2–33, normally open contact of LRCCR–2, 2–29, 19–55, normally closed contact of raised unload elevator-1 relay CRRUE–1, 19–56, normally open contact of limit switch LSLRE (operated when the rinse elevator is fully lowered; released when it starts raising), 4–15, coil "L" of MSRE, and line 0.

When the clean rinse elevators leave their raised positions, limit switches LSRCE and LSRRE are released. The raised clean elevator relay CRRCE and the raised rinse elevator relay CRRRE are then dropped out. Relay CRRCE is found at unit 3 and relay CRRRE is found at unit 4, and their energizing coils are controlled by normally open contacts of limit switches LSRCE and LSRRE. Hereafter, when a relay coil is simply deenergized by opening a previously described energizing circuit, the unit number for the relay will be given, and the reason for deenergization, but the energizing circuit which has been open will not be again described.

The clean and rinse elevators continue to lower and when they are fully lowered, limit switches LSLCE and LSLRE are operated to deenergize the previously described operating circuit for MSCE–L and MSRE–L. These relays are thus dropped out and the clean and rinse elevator motors are plugged to a stop through ZSCE and ZSRE. SBCE and SBRE are deenergized setting the clean and rinse elevator motor brakes.

Upon operation of the limit switches LSLCE and LSLRE. lowered clean elevator relay CRLCE and lowered rinse elevator relay CRLRE are picked up through the following circuits: line 110, closed contacts of LSLCE, 3–34, energizing coil of CRLCE to line 0; and line 110, closed contacts of LSLRE, 4–34, energizing coil of CRLRE to line 0.

Upon energization of relays CRLCE and CRLRE, the SC coil of timer relay TRCRE (unit 2) is energized through the previously described circuit to start the timer motor M through the previously described circuit.

Clean shuttle relay MSCS–F and rinse shuttle relay MSRS–F through the following circuits: line 110, normally open contact of limit switch LSRCS (operated when the clean shuttle is fully returned; released when it starts forward), 3–27, normally open contact of CRLCE, 3–28, 5–15, "F" coil of MSCS, to line 0; and line 110, normally open contact of limit switch LSRRS (operated when the rinse shuttle is fully returned; released when it starts forward), 4–27, normally open contact of CRLRE, 4–28, 6–15, "F" coil of MSRS to line 0.

The clean and rinse shuttle motors are thus energized and the clean and rinse shuttles start returning.

When the clean and rinse shuttles leave their forward positions, limit switches LSFCS and LSFRS are released. This causes relays CRFCS and CRFRS to be dropped out.

The clean and rinse shuttles continue returning and when they are fully returned, limit switches LSRCS and LSRRS are operated.

Operation of the limit switches LSRCS and LSRRS cause energization of return clean shuttle relay CRRCS and return rinse shuttle relay CRRRS through the following circuits: line 110, normally closed contact of limit switch LSRCS, 5–34, energizing coil of CRRCS; and line 110, normally closed contact of limit switch LSRRS, 6–39, energizing coil of CRRRS, and line 0.

The clean-rinse cycling relay LRCCR–2 is now unlatched through its "U" coil by means of the following circuit: line 110, 5–20, normally open contact of CRRCS, 5–33, 6–35, normally open contacts of CRRRS, 6–36, 3–24, normally open contact of CRLCE, 3–33, 4–32, normally open contact of CRLRE, 4–33, 2–64, "U" coil of LRCCR–2, and line 0.

*Chrome-1 cycle*

The chrome-1 cycle begins at the end of the clean-rinse cycle #1 when the clean and rinse shuttles are fully forward, and forward cleaning shuttle relay CRFCS and forward rinse shuttle relay CRFRS have been energized. At this time, the step relay control for the chrome shuttle CRICH is on its #3 contact. (Relay CRICH is a six contact six position stepping relay actuated by two coils. The coil marked "S" cocks the relay stepping mechanism when energized, and the coil marked "I" when energized, releases the stepping mechanism allowing the relay to index one position. Each time the relay is stepped, one contact is opened and another contact is closed.) Also #1 chrome elevator is raised, and the #3 chrome elevator is lowered.

The energizing circuit for cycling chrome elevator relay LRCCHE is as follows: line 110, 5–23, normally open contact of forward clean shuttle relay CRFCS, 5–22, 6–22, normally open contact of forward rinse shuttle relay CRFRS, 6–23, 8–41, raised chrome elevator relay CRRCHE–1, 8–54, 7–14, normally open contact of chrome sequence relay LRSCH, 7–40, coil "L" of LRCCHE, and line 0.

The "L" coil of motor start relay MSCHE is now energized starting chrome elevator #1 motor and chrome elevator #1 starts lowering, SBCHE–1 being energized to release chrome elevator #1 motor brake.

Cycling auxiliary chrome elevator relay CRCCHEX is also energized through the following circuit: line 110, normally open contact of LRCCHE, 7–50, energizing coil of CRCCHEX, and line 0.

Sequence control relay LRCHE–3 for chrome elevator #3 is now energized through the following circuit: line 110, 7–46, normally open contact of auxiliary cycling chrome elevator relay CRCCHEX, 7–47, 10–19, normally open contact of lowered chrome elevator-3 relay CRLCHE–3, 10–20, normally open contact of auxiliary step relay control CRICH–3XXX for chrome shuttle, 10–38, coil "L" of LRCHE–3, and line 0.

Timer relay TRCHE–3 for delaying raising of chrome elevator #3 is now energized through the following circuit: line 110, normally open contact of LRCHE–3, 10–60, coil SC of TRCHE–3, and line 0.

The timer motor is now energized through the following circuit: line 110, contact of LRCHE–3, 10–60, contact of TRCHE–3, 10–61, coil M of TRCHE–3, and line 0.

The timer relay TRCHE–3 thus starts timing and times out. When TRCHE–3 has timed out, motor start relay MSCHE–3 "R" is picked up starting chrome elevator #3 motor, and chrome elevator #3 starts raising. SBCHE–3 is energized releasing chrome elevator #3 motor brake. The energizing circuit for MSCHE–3 "R" is as follows: line 110, 7–24, contact of LRSCH, 7–25, 10–128, contact of LRCHE–3, 10–65, contact of TRCHE–3, 10–62, LSRCHE–3 contact, 10–14, "R" coil of MSCHE–3, and line 0.

When the #3 chrome elevator leaves its lowered position LSLCHE–3 is released, causing lowered chrome elevator relay CRLCHE–3 to be energized. The energizing circuit for CRLCHE–3 was as follows: line 110, contact of LSLCHE–3, 10–40, energizing coil of CRLCHE–3, and line 0.

Chrome elevator #3 continues to raise and when it is fully raised, limit switch LSRCHE–3 is operated, causing relays CRRCHE–3 and CRRCHE–3X to be energized through the following circuit: line 110, contact of LSRCHE–3, 10–39, energizing coils of CRRCHE–3 and CRRCHE–3X in parallel and line 0.

Sequence control relay LRCHE–3 is now unlatched through its "U" coil by means of the following circuit: line 110, 10–30, contact of CRRCHE–3, 10–31, "U" coil of LRCHE–3, and line 0.

Unlatching of LRCHE–3 causes timer relay TRCHE–3 to be reset by opening the contact between line 110 and terminal 10–60 of LRCHE–3 to deenergize the SC coil of TRCHE–3 between 10–60 and line 0.

Unlatching of LRCHE–3 also causes motor start relay MSCHE–3 "R" to be dropped out by opening the contact of LRCHE–3 between 10–128 and 10–65, chrome elevator #3 motor then being plugged to a stop through ZSCHE–3. SBCHE–3 is then deenergized setting chrome elevator #3 motor brake.

Going back now to the point in the description of the chrome-1 cycle where MSCHE–1 "L" is picked up starting chrome elevator #1 motor and chrome elevator #1 starts lowering, as chrome elevator #1 begins to lower, LSRCHE–1 is released.

Raised chrome elevator relay CRRCHE–1 and auxiliary raised chrome elevator relay CRRCHE–1X previous to this time have been energized through the following circuit: line 110, contact of limit switch LSRCHE–1, 8–48, and the energizing coils of CRRCHE–1 and CRRCHE–1X in parallel, and line 0.

When limit switch LSRCHE–1 is released, these relays are deenergized.

This causes coil "U" of LRSCH to be energized unlatching LRSCH through the following circuit: line 110, 10–30, normally open contact CRICH–3XXX, 10–47, 8–22, normally closed contact of CRRCHE–1, 8–40, normally closed contact of CRLCHE–1, 8–39, 7–39, coil "U" of LRSCH, and line 0.

Chrome elevator #1 continues to lower and when it is fully lowered, LSLCHE–1 is operated. This causes the previously described energizing circuit for relay MSCHE–1 "L" to be opened at the contact of limit switch LSLCHE–1 between terminals 8–88 and 8–16, the chrome elevator motor #1 then being plugged to a stop through ZSCHE–1. SBCHE–1 is then deenergized setting chrome elevator #1 motor brake.

Lowered chrome elevator relay CRLCHE–1 is now energized through the following circuit: line 110, contact of LSLCHE–1, 8–84, coil of CRLCHE–1, and line 0.

When CRLCHE–1 has picked up as just described, and when raised chrome elevator #3 relay CRRCHE–3 has picked up as described in the previous sequence under the chrome-1 cycle, chrome elevator cycling relay LRCCHE is unlatched through its "U" coil by means of the following circuit: line 110, 10–30, contact of CRICH–3X, 10–122, 8–37, contact of CRLCHE–1, 8–38, 10–55, contact of CRRCHE–3X, 10–56, 7–28, "U" coil of LRCCHE, and line 0.

Opening of a normally open contact of LRCCHE between line 110 and 7–50 opens the energizing circuit for relay CRCCHEX to deenergize that relay.

It may be noted that timer TRCHE–3 should be set to have the #3 chrome elevator in its raised position 5 seconds before the clean and rinse shuttles are ready to advance again.

*Chrome-2 cycle*

The chrome-2 cycle begins after the chrome-1 cycle has been completed and after the clean and rinse shuttles are again fully forward. At this point chrome shuttle sequence control relay LRCHS–1 is latched through its "L" coil by means of the following circuit: line 110, 5–23, contact of CRFCS, 5–24, 6–24, contact of CRFRS (the forward rinse shuttle relay), 6–25, 7–26, contact of LRSCH, 7–27, 8–43, contact of CRLCHE–1, 8–42, 10–53, contact of CRRCHE–3X, 10–54, 11–35, coil "L" of LRCHS–1, and line 0.

The motor start relay for MSCHS–"F" is now energized starting the chrome shuttle forward through the following circuit: line 110, 11–26, contact of LRCHS–1, 11–17, 2–8, normally closed contact of LRCCR–1, 2–9, 7–6, normally closed contact of LRCCHE, 7–7, 11–13, coil "F" of MSCHS, and line 0.

When the chrome shuttle leaves its indexed position limit switch LSCHS is released, thereby deenergizing the "I" coil of step relay CRICH and energizing the "S" coil of CRICH cocking the step relay for an indexing movement.

The chrome shuttle continues to index and when it is fully indexed, limit switch LSCHS is operated to deenergize the "S" coil of CRICH and to energize the "I" coil of CRICH, indexing the step relay one position.

Limit switch LSCHS controls the "S" and "I" coils of CRICH through the following circuits: line 110, contact of LSCHS, 7–60, "S" coil of CRICH and line 0; and line 110, contact of LSCHS, 7–61, coil "I" of CRICH, and line 0.

As previously mentioned step relay CRICH is a six contact, six position stepping relay actuated by two coils, "S" which cocks the relay stepping mechanism when energized, "I" which releases the stepping mechanism when energized allowing the relay to index one position. Each time the relay is stepped one contact is opened and another contact is closed. If, for example, the relay is in an indexed position with the #1 contact closed and is stepped once, the #1 contact will open and the #2 contact will close. This sort of progression is true through the relay's six positions and as it is stepped through its sixth position, the #6 contact will open and #1 contact will close. This relay has a power failure locking coil feature which prevents "double-indexing" when the power is turned back on after a failure.

When LSCHS is operated as previously described, CRICH steps from position #3 to position #4. This causes the deenergization of CRICH–3X, CRICH–3XX, CRICH–3XXX, and the energization of CRICH–1X and CRICH–1XX. The circuit for energization of relays CRICH–1X and CRICH–1XX may be traced as follows: line 110, contact #4 of CRICH, 7–53, 8–12, energizing coils of CRICH–1X and CRICH–1XX, and line 0.

The chrome shuttle continues to index and indexing one more time as explained above, limit switch LSCHS is again operated to step CRICH to position #5, whereupon relays CRICH–2X and CRICH–2XX are energized through the following circuit: line 110, contact #5 of CRICH, 7–54, 9–67, energizing coils of CRICH–2X and CRICH–2XX in parallel, and line 0.

Sequence control relay LRCHS–1 is now unlatched through its "U" coil by means of the following circuit: line 110, 9–66, contact of CRICH–2XX, 9–63, 10–32, contact of CRRCHE–3, 10–33, 11–36, "U" coil of LRCHS–1, and line 0.

Cycling relay LRCCHE is now latched through its "L" coil as follows: line 110, 9–66, contact of CRICH–2XX, 9–64, 10–57, contact of CRRCHE–3X, 10–58, 11–18, normally closed contact of LRCHS–1, 11–28, normally closed contact LRCHS–2, 11–29, 7–40, "L" coil of LRCCHE, and line 0.

Latching of LRCCHE causes energization of CRCCHEX by closure of the contact of LRCCHE between line 110, and terminal 7–50.

Now, the sequence control relay for raising the chrome elevators 1 and 2, LRCHER, is latched through its "L" coil by means of the following circuit: line 110, 7–19, contact of CRCCHEX, 7–44, 11–23, normally closed contact of LRCHS–2, 11–37, 10–124, normally closed contact of CRICH–3X, 10–125, 7–36, "L" of LRCHER, and line 0.

This in turn causes TRCHER to start timing, the SC coil thereof being energized through the following circuit: line 110, contact of LRCHER, 7–48, SC coil of TRCHER, and line 0.

The "M" coil of TRCHER is energized through the following circuit: line 110, contact of LRCHER, 7–48, contact of TRCHER, 7–49, "M" coil of TRCHER, and line 0.

When TRCHER times out, it closes a contact between line 110 and terminal 7–35 to energize CRCHER.

In the meantime, however, upon latching of LRCCHE through its "L" coil as above described, chrome elevator start relay MSCHE–3 "L" is energized through the following circuit to start elevator #3 lowering: line 110, 7–17, contact of LRCCHE, 7–18, 10–126, normally closed contact of LRCHE–3, 10–127, 9–61, contact of CRICH–2XX, 9–62, contact of limit switch LSLCHE–3, 10–15, "L" coil of MSCHE–3, and line 0.

SBCHE–3 is energized releasing chrome elevator-3 of motor brake.

When chrome elevator #3 leaves its raised position LSRCHE–3 is released, and CRRCHE–3 and CRRCHE–3X are dropped out by opening of the contact LSRCHE–3 between line 110 and terminal 10–39.

Chrome elevator #3 continues to lower and when it is fully lowered LSLCHE–3 is operated dropping out MSCHE–3 "L" to plug the #3 chrome elevator motor to a stop through ZSCHE–3.

When chrome elevator #3 is fully lowered, lowered chrome elevator relay CRLCHE–3 is energized through the following circuit: line 110, contact of LSLCHE–3, 10–40, an energizing coil of CRLCHE–3, to line 0.

As previously mentioned, when TRCHER has timed out, and CRCHER is picked up, chrome elevator #2 start relay MSCHE–2 "R" is energized through the following circuit: line 110, 7–17, contact of LRCCHE, 7–18, 7–31, contact of CRCHER, 7–32, 9–50, contact of CRICH–2X, 9–51, contact of limit switch LSRCHE–2, 9–12, coil "R" of MSCHE–2, and line 0.

Chrome elevator #2 starts raising, and SBCHE–2 is energized releasing chrome elevator #2 motor brake.

When chrome elevator #2 leaves its lowered position, limit switch LSLCHE–2 is released, and relay CRLCHE–2 is dropped out.

At this time, chrome sequence relay LRSCH is unlatched through its "U" coil by means of the following circuit: line 110, 9–66, contact of CRICH–2XX, 9–65, normally closed contact of CRRCHE–2, 9–29, normally closed contact of CRLCHE–2, 9–44, 7–39, "U" coil of LRSCH, and line 0.

Chrome elevator #2 continues to raise and when it is fully raised, limit switch LSRCHE–3 is operated. MSCHE–2 "R" is now dropped out and the #2 chrome elevator is plugged to a stop through ZSCHE–2. SBCHE–2 is deenergized setting chrome elevator #2 motor brake.

Raised chrome elevator relay #2 is now energized through the following circuit: line 110, contact of LSRCHE–2 9–38, coil of CRRCHE–2, and line 0.

Chrome shuttle sequence control relay LRCHS–2 is now energized through the following circuit: line 110, 7–19, normally closed contact of LRSCH, 7–20, 9–53, contact of CRICH–2X, 9–54, contact of CRRCHE–2, 9–28, 10–21, contact of CRLCHE–3, 10–22, 11–33, coil "L" of LRCHS–2, and line 0.

Sequence control relay LRCHER is now unlatched through its "U" coil as follows: line 110, 11–25, normally open contact of LRCHS–2, 11–24, 7–37, "U" coil of LRCHER, and line 0.

Unlatching of LRCHER causes TRCHER to be reset by opening the contact of LRCHER between line 110 and terminal 7–48 to deenergize coil SC of TRCHER this in turn causes deenergization of CRCHER by opening the contact of TRCHER between line 110 and terminal 7–35.

Chrome elevator cycling relay LRCCHE is now unlatched through its "U" coil in the following circuit: line 110, 11–25, contact of LRCHS–2, 11–22, 7–29, normally closed contact of LRCHER, 7–28, "U" coil of LRCCHE, and line 0.

Chrome shuttle relay MSCHS "F" is now energized through the following circuit to start up the chrome shuttle motor and start the chrome shuttle indexing: line 110, 11–26, contact of LRCHS–1, 11–17, 2–8, normally closed contact of LRCCR–1, 2–9, 7–6, normally closed contact of LRCCHE, 7–7, 11–13, coil "F" of MSCHS, and line 0.

When the chrome shuttle leaves its indexed position, LSCHS is released and the chrome shuttle indexes to position six in the manner previously described. Relay contact #6 of step relay CRICH controls energization of relay CRICH–3X, CRICH–3XX and CRICH–3XXX, contact #6 being connected between line 110 and terminal 7–55, and terminal 7–55 being connected to terminal 10–59 of the relays.

Relay LRCHS–2 is now unlatched through its "U" coil by means of the following circuit: line 110, 10–30, contact of CRICH–3X, 10–123, 9–22, contact of CRRCHE–2, 9–23, 11–34, coil "U" of LRCHS–2, and line 0.

*Chrome-3 cycle*

After the step relay CRICH has stepped to contact six during the chrome-2 cycle, the chrome-3 cycle is ready to begin when the clean and rinse shuttles next reach their fully forward position. When the clean and rinse shuttles are in their fully forward position at this time, LRCHS–1 is latched through its "L" coil by means of the following circuit: line 110, 5–23, CRFCS, 5–24, 6–24, CRFRS, 6–25, 7–26, LRSCH, 7–27, 9–36, CRRCHE–2X, 9–37, 11–35, "L" coil of LRCHS–1, and line 0.

(Hereafter, when the letters designating a relay are recited in conjunction with a series of terminals, a contact of the relay is intended unless otherwise specified.)

MSCHS "F" is now energized starting the chrome shuttle motor and the chrome shuttle starts indexing due to the following completed circuit: line 110, 11–26, LRCHS–1, 11–17, 2–8, LRCCR–1, 2–9, 7–6, LRCCHE, 7–7, 11–14, normally closed contact of MSCHS–R, 11–13, "F" coil of MSCHS, and line 0.

When the chrome shuttle leaves its indexed position, LSCHS is released, the CRICH "I" coil (unit 7) is deenergized, the CRICH "S" coil (unit 7) is energized cocking the step relay for an index. The chrome shuttle continues to index and when it is fully indexed, LSCHS is operated, CRICH "S" coil is deenergized, CRICH "I" coil is energized indexing the step relay CRICH to position #1. Relays CRICH–1 and CRICH–1XX are thus energized through contact #1 of CRICH which is connected between line 110 and terminal 7–53, while terminal 7–53 is connected to terminal 8–12 of the energizing coils of relays CRICH–1X and CRICH–1XX. Relay LRCHS–1 is now unlatched through the following circuit: line 110, 8–28, normally open contact of CRICH–1X, 8–26, 9–18, CRRCHE–2, 9–19, 11–36, "U" coil of LRCHS–1, and line 0.

MSCHS "F" is now deenergized, and the chrome shuttle motor is plugged to a stop. By way of example, a plugging circuit will be specifically described for the chrome shuttle motor, and it will be understood by those skilled in the art that entirely similar plugging circuits can be provided for each of the other motors described. The plugging switch for the chrome shuttle motor ZSCHS is associated with the chrome shuttle motor in the schematic diagram of Figure 24. The contacts of ZSCHS are in an energizing circuit for the "R" coil of MSCHS, and one contact of ZSCHS is connected to a source of 110 volt 60 cycle current through slow release contacts of an "off-delay" timer TRZS, and line 114. The other contact of ZSCHS is connected to terminal 11–11, a normally closed contact of MSCHS–F, 11–12, and "R" coil of MSCHS. The slow release contacts refer to operate a predetermined time after the coil of TRZS is deenergized. When timer TRZS times out, after a machine stoppage, the circuit to the plugging switches will open. A contact such as that between 11–14 and 11–13 in the energizing circuit for MSCHS "F" and controlled by MSCHS–"R" is found in each of the motor start energizing circuits, but has been omitted from the description of the previous energizing circuits.

When step relay CRICH has stepped to position one, and LRCHS–1 has been unlatched as previously described, LRCCHE is picked up through its "L" coil by means of the following circuit: line 110, 8–28, CRICH–1X, 8–27, 9–34, CRRCHE–2X, 9–35, 11–18, LRCHS–1, 11–28, LRCHS–2, 11–29, 7–40, "L" coil of LRCCHE, and line 0.

Also, LRCHER is latched as follows: line 110, 7–19, CRCCHEX, 7–44, 11–23, LRCHS–2, 11–37, 10–124, CRICH–3X, 10–125, 7–36, "L" of LRCHER, and line 0.

Timer TRCHER is now picked up and starts timing due to the following completed circuit: line 110, LRCHER, 7–48, "SC" coil of TRCHER, and line 0.

The "M" coil of TRCHER is energized through the following circuit: line 110, LRCHER, 7–48, TRCHER, 7–49, "M" of TRCHER, and line 0.

While TRCHER is timing, MSCHE–2 "L" is energized starting the #2 chrome elevator motor a start chrome elevator #2 lowering, by means of the following circuit: line 110, 7–17, LRCCHE, 7–18, 8–6, CRICH–1XX, 8–7, LSLCHE–2, 9–14, MSCHE–2–R, 9–13, "L" of MSCHE–2, and line 0.

SBCHE–2 is now energized releasing the chrome elevator-#2 motor brake.

When the #2 chrome elevator leaves its raised position, limit switch LSRCHE–2 is released. The previously described energizing circuit for CRRCHE–2 (unit 9) is thus broken, and CRRCHE–2 deenergized.

Chrome sequence relay LRSCH is unlatched through the following circuit: line 110, 7–19, CRCCHEX, 7–45, 8–23, CRICH–1X, 8–22, CRRCHE–1, 8–40, CRLCHE–1, 8–39, 7–39, "U" of LRSCH, and line 0.

Chrome elevator #2 continues to lower and when it is fully lowered, limit switch LSLCHE–2 is operated, and MSCHE–2 "L" is dropped out plugging the #2 chrome elevator motor to a stop through ZSCHE–2. SBCHE–2 is deenergized setting chrome elevator #2 motor brake, and relay CRLCHE–2 is energized from line 110, through the contact LSLCHE–2, and 9–68.

When timer TRCHER times out, CRCHER is picked up by means of the circuit from line 110 through the normally open contact of TRCHER to terminal 7–35 of CRCHER.

Motor start relay MSCHE–1 "R" is now energized starting the chrome elevator #1 raising, by means of the following circuit: line 110, 7–17, LRCCHE, 7–18, 7–33, CRCHER, 7–34, 8–10, CRICH–1XX, 8–11, LSRCHE–1, 8–13, MSCHE–1 "L," 8–14, "R" of MSCHE–1, and line 0.

When chrome elevator #1 leaves its lowered position, limit switch LSLCHE–1 is released, CRLCHE–1 is deenergized, and LRSCH is unlatched through the following circuit: line 110, 7–19, CRCCHEX, 7–45, 8–23, CRICH–1X, 8–22, CRRCHE–1, 8–40, CRLCHE–1, 8–39, 7–39, "U" coil of LRSCH, and line 0.

Chrome elevator #1 continues to raise and when it is fully raised raised limit switch LSRCHE–1 is operated. MSCHE–1 "R" is then deenergized and the chrome elevator #1 motor is plugged to a stop through ZSCHE–1. SBCHE–1 is deenergized settng chrome elevator #1 motor brake.

CRRCHE–1 and CRRCHE–1X are picked up due to the closure of limit switch LSRCHE–1 (unit 8).

LRCHS–2 is now latched through the following circuit: line 110, 7–19, LRSCH, 7–20, 8–21, CRICH–1X, 8–20, CRRCHE–1, 8–53, 9–42, CRLCHE–2, 9–43, 11–33, "L" coil of LRCHS–2, and line 0.

LRCHER is unlatched as follows: line 110, 11–25, LRCHS–2, 11–24, 7–37, "U" coil of LRCHER, and line 0.

LRCCHE is unlatched as follows: line 110, 11–25, LRCHS–2, 11–22, 7–29, LRCHER, 7–28, "U" coil of LRCCHE, and line 0.

Opening of the contact between line 110, and 7–48 of LRCHER resets timer TRCHER. Resetting of timer TRCHER in turn deenergizes CRCHER (unit 7).

Chrome shuttle motor relay MSCHS–"F" is now energized to start the chrome shuttle indexing, by means of the following circuit: line 110, 11–25, LRCHS–2, 11–27, 7–6, LRCCHE, 7–7, 11–14, MSCHS–"R," 11–13, "F" coil of MSCHS, and line 0.

When the chrome shuttle leaves its indexed position, LSCHS is released, the CRICH coils are energized and deenergized as mentioned previously, and the step relay moves to position 2. The chrome shuttle continues to index to release LSCHS and then to again operate LSCHS to step the relay CRICH to position 3. CRICH–3X, CRICH–3XX, and CRICH–3XXX are then energized due to closure of contact #3 of CRICH–3 (unit 7).

The next time the clean and rinse shuttles reach their fully forward position, the cycle of operation is repeated beginning at the chrome-1 cycle with the step relay on its #3 contact, the #1 chrome elevator raised, and the #3 chrome elevator lowered. As previously described, during the chrome-1 cycle, chrome elevator #1 is lowered and chrome elevator #3 is raised. After this, when the clean and rinse shuttles again reach a forward position, the chrome-2 cycle begins, advancing a carrier from the clean section to chrome station #3, lowering the chrome #3 elevator and raising the chrome #2 elevator. At the end of the chrome-2 cycle, the carrier from chrome station #2 is advanced to a position over chrome cell #3. At this point, the chrome-3 cycle begins, the clean shuttle having moved a carrier to a position over chrome plating cell #1. At this time, the chrome shuttle is advanced to move the incoming carrier to a position over chrome plating cell 2 and to move the outgoing carrier to the first station of the rinse section. Chrome elevator #2 is now lowered to immerse the incoming carrier work, and thereafter chrome elevator #1 is raised and the outgoing carrier advanced to a position to move the outgoing carrier to a position over chrome cell #3. Chrome-1 cycle is now ready to be repeated.

AUTOMATIC OPERATING CYCLE—PART II

*Load-1 cycle*

Reviewing the operation of the machine as previously described, it will be recalled, that when the start button for the machine is pressed, timer TRCRE picks up and begins to time out. After this, the clean and rinse elevator motors are started to raise the clean and rinse elevators and when they are fully raised, the clean and rinse shuttles are advanced. At this point, the clean-rinse-2 cycle and the chrome-1 cycles begin with the lowering of the clean and rinse elevators and the lowering of chrome elevator #1.

Coincident with the beginning of clean-rinse 2 cycle and chrome-1 cycle, the load-1 cycle begins and will now be described.

When the forward clean shuttle CRFCS and the forward rinse shuttle relay CRFRS are picked up, the load cycling relay LRCL–1 is energized as follows: line 110, 5–25, CRFCS, 5–26, 6–26, CRFRS, 6–27, 18–51, CRRLE–4, 18–52, "L" coil of LRCL–1, and line 0.

Load elevator #4 starts lowering due to the following circuit: line 110, 2–12, LRCCR–1, 2–13, 18–71, LRCL–1, 18–34, LRLE–4, 18–35, 17–18, CRRLS–3, 17–19, 15–45, LRLS–2, 15–46, 14–57, CRLLE–2, 14–59, 16–53, CRLLE–3, 16–54, LSLLE–4, 18–16, MSLE–4 "R," 18–15, and "L" coil of MSLE–4, and line 0.

SBLE–4 is energized releasing load elevator #4 motor brake.

When load elevator #4 leaves its raised position, limit switch LSRLE–4 is released, opening its contact between line 110 and terminal 18–31 to deenergize CRRLE–4 (unit 18).

Load elevator #4 continues to lower and when it is fully lowered LSLLE–4 is operated to close its contacts between line 110 and terminal 18–30 to energize CRLLE–4 (unit 18).

Also, MSLE–4 "L" is deenergized plugging load elevator #4 to a stop through ZSLE–4. SBLE–4 is deenergized setting load elevator #4 motor brake.

LRLE–4 is latched as follows: line 110, contact of LSLLE–4, 18–30, "L" coil of LRLE–4, and line 0.

The load shuttle #3 now starts advancing due to the following circuit: line 110, 18–33, LRLE–4, 18–32, LRCL–1, 18–26, CRLLE–4, 18–27, LSFLS–3, 17–10, MSLS–3–"R," 17–9, "F" coil of MSLS–3, and line 0.

CRRLS–3 (unit 17) is deenergized through the opening of LSRLS–3 at terminal 17–29.

Load shuttle #3 continues to advance and when it is fully forward, limit switch LSFLS–3 is operated, causing energization of CRFLS–3 due to connection of line 110 to terminal 17–28 by LSFLS–3.

LRCL–2 is latched as follows: line 110, 17–24, CRFLS–3, 17–25, 18–25, CRLLE–4, 18–47, "L" coil of LRCL–2, and line 0.

LRCL–3 is latched as follows: line 110, 17–24, CRFLS–3, 17–25, 14–26, CRRLE–2, 14–46, "L" coil of LRCL–3, and line 0.

When CRFLS–3 is energized, and LRCL–2 and LRCL–3 have latched, LRCL–1 is unlatched as follows: line 110, 17–24, CRFLS–3, 17–25, 18–25, LRCL–2, 18–48, 14–34, LRCL–3, 14–35, 18–53, "U" coil of LRCL–1, and line 0.

*Load-2 cycle*

After load shuttle #3 has fully advanced as previously described and LRCL–2 is latched, load elevators #2 and 3 start raising as will be described below in connection with load-3 cycle, and also load elevator #4 starts raising through the following circuit: line 110, 18–45, LRCL–2, 18–46, LRCL–1, 18–54, 14–12, CRLLE–2, 14–49, 16–51, CRLLE–3, 16–52, LSRLE–4, 18–13, MSLE–4–"L," 18–14, "R" coil of MSLE–4, and line 0.

When load elevator #4 leaves its lowered position, limit switch LSLLE–4 is released, and CRLLE–4 is deenergized.

Load elevator #4 continues to raise and when it is fully raised, limit switch LSRLE–4 is operated, MSLE–4 "R" is deenergized, and load elevator #4 motor is plugged to a stop through ZSLE–4.

Also CRRLE–4 (unit 18) is energized; and LRCL–2 is unlatched as follows: line 110, 13–25, LRCL–6, 13–32, 12–32, LRCL–7, 12–38, LRLE–1, 12–39, 2–39, CRCCR–1X, 2–40, 18–19, CRRLE–4, 18–20, "U" coil of LRCL–2, and line 0.

*Load-3 cycle*

When the load shuttle #3 has fully advanced as described in the load-1 cycle and LRCL–3 is latched, load elevators 2 and 3 start raising along with load elevator #4, due to the following circuits: line 110, 14–44, LRCL–3, 14–45, LSRLE–2, 14–13, MSLE–2–L, 14–14, "R" coil of MSLE–2, and line 0; and line 110, 14–36, LRCL–3, 14–37, LSRLE–3, 16–13, MSLE–3–L, 16–14, "R" coil of MSLE–3, and line 0.

The motor brakes SBLE–2 and SBLS–3 operate in the manner previously indicated for other motors, and motor brake energization and deenergization will not be further described, its operation being obvious from the foregoing description and from the drawings.

When load elevator #2 leaves its lowered position, limit switch LSLLE-2 is released, causing CRLLE-2 (unit 14) to be deenergized.

Load elevator #2 continues to raise and when it is fully raised, LSRLE-2 is operated, and CRRLE-2 (unit 14) is operated.

Relay MSLE-2 "R" is now deenergized and load elevator #2 motor is plugged to a stop through ZSLE-2. The plugging of the various motors will be readily understood from the previous examples, and this action will no longer be mentioned in the description.

When load elevator #3 leaves its lowered position LSLLE-3 is released, and CRLLE-3 (unit 16) is deenergized.

Load elevator #3 continues to raise and when it is fully raised, LSRLE-3 is operated, causing CRRLE-3 (unit 16) to be operated. (It will be noted that the verb "raise" is often used in this description in an intransitive sense as synonymous with "rise" or "elevate." The term is commonly used in this art in the foregoing sense.)

Load elevator #3 is now stopped at its raised position by deenergization of MSLE-3 "R."

When CRRLE-3 and CRRLE-2 are both energized, LRCL-4 and LRCL-5 are latched as follows: line 110, 14-25, CRRLE-2, 14-24, 16-22, CRRLE-3, 16-23, 17-22, CRRLS-3, 17-35, "L" of LRCL-4, and line 0; and line 110, 14-25, CRRLE-2, 14-24, 16-22, CRRLE-3, 16-23, 15-33, "L" of LRCL-5, and line 0. LRCL-3 is unlatched as follows: line 110, 13-25, LRCL-6, 13-32, 12-32, LRCL-7, 12-38, LRLE-1, 12-39, 2-39, CRCCR-1X, 2-40, 18-19, CRRLE-4, 18-20, "U" of LRCL-2, and line 0.

*Load-4 cycle*

After load elevator #3 has reached its raised position in load-3 cycle, and LRCL-4 is latched, load shuttle #3 starts returning due to the following completed circuit: line 110, 17-32, LRCL-4, 17-33, 14-42, LRCL-3, 14-43, LSRLS-3, 17-7, MSLS-3-F, 17-8, "R" of MSLS-3, and line 0.

When load shuttle #3 leaves its forward position, LSFLS-3 is released and CRFLS-3 (unit 17) is deenergized.

Load shuttle #3 continues to return and when it is fully returned, LSRRLS-3 is operated, MSLS-3 "R" is deenergized, and CRRLS-3 (unit 17) is energized.

RLCL-4 is unlatched as follows: line 110, 17-24, CRRLS-3, 17-23, "U" of LRCL-4.

*Load-5 cycle*

When load elevators 2, 3 and 4 have reached their upper positions at the end of load-2 and load-3 cycles, and LRCL-5 is latched, load shuttle #3 starts returning as described in the load-4 cycle and also load shuttle #2 starts indexing due to energization of the following circuit: line 110, 15-15; LRLS-2 and CRLS-2 in parallel; 15-13, 14-38, LRCL-3, 14-39, 15-23, LRCL-5, 15-24, 14-19, CRRLE-2, 14-20, 16-24, CRRLE-3, 16-25, 15-10, MSLS-2-R, 15-9, "F" of MSLS-2, and line 0.

When load shuttle #2 leaves its indexed position, LSLS-2 is released to cause CRLS-2 (unit 15) to be deenergized and LRLS-2 (unit 15) to be latched.

Load shuttle #2 continues to index and when it is fully indexed, LSLS-2 operated and CRLS-2 (unit 15) is operated.

MSLS-2 "F" is deenergized stopping load shuttle #2 motor.

LRLE-4 is unlatched as follows: line 110, 15-18, CRLS-2, 15-19, LRLS-2, 15-30, 18-44, "U" of LRLE-4, and line 0.

Load elevator #2 starts lowering due to the following closed circuit: line 110, 18-36, LRLE-4, 18-37, 17-15, CRRLS-3, 17-14, LSLLE-2, 14-16, MSLE-2-R, 14-15, "L" of MSLE-2, and line 0.

Similarly, load elevator #3 starts lowering due to the following closed circuit: line 110, 18-38, LRLE-4, 18-39, 17-16, CRRLS-3, 17-17, LSLLE-3, 16-16, MSLE-3-R, 16-15, "L" of MSLE-3, and line 0.

When load elevator #2 leaves its raised position, LSRLE-2 is released and CRRLE-2 (unit 14) is deenergized.

Load elevator #2 continues to lower and when it is fully lowered, LSLLE-2 is operated, MSLE-2 "L" (unit 14) is deenergized and CRLLE-2 (unit 14) is energized.

When load elevator #3 starts lowering, LSRLE-3 is released, and CRRLE-3 (unit 16) is deenergized.

Load elevator #3 continues to lower and when it is fully lowered, LSLLE-3 is operated and CRLLE-3 (unit 16) is energized. Also MSLE-3 "L" (unit 16) is deenergized.

When both CRLLE-2 and CRLLE-3 are energized, MSLS-1-F is picked up and load shuttle #1 starts advancing, the circuit being traced as follows: line 110, 12-26, CRLLE-1, 12-27, 14-27, CRLLE-2, 14-28, 15-28, LRCL-5, 15-29, 13-36, LRCL-6, 13-50, LSFLS-1, 13-16, MSLS-1-R, 13-15, "F" of MSLS-1, and line 0.

When the load shuttle #1 leaves its returned position, LSRLS-1 is released and CRRLS-1 (unit 13) is deenergized.

Load shuttle #1 continues advancing and when it is fully forward, LSFLS-1 is operated, MSLS-1 "F" is deenergized, and CRFLS-1 (unit 13) is operated.

LRCL-6 and LRCL-7 are now latched through the following circuits: line 110, 13-25, CRFLS-1, 13-26, "L" of LRCL-6; and line 110, 13-25, CRFLS-1, 13-26, 12-46, "L" of LRCL-7, and line 0.

LRLE-1 is unlatched through its "U" coil by the following circuit: line 110, LSFLS-1, 12-45, "U" of LRLE-1, and line 0.

*Load-6 cycle*

When load shuttle #1 has completed its advance, and LRCL-6 is latched, the load-6 cycle comes into operation and load shuttle #1 starts returning due to the following completed circuit: line 110, 13-39, LRCL-6, 13-40, 15-26, LRCL-5, 15-27, LSRLS-1, 13-13, MSLS-1-F, 13-14, "R" of MSLS-1, and line 0.

When load shuttle #1 leaves its forward position LSFLS-1 is released, and CRFLS-1 (unit 13) is deenergized.

Load shuttle #1 continues to return and when it is fully returned, LSRLS-1 is operated, MSLS-1-R is deenergized, and CRRLS-1 (unit 13) is energized.

LRCL-6 is now unlatched through the following circuit: line 110, 13-25, CRRLS-1, 13-24, "U" of LRCL-6, and line 0.

*Load-7 cycle*

Also, after load shuttle #1 has advanced at the end of load-5 cycle, and LRCL-7 has latched, load elevator #1 starts raising due to the following completed circuit: line 110, 12-24, CRLLE-1, 12-25, LSRLE-1, 12-36, LRCL-7, 12-40, LRLE-1, 12-43, MSLE-1-L, 12-9, "F" of MSLE-1, and line 0.

When load elevator #1 leaves its lowered position, LSLLE-1 is released, and CRLLE-1 (unit 12) is deenergized.

Load elevator #1 continues to raise and when it is fully raised, LSRLE-1 is operated, MSLE-1 "F" is deenergized, and CRRLE-1 (unit 12) is energized.

LRCL-7 is now unlatched by the following circuit: line 110, 12-12, CRRLE-1, 12-47, "U" of LRCL-7, and line 0.

It will thus be observed that the load elevator 4 holds a carrier which has been loaded in raised position previous to the time when the cleaning shuttle is advanced so that the cleaning shuttle advances a loading carrier to station 1 of the cleaning section from load elevator 4. Thereafter, the load-1 cycle begins, and load elevator #4 is lowered. Thereafter, load shuttle #3 is advanced to move a loaded carrier to load elevator #4. Then load elevators 2, 3 and 4 are raised, and load shuttle 2 advances a partially loaded carrier to load elevator 3 while load shuttle 3 returns. Load elevator 3 then descends for loading of the other half of the carrier and is received by load shuttle #3 while load elevator 2 also descends. Load shuttle 1 then advances an unloaded carrier to load elevator 2. Finally, load shuttle 1 returns while load elevator 1 raises to receive a further carrier from the return conveyor transfer shuttle #3.

As will hereinafter be described, after load elevator #1 has reached raised position, transfer shuttle #3 is advanced to deliver a returning carrier to load elevator #1, and thereafter load elevator #1 is lowered while transfer shuttle #3 is returned. The cycle is then repeated after the clean and rinse shuttles have again advanced.

*Unload-1 cycle*

When the clean and rinse shuttles have fully advanced at the end of a clean-rinse 1 cycle, CRFCS and CRFRS are energized, LRCU-1 and LRUE-1 are latched through the following circuits: line 110, 5–27, CRFCS, 5–28, 6–28, CRFRS, 6–33; and in parallel, 19–34, CRRUE-1, 19–51, "L" of LRUE-1; and 19–34, "L" of LRCU-1; and line 0.

Unload elevator #1 now starts lowering due to closure of the following circuit: line 110, 2–19, LRCCR-1, 2–17, 19–32, LRCU-1, 19–33, LRUE-1, 19–23, LSLUE-1, 19–10, MSUE-1-R, 19–9, MSUE-1 energizing coil "L" and line 0.

When unload elevator #1 leaves its raised position LSRUE-1 is released and CRRUE-1 (unit 19) is deenergized.

Unload elevator #1 continues to lower and when it is fully lowered, LSLUE-1 is operated to deenergize MSUE-1 "L" and to cause energization of CRLUE-1 (unit 19).

Unload shuttle #1 now starts advancing due to completion of the following circuit: line 110, 19–20, CRLUE-1, 19–21, LRUE-1, 19–13, 20–47, LRCU-4, 20–49, LSFUS-1, 20–16, MSUS-1-R, 20–15, "F" coil of MSUS-1, and line 0.

When unload shuttle #1 leaves its returned position, LSRUS-1 is released, causing CRRUS-1 (unit 20) to be deenergized.

Unload shuttle #1 continues to advance and when it is forward, LSFUS-1 is operated, causing MSUS-1 "F" to be deenergized and CRFUS-1 (unit 20) to be energized.

Unload elevator #1 now starts raising due to completion of the following circuit: line 110, 20–26, CRFUS-1, 20–27, 19–38, LRUE-1, 19–45, LSRUE-1, 19–7, MSUE-1-L, 19–8, "R" coil of MSUE-1, and line 0.

When unload elevation #1 leaves its lowered position, LSLUE-1 is released, and CRLUE-1 (unit 19) deenergized.

Unload elevator #1 continues to raise and when it is fully raised, LSRUE-1 is operated causing MSUE-1 "R" to be deenergized.

LRCU-1 is now unlatched through the following circuit: line 110, 24–24, LRCU-2, 24–35, 21–23, LRCU-3, 21–24, 24–41, LRU, 24–42, 2–14, LRCCR-1, 2–15, 19–15, CRRUE-1, 19–14, "U" coil of LRCU-1, and line 0.

*Unload-2 cycle*

At the same time that the unload elevator #1 starts to lower in unload-1 cycle, LRCU-2 is latched through the following circuit: line 110, 5–27, CRFCS, 5–28, 6–28, CRFRS, 6–33, 25–38, LRCU-6, 25–21, 24–57, "L" coil of LRCU-2, and line 0.

CRCU-2X is now energized through the following circuit: line 110, LRCU-2, 24–54, CRCU-2X, and line 0.

Unload shuttle #3 starts advancing due to the following circuit: line 110, 2–19, LRCCR-1, 2–23, 24–49, CRCU-2X, 24–48, LRU, 24–47, 25–25, CRLUE-4, 25–26, LSFUS-3, 24–16, MSUS-3-R, 24–15, "F" coil of MSUS-3, and line 0.

When unload shuttle #3 leaves its returned position LSRUS-3 is released deenergizing CRRUS-3 (unit 24).

Unload shuttle #3 continues to advance and when it is fully forward LSFUS-3 is operated, causing energization of CRFUS-3 (unit 24) and latching of LRCU-3 and LRCU-6 through the following circuits: line 110, 24–24, CRFUS-3, 24–27, 20–58, LRCU-4, 20–57, 21–39, "L" coil of LRCU-3, and line 0; and line 110, 24–24, CRFUS-3, 24–27, 25–36, "L" coil of LRCU-6, and line 0.

LRCU-2 is unlatched through the following circuit: line 110, 24–24, CRFUS-3, 24–27, 21–39, LRCU-3, 21–26, 25–29, LRCU-6, 25–30, 24–58, "U" coil of LRCU-2, and line 0.

MSUS-3 "F" is deenergized due to opening of LSFUS-3, and LRU is latched through the following circuit: line 110, LSFUS-3, 24–55, "L" of LRU, and line 0.

*Unload-3 cycle*

Following the unload-2 cycle, unload elevator #2 starts raising due to the following circuit: line 110, 21–30, LRCU-3, 21–29, 24–39, LRCU-2, 24–40, LSRUE-2, 21–7, MSUE-2-L, 21–8, "R" coil of MSUE-2, and line 0.

Similarly unload elevator #3 starts raising upon closure of the following circuit: line 110, 21–37, LRCU-3, 21–38, 24–50, CRCU-2X, 24–51, LSRUE-3, 23–7, MSUE-3-L, 23–8, "R" coil of MSUE-3, and line 0.

When unload elevator #2 leaves its lowered position LSLUE-2 is released and CRLUE-2 (unit 21) is deenergized.

Unload elevator #2 continues to raise and when it is fully raised LSRUE-2 is operated, causing MSUE-2 "R" to be deenergized and CRRUE-2 (unit 21) to be energized.

When unload elevator #3 leaves its lowered position, LSLUE-3 is released, and CRLUE-3 (unit 23) is deenergized.

Unload elevator #3 continues to raise and when it is fully raised LSRUE-3 is operated causing MSUE-3 "R" to be deenergized and CRRUE-3 (unit 23) to be energized.

When both CRRUE-2 and CRRUE-3 are energized, LRCU-4 and LRCU-5 are latched through the following circuits: line 110, 21–24, CRRUE-2, 21–13, 23–16, CRRUE-3, 23–17; the following in parallel: 20–30, CRFUS-1, 20–31; and 24–43, CRFUS-3, 24–59; and 20–31, "L" of LRCU-4, and line 0; and line 110, 21–14, CRRUE-2, 21–13, 23–16, CRRUE-3, 23–17, 22–38, "L" of LRCU-5, and line 0.

LRCU-3 is now unlatched through the following circuit: line 110, 21–14, CRRUE-2, 21–13, 23–16, CRRUE-3, 23–17, 20–30, LRCU-4, 20–32, 22–28, LRCU-5, 22–29, 21–40, "U" coil of LRCU-3, and line 0.

When LRCU-4 is latched, unload shuttle #1 starts returning and unload shuttle #3 returning due to closure of the following circuits: line 110, 20–33, LRCU-4, 20–34, 19–53, LRUE-1, 19–54, 21–27, LRCU-3, 21–28, LSRUS-1, 20–13, MSUS-1-F, 20–14, "R" of MSUS-1, and line 0; and line 110, 20–36, LRCU-4, 20–37, 21–31, LRCU-3, 21–32, LSRUS-3, 24–13, MSUS-3-F, 24–14, "R" coil of MSUS-3, and line 0.

When unload shuttle 1 leaves its forward position, LSFUS-1 is released causing CRFUS-1 (unit 20) to be deenergized.

Unload shuttle #1 continues to return and when it is fully returned, LSRUS-1 is operated deenergizing MSUS-1 "R" and energizing CRRUS-1 (unit 20).

When unload shuttle #3 leaves its forward position, LSFUS-3 is released, and CRFUS-3 (unit 24) is deenergized.

Unload shuttle #3 continues to return and when it is fully returned, LSRUS–3 is energized, MSUS–3 "R" is deenergized and CRRUS–3 (unit 24) is energized.

When both CRRUS–1 and CRRUS–3 are energized, LRCU–4 is unlatched through the following circuit: line 110, 20–22, CRRUS–1, 20–23, 24–21, CRRUS–3, 24–22, 20–39, "U" coil of LRCU–4, and line 0.

*Unload-5 cycle*

At the end of unload-3 cycle, LRCU–5 is latched, and this causes #2 unload shuttle to start indexing due to completion of the following circuit: line 110, 22–22, LRUS–2, 22–23; and in parallel with LRUS–2, 22–22, CRUS–2, 22–23; and 21–35, LRCU–3, 21–36, 22–32, LRCU–5, 22–33, 21–20, CRRUE–2, 21–33, 23–18, CRRUE–3, 23–19, 22–16, MSUS–2–R, 22–15, "F" of MSUS–2, and line 0.

When unload shuttle #2 leaves its indexed position, LSUS–2 is released causing CRUS–2 (unit 22) to be deenergized and LRUS–2 to be latched through the following circuit: line 110, LSUS–2, 22–36, "L" of LRUS–2, and line 0.

Unload shuttle #2 continues to index and when it is fully indexed, LSUS–2 is operated causing CRUS–2 (unit 22) to be energized and causing MSUS–2 "F" to be deenergized.

MSUE–2 "L" is now picked up starting unload elevator #2 lowering due to closure of the following circuit: line 110, 22–35, LRUS–2, 22–20, CRUS–2, 22–21, LSLUE–2, 21–10, MSUE–2–R, 21–9, "L" of MSUE–2, and line 0.

Unload elevator #3 starts lowering due to completion of the following circuit: line 110, 22–34, LRUS–2, 22–24, CRUS–2, 22–25, LSLUE–3, 23–10, MSUE–3–R, 23–9, "L" of MSUE–3, and line 0.

When unload elevator #2 leaves its raised position LSRUE–2 is released, and CRRUE–2 (unit 21) deenergized.

Unload elevator #2 continues to lower and when it is fully lowered, LSLUE–2 is operated deenergizing MSUE–2 "L" and energizing CRLUE–2 (unit 21).

Similarly when unload elevator #3 leaves its raised position LSRUE–3 is released dropping out CRRUE–3 (unit 23).

Unload elevator #3 continues to lower and when it is fully lowered LSLUE–3 is operated deenergizing MSUE–3 "L" and energizing CRLUE–3 (unit 23).

LRCU–5 is now unlatched through the following circuit: line 110, 21–14, CRLUE–2, 21–17, 23–21, CRLUE–3, 23–22, 22–37, "U" of LRCU–5, and line 0.

*Unload-6 cycle and transfer shuttle-1 cycle*

When LRCU–6 is latched at the end of unload-2 cycle, unload elevator #4 starts raising due to closure of the following circuit: line 110, LSRUE–4, 24–37, LRCU–2, 24–38, 25–31, LRCU–6, 25–32, 24–45, LRU, 24–46, 25–10, MSUE–4–R, 25–9, "F" of MSUE–4, and line 0.

When unload elevator #4 leaves its lowered position LSLUE–4 is released, and CRLUE–4 (unit 25) is deenergized.

Unload elevator #4 continues to raise and when it is fully raised LSRUE–4 is operated deenergizing MSUE–4 "F" and unlatching LRU through the following circuit: line 110, LSRUE–4, 24–56, "U" of LRU, and line 0.

CRRUE–4 (unit 25) is energized by closure of LSRUE–4.

Transfer shuttle #1 now starts advancing due to closure of the following circuit: line 110, LSTS–2, 25–17, CRRUE–4, 25–18, LSFTS–1, 26–16, MSTS–1–R, 26–15, "F" of MSTS–1, and line 0.

When transfer shuttle #1 leaves its returned position, LSRTS–1 is released, and CRRTS–1 (unit 26) is deenergized.

Transfer shuttle #1 continues to advance and when it is fully forward, LSFTS–1 is operated causing MSTS–1 "F" to be dropped out and CRFTS–1 to be energized (unit 26).

Unload elevator #4 now starts lowering due to closure of the following circuit: line 110, LSLUE–4, 24–19, CRRUS–3, 24–20, 26–27, CRFTS–1, 26–28, 24–44, LRU, 24–46, 25–10, MSUE–4–R, 25–9, "F" of MSUE–4, and line 0.

Operation of LSLUE–4 also actuates CRLUE–4 (unit 25) and this in turn causes transfer shuttle #1 to start returning by means of the following circuit: line 110, 25–22, CRLUE–4, 25–23, LSRTS–1, 26–13, MSTS–1–F, 26–14, "R" of MSTS–1, and line 0.

LSFTS–1 is now released and CRFTS–1 (unit 26) dropped out.

When transfer shuttle #1 is fully returned, LSRTS–1 is operated, MSTS–1 "R" is dropped out and CRRTS–1 (unit 26) is picked up.

When CRRUS–3 is picked up during the unload-5 cycle and CRRTS–1 and CRLUE–4 are picked up, LRCU–6 is unlatched through the following circuit: line 110, 24–24, CRRUS–3, 24–23, 25–19, CRLUE–4, 25–20, 26–21, CRRTS–1, 26–22, 24–76, LRU, 24–77, 25–37, "U" of LRCU–6, and line 0.

*Transfer shuttle 2 and 3 cycles*

Transfer shuttle #2 runs continuously until a carrier is placed in such a position as to operate LSC–TS–2. This switch when operated in conjunction with LSTS–2 drops out MSTS–2F which was previously energized through the following circuit: line 110, 25–13, CRRUE–4, 25–14; and in parallel therewith: 26–29, CRFTS–1, 26–30; LSC–TS–2; and in parallel therewith 25–13, LSTS–2, 27–16; and 27–16 MSTS–2–R, 27–9, "F" of MSTS–2, and line 0.

Transfer shuttle #2 is now plugged to a stop through ZSTS–2.

If during the time that the #2 transfer shuttle is running, the #4 unload elevator reaches its raised position (near the beginning of unload-6 cycle), the shuttle motor will continue running until LSTS–2 is operated whereupon MSTS–2–F will be dropped out and the #2 transfer shuttle motor will be plugged to a stop through ZSTS–2. When the #1 transfer shuttle reaches its forward position (toward the middle of transfer shuttle #1 cycle) MSTS–2–F will be energized and the #2 transfer shuttle will run until LSC–TS–2 and LSTS–2 are operated whereupon it will plug-stop as explained above.

Transfer shuttle #3 runs continuously until LSC–TS–3–1 is operated by a carrier with load elevator #1 not raised.

The circuit for MSTS–3 "F" is as follows: line 110, 28–34, LRTS–3, 28–22, the following circuits in parallel: 28–22, CRRTS–3, 28–23, LSFTS–3, 28–19; 12–15, CRRLE–1, 12–16, LSC–TS–3–1, 28–19; and 12–15, CRRLE–1, 12–17, LSC–TS–3–2, 28–19; MSTS–3–R, 28–16, "F" of MSTS–3, and line 0.

With the #1 load elevator raised, transfer shuttle #1 will run until LRC–TS–3–2 is operated by a carrier.

When transfer shuttle #3 leaves its returned position LSRTS–3 is released, and CRRTS–3 ,unit 28) deenergized.

Transfer shuttle #3 continues to run and when it is fully forward, LSFTS–3 is operated and CRFTS–3 (unit 38) is picked up.

LRTS–3 is now latched through the following circuit: line 110, 28–28, CRFTS–3, 28–29, "L" of LRTS–3, and line 0.

MSTS–3 "F" is dropped out and MSTS–3 "R" is picked up starting transfer shuttle #3 returning due to the following circuit: line 110, 28–35, LRTS–3, 28–36, LSRTS–3, 28–14, MSTS–3–F, 28–15, "R" of MSTS–3, and line 0.

When transfer shuttle #3 leaves its forward position LSFTS–3 is released and CRFTS–3 (unit 28) is dropped out.

Transfer shuttle #3 continues to return and when it is fully returned, LSRTS–3 is operated causing MSTS–3 "R" to drop out and CRRTS–3 (unit 28) to be picked up.

LRTS–3 is now unlatched by means of the following circuit: line 110, 28–28, CRRTS–3, 28–27, and "U" of LRTS–3, and line 0.

MSTS–3 "F" is now energized through the following circuit: Line 110, 28–34, LRTS–3, 28–22, CRRTS–3, 28–23, LSFTS–3, 28–19; and in parallel therewith: 28–22, 12–15, CRRLE–1, 12–16, 28–47, LSC–TS–3–1, 28–19; and 28–22, 12–15. CRRLE–1, 12–17, 28–48, LSC–TS–3–2, 28–9; MSTS–3–R, 28–16, "F" of MSTS–3, and line 0.

Thus, after unload elevator #4 is raised, as described in transfer shuttle–1 cycle, transfer shuttle–1 starts advancing. When unload elevator has now fully lowered, transfer shuttle #1 is returned. Transfer shuttle #2 now picks up the returning carrier from transfer shuttle #1 and progressively moves it toward the load end of the machine. Load elevator #1 may, at the time transfer shuttle #2 receives a carrier, be at its lower position. However transfer shuttle #2 will continue to operate and deliver a carrier to transfer shuttle #3. Transfer shuttle #3 then runs until LSC–TS–3–1 is operated, at which time transfer shuttle #3 stops.

Now, when at a later time the #1 load elevator is raised, the #3 transfer shuttle operates until LSC–TS–3–2 is operated by a carrier.

When the #1 load elevator is raised and LSC–TS–3–2 is operated, LRLE–1 is latched by means of the following circuit: line 110, 12–65, CRRLE–1, 12–66, 12–44, "L" of LRLE–1, and line 0.

Load elevator #1 starts lowering at this time due to completion of the following circuit: line 110, LSLLE–1, 13–20 CRRLS–1, 13–21, 12–42, LRLE–1, 12–43, MSLE–1–R, 12–9, "F" of MSLE–1, and line 0.

LSRLE–1 is now released and CRRLE–1 (unit 12) is deenergized.

Load elevator #1 continues to lower and when it is fully lowered, LSLLE–1 is operated, CRLLE–1 (unit 12) is energized. MSLE–1 "F" is now deenergized bringing the load elevator #1 to a stop.

When it is desired to remove all carriers from the machine preliminary to closing down the machine, a "Storage" button is pushed which causes the #1 load elevator 108 to remain in its lowered position. Under these circumstances, carriers continued to be supplied by #4 unload elevator 98 to #1 transfer shuttle 100 which advances them to transfer shuttle #2. Transfer shuttle #3 runs continuously until LSC–TS–3–1 is operated by a carrier, and is then plugged to a stop.

Transfer shuttle #2 continues to run until LSC–TS–2 and LSTS–2 are operated whereupon it will be plug stopped through ZSTS–2. Thereafter, the #1 transfer shuttle 100 continues to feed carriers onto the rails 101, and each carrier is pushed along by the preceding carrier, with the last carrier being pushed by the transfer shuttle #1. The #2 and #3 transfer shuttles are stopped in such positions that none of the stop lugs are actuated, and the carriers are thus free to simply ride under the pusher lugs and stop lugs toward the load end of the machine as they are pushed along by the #1 transfer shuttle 100 from the unload end of the machine. The #1 transfer shuttle 100 continues in this manner until all the carriers are removed from the machine and racked on the rails 101. The machine may now be manually stopped by pressing a suitable stop button.

Although a specific embodiment of the invention has been here illustrated and described, it will be understood that various modifications in the construction may be made without a departure from the spirit and scope of the invention as indicated by the appended claims.

I claim as my invention:

1. In a processing machine, a series of processing tanks, means for moving a series of work units through said series of processing tanks, means at the end of said series of tanks for elevating work carriers from a work unloading level at one side of a work unloading space to an upper level to clear work units of said work unloading space, means for transferring work units across said work unloading space, means for lowering said work units to work unloading level at the other side of said work unloading space, whereby an adjacent part of the work unit suspended from a work carrier may be unloaded at each side of the work unloading space, and work unit conveyor means extending through said unloading space for receiving work units from said one side and said other side of said unloading space and for removing work units from said unloading space.

2. In a processing machine, a series of processing tanks, means for moving a series of work carriers having work suspended therefrom along said series of processing tanks, means at the end of said series of baths for elevating work carriers from a work unloading level at one side of a work unloading space to an upper level to clear work of said work unloading space, means for transferring work across said work unloading space, means for lowering said work to work unloading level at the other side of said work unloading space, whereby an adjacent part of the work suspended from a work carrier may be unloaded at each side of the work unloading space, a return conveyor at an uppermost level above said upper level for returning carriers to a load end at the beginning of said series of baths, a carrier elevator for receiving carriers at said work unloading level and for delivering unloaded carriers to said return conveyor at said uppermost level for return to the load end of the machine, and electric circuit means for controlling operation of said moving means, elevating means, transferring means, lowering means, carrier elevator and return conveyor to automatically move successive work carriers from one side of the work unloading space to the other side of the work unloading space and then to said return conveyor.

3. In a processing machine, a series of processing baths, means for moving a series of work carriers along said baths, means at the end of said series of baths for elevating work carriers from a work unloading level at one side of a work unloading space to an upper level to clear work of said work unloading space, means for transferring work across said work unloading space, means for lowering said work to work unloading level at the other side of said work unloading space, whereby an adjacent part of the work suspended from a work carrier may be unloaded at each side of the work unloading space, a return conveyor at an uppermost level above said upper level for returning carriers to a load end at the beginning of said series of baths, a carrier elevator for receiving carriers at said work unloading level and for delivering unloaded carriers to said return conveyor at said uppermost level for return to the load end of the machine, a further carrier elevator at the load end of the machine for receiving carriers at said uppermost level from said return conveyor for moving the same to a work loading level at one side of a work loading space for loading of the adjacent side of said carrier, further elevating means for elevating the partially loaded carrier to an upper level to clear the work suspended from said carrier of said work loading space, further transferring means for transferring said partially loaded carrier to the other side of said work loading space, further lowering means for lowering said partially loaded carried to a work loading level at the other side of said loading space to complete loading of the carrier, and electric circuit means for operating said moving means, elevating means, transferring means, lowering means, carrier elevator, return conveyor, further carrier elevator, further elevating means, further transferring means and further lowering means to automatically move successive work carriers from one side of the work unloading space to the other side of the work unloading space and then to the return conveyor and from the return conveyor to the one and other sides of the loading space.

4. In a processing machine, a series of processing baths, means for immersing a series of work units suspended from work carriers successively in said baths, means for moving a work carrier from a work loading level at one side of a loading space to an upper level to clear the work suspended from the carrier of said work loading space, means for transferring the partially loaded carrier to the other side of said work loading space, means for lowering the partially loaded carrier to a work loading level at the other side of the loading space, means for thereafter delivering the loaded carrier to said work immersing means for said series of baths, and work unit conveyor means extending through said loading space for delivering work units to said loading space for transfer to the work carriers at said one side and said other side of said work loading space.

5. In a processing machine, a series of processing stations, work carriers each for supporting first and second work units spaced in the direction of advance of the work carriers along said series of stations, a transfer space at at least one end of said series of stations, means for moving successive work carriers along said series of stations, means for moving successive work carriers between one side of said transfer space where said first work units are adjacent said space and said one end of said series of stations, transfer moving means for moving work units around said transfer space between said one side of said transfer space and an opposite side of said transfer space where said second work units are adjacent said space, and first and second work unit conveyor means extending through said transfer space adjacent said one side and said opposite side thereof respectively to accommodate transfer of first and second work units respectively between said conveyor means and work carriers adjacent said one and said opposite sides of said transfer space.

6. In a processing machine, means for moving work carriers horizontally along spaced horizontal rails comprising a pair of reciprocating walking beams mounted for alternate and opposite advance and retraction and disposed in proximity to said rails to progressively move the carriers therealong, pivotal stop lugs disposed at spaced stations along said rails for engaging carriers at the end of each advance of a walking beam, and stop actuators carried by said beams at spaced intervals therealong to oppose pivotal movement of said stop lugs when a walking beam is at its advanced position to prevent overtravel of said work carriers during the time that one walking beam is halting its advancing movement and starting its retraction.

7. In an apparatus for treating work units by immersion in a series of treatment baths, a series of short period treatment tanks, a series of long period treatment tanks, first elongated rails extending horizontally along and on respective sides of said short period treatment tanks for supporting work units over each of said short period treatment tanks, means mounting said first rails for vertical reciprocation between an upper level and a lower level for joint lowering and raising of said work units with respect to said short period treatment tanks, second elongated rail means extending along and on each side of said series of long period treatment tanks and including pairs of individual rail sections on each side of and adjacent each tank and movable between said upper level and a lower level for independent movement of the work unit supported by said pair of rail sections into and out of the associated long period treatment tank, first conveyor means disposed adjacent said upper level and extending along said first elongated rail for intermittently moving work units a distance equal to the separation between short period tanks, means responsive to an advance of said first conveyor means for initiating lowering of said first rails, means controlling the duration of the dwell of said work units in the short period treatment baths and for initiating raising of said first rails after the expiration of the dwell, means responsive to the raising of said work units from the short period baths for initiating an advance of said first conveyor means to shift the work units to the respective next succeeding baths and for transferring a first work unit to the long period second elongated rail means, second means extending along said second rail means and controlled to selectively advance work units to respective ones of the long period pairs of rail sections for lowering of the work units into the respective long period baths, and sequence control means including stepping relay means for actuating said second conveyor means to move work units which are delivered to said second rail means upon successive advances of said first conveyor means to successive ones of said long period rail sections to cause each of a series of successive work units to be immersed in different ones of said long period treatment baths, and said sequence control means controlling raising and lowering of said individual rail sections and advance of said second conveyor means to remove a treated work unit from one of said long period baths during each cycle of said first conveyor means prior to delivery of an incoming work unit to said one long period bath.

8. In an apparatus for treating work units by immersion in a series of treatment baths, a series of short period treatment tanks, a series of long period treatment tanks, first elongated rails extending horizontally along and on respective sides of said short period treatment tanks for supporting work units over each of said short period treatment baths, means mounting said first rails for vertical reciprocation between an upper level and a lower level to move work units in unison into and out of each of the short period treatment baths, second elongated rail means extending along and on each side of said series of long period treatment tanks including individual rail sections on each side of and adjacent each long period treatment tank and movable between said upper level and a lower level for independent movement of a work unit on a pair of said rail sections into and out of the associated long period treatment tanks, first conveyor means disposed adjacent said upper level and extending said first elongated rails for intermittently moving work units a distance equal to the separation between short period treatment tanks, means responsive to an advance of said first conveyor means for initiating lowering of said first elongated rails, timer relays means controlling the duration of the dwell of said work units in the short period treatment baths and for initiating raising of said first elongated rails after the expiration of said dwell period, means responsive to the raising of said work unit from the short period bath for initiating an advance of said first conveyor means to ship the work units to respective next succeeding baths and for transferring a first work unit to the second elongated rail means, further conveyor means extending along said second elongated rail means adjacent said upper level and operable to advance work units in raised position thereof along said second elongated rail means a distance equal to the separation between long period treatment baths upon each indexing movement thereof, first rail sequencing means including stepping relay means for lowering successive ones of said individual rail sections after successive advance of said first conveyor means to immerse the incoming work units in respective long period treatment baths in succession, first conveyor sequencing means including stepping relay means for controlling the number of indexing movements of said further conveyor means after each successive advance of said first conveyor means to advance successive incoming work units to the rail sections about to be lowered by said first rail sequencing means, second rail sequencing means for raising successive ones of said individual rail sections in the order in which they are lowered by said first rail sequencing means, each rail section being raised after a relatively long immersion period of the associated work unit in the associated long period treatment bath as compared to the immersion period of work units in each of said short period treatment baths, and sequence control means including stepping relay means controlling raising and lowering of said individual rail sections and indexing of said second conveyor means to remove a treated work unit from one of said long period baths during each cycle of said first conveyor means prior to delivery of an incoming work unit to said individual rail sections.

9. In an apparatus for treating work units by immersion in a series of treatment baths, a series of short period treatment tanks, a series of long period treatment tanks, first elongated rails extending horizontally along and on respective sides of said short period treatment tanks for supporting work units over each of said short period treatment baths, means mounting said first rails for vertical reciprocation between an upper level and a lower level to move work units in unison into and out of each of the short period treatment baths, second elongated rail means extending along and on each side of said series of long period treatment tanks including individual rail sections on each side of and adjacent each long period treatment tank and movable between said upper level and a lower level for independent movement of a work unit on a pair of said rail sections into and out of the associated long period treatment tanks, first conveyor means disposed adjacent said upper level and extending along said first elongated rails for intermittently moving work units a distance equal to the separation between short period treatment tanks, means responsive to an advance of said first conveyor means for initiating lowering of said first elongated rails, means controlling the duration of the dwell of said work units in the short period treatment baths and for initiating raising of said first elongated rails after the expiration of said dwell period, means responsive to the raising of said work unit from the short period bath for initiating an advance of said first conveyor means to shift the work units to respective next succeeding baths and for transferring a first work unit to the second elongated rail means, further conveyor means extending along said second elongated rail means adjacent said upper level and operable to advance work units in raised position thereof along said second elongated rail means a distance equal to the separation between long period treatment baths upon each indexing movement thereof, first rail sequencing means for lowering successive ones of said individual rail sections after successive advances of said first conveyor means to immerse the incoming work units in respective long period treatment baths in succession, first conveyor sequencing means including stepping relay means for controlling the number of indexing movements of said further conveyor means after each successive advance of said first conveyor means to advance successive incoming work units to the rail sections about to be lowered by said first rail sequencing means, second rail sequencing means for raising successive ones of said individual rail sections in the order in which they are lowered by said first rail sequencing means, each rail section being raised after a relatively long immersion period of the associated work unit in the associated long period treatment bath as compared to the immersion period of work units in each of said short period treatment baths, and sequence control means controlling raising and lowering of said individual rail sections and indexing of said second conveyor means to remove a treated work unit from one of said long period baths during each cycle of said first conveyor means prior to delivery of an incoming work unit to said individual rail section, and third conveyor means for advancing in unison with said first conveyor means and for engaging an outgoing work unit above the last long period treatment bath prior to each advance thereof and for moving an outgoing work unit off of said second rail means upon each advance thereof.

References Cited in the file of this patent

UNITED STATES PATENTS

| | | |
|---|---|---|
| 646,266 | Diescher | Mar. 27, 1900 |
| 675,222 | Kiely | May 28, 1901 |
| 996,290 | Steele | June 27, 1911 |
| 1,187,825 | Ferguson | June 20, 1916 |
| 2,107,369 | Dinley | Feb. 8, 1938 |
| 2,195,661 | Todd | Apr. 2, 1940 |
| 2,245,673 | Huenerfauth | June 17, 1941 |
| 2,591,681 | Davis | Apr. 8, 1952 |
| 2,597,064 | Charles | May 20, 1952 |
| 2,605,882 | Curtis | Aug. 5, 1952 |
| 2,619,916 | Rainier | Dec. 2, 1952 |
| 2,633,855 | Ransohoff | Apr. 7, 1953 |
| 2,681,132 | Knutson | June 15, 1954 |
| 2,716,415 | Davis | Aug. 30, 1955 |